(12) United States Patent
Engler et al.

(10) Patent No.: US 11,967,216 B2
(45) Date of Patent: Apr. 23, 2024

(54) METHOD, APPARATUS, AND COMPUTER-READABLE MEDIUM FOR IMPLEMENTING AN ADAPTIVE VIRTUAL REALITY SAFETY SYSTEM

(71) Applicant: INFLIGHT VR SOFTWARE GMBH, Munich (DE)

(72) Inventors: Moritz Engler, Muellheim (DE); Joan Mora Guiard, Barcelona (ES); Elena Kokkinara, Barcelona (ES)

(73) Assignee: INFLIGHT VR SOFTWARE GMBH, Munich (DE)

( * ) Notice: Subject to any disclaimer, the term of this patent is extended or adjusted under 35 U.S.C. 154(b) by 0 days.

(21) Appl. No.: 17/839,103

(22) Filed: Jun. 13, 2022

(65) Prior Publication Data

US 2023/0401948 A1  Dec. 14, 2023

(51) Int. Cl.
*G08B 21/02* (2006.01)
(52) U.S. Cl.
CPC .................... *G08B 21/02* (2013.01)
(58) Field of Classification Search
CPC ........ G08B 21/00; G08B 21/02; G08B 21/18; G08B 21/182; G08B 21/24; G08B 23/00
See application file for complete search history.

(56) References Cited

U.S. PATENT DOCUMENTS

| | | | | |
|---|---|---|---|---|
| 2019/0164343 | A1* | 5/2019 | Bailey | A63F 13/25 |
| 2021/0124412 | A1* | 4/2021 | Johnson | G06F 3/0346 |
| 2022/0035444 | A1* | 2/2022 | Johnson | G06F 3/0346 |

FOREIGN PATENT DOCUMENTS

WO  2016162269 A1  10/2016

OTHER PUBLICATIONS

Medeiros Daniel et al., "From Shielding to Avoidance: Passenger Augmented Reality and the Layout of Virtual Displays for Productivity in Shared Transit," IEEE Transactions on Visualization and Computer Graphics, IEEE, USA, vol. 28, No. 11, Aug. 31, 2022 (Aug. 31, 2022), pp. 3640-3650.
International Search Report and Written Opinion cited in PCT/EP2023/065865 dated Jan. 16, 2024, 15 Pages.

* cited by examiner

*Primary Examiner* — Brian Wilson
(74) *Attorney, Agent, or Firm* — Reed Smith LLP; Amardeep S. Grewal

(57) ABSTRACT

A system, method, and computer-readable medium for implementing an adaptive VR safety system, including executing a spatial risk warning routine, the spatial risk warning routine being configured to perform one or more warning actions based on a physical traversal by the VR device of current spatial risk zones, identifying spatial information corresponding to a user of the VR device, loading a first risk profile corresponding to the spatial information, the first risk profile defining a first plurality of spatial risk zones, receiving a notification of a situational risk event in a plurality of situational risk events, loading a second risk profile corresponding to the spatial information and the situational risk event, the second risk profile defining a second plurality of spatial risk zones different than the first plurality of spatial risk zones.

54 Claims, 31 Drawing Sheets

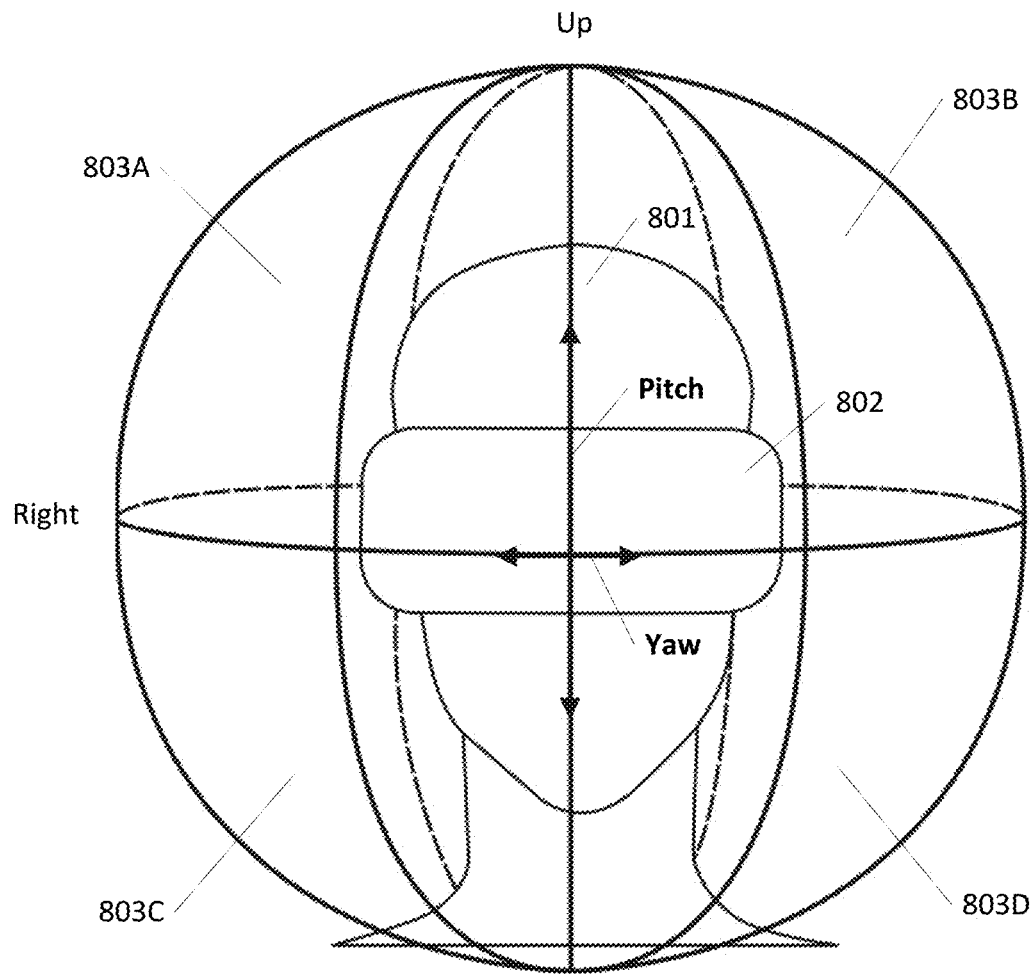
Fig. 8A
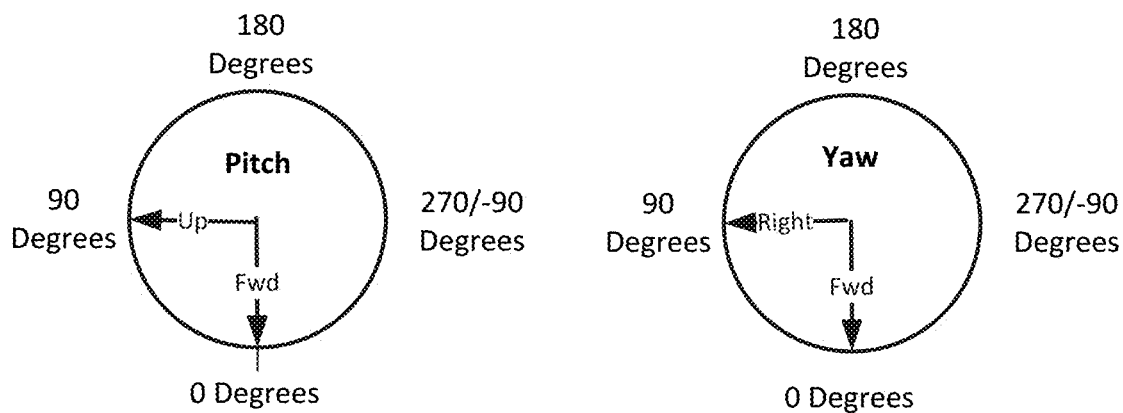
Fig. 8B
Fig. 8C

METHOD, APPARATUS, AND COMPUTER-READABLE MEDIUM FOR IMPLEMENTING AN ADAPTIVE VIRTUAL REALITY SAFETY SYSTEM

FIELD

The present invention relates to a method, an apparatus, and a computer-readable medium for implementing an adaptive Virtual Reality ("VR") safety system.

BACKGROUND

Virtual Reality ("VR") is a computer-generated environment designed to immerse a user within a virtual location. VR systems commonly utilize eyewear, such as headsets or helmets that provide video and audio output directly to a user through an integrated display and speakers. VR systems commonly include other mechanisms designed to increase a user's sense of immersion, such as haptic feedback in headsets and accessories and accelerometers configured to detect headset motion and alter the virtual environment correspondingly.

The result of all of these features is that VR is a uniquely immersive medium. Consequently, VR devices that are used in confined or potentially hazardous environments, such as airplanes, trains, or other forms of transportation must be carefully designed to maintain the user's immersion, but at the same time provide safeguards so that a user does not injure themselves.

Additionally, in the scenario where VR devices are used in an environment with variable levels of risk associate with different situations or variable spatial arrangements, any safety system used to protect the VR user must be adaptable and adjustable, both in terms of spatial safeguards and situational safeguards.

Consequently, there is a need for improvements in adaptive VR safety systems which adjust to variable spatial environments and scenarios.

SUMMARY

It is the object of the present invention to provide an improved or alternative method, system and computer-readable medium for implementing an adaptive VR safety system.

This object is attained with a method, apparatus, and computer-readable medium according to the present specification or in line with the present claims.

The present invention relates to a method for implementing an adaptive VR safety system. The method can comprise the steps as discussed below.

Executing, by a Virtual Reality (VR) device, a spatial risk warning routine, the spatial risk warning routine being configured to perform one or more warning actions based at least in part on a physical traversal by the VR device of one or more current spatial risk zones in a plurality of current spatial risk zones.

Identifying, by the VR device, spatial information corresponding to a user of the VR device, the spatial information comprising seat information corresponding to a seat of the user and occupancy information regarding one or more seats adjacent to the seat of the user;

Loading, by the VR device, a first risk profile corresponding to the spatial information into the spatial risk warning routine, wherein the first risk profile defines a first plurality of spatial risk zones and wherein loading the first risk profile comprises setting the plurality of current spatial risk zones to the first plurality of spatial risk zones;

Receiving, by the VR device, a notification of a situational risk event in a plurality of situational risk events.

Loading, by the VR device, a second risk profile corresponding to the spatial information and the situational risk event, wherein the second risk profile defines a second plurality of spatial risk zones different than the first plurality of spatial risk zones and wherein loading the second risk profile comprises setting the plurality of current spatial risk zones to the second plurality of spatial risk zones.

The plurality of current spatial risk zones can include a plurality of current risk severity values corresponding to the plurality of current spatial risk zones. The step of performing one or more warning actions based at least in part on a physical traversal by the VR device of one or more current spatial risk zones in a plurality of current spatial risk zones can include detecting traversal of a current spatial risk zone in the plurality of current spatial risk zones, determining a risk severity value in the plurality of risk severity values based at least in part on the traversed current spatial risk zone, and identifying a warning action based at least in part on the risk severity value.

The step of determining a risk severity value in the plurality of risk severity values based at least in part on the traversed current spatial risk zone can include determining a duration associated with the traversal of the current spatial risk zone and adjusting the risk severity value based at least in part on the duration.

The step of performing one or more warning actions based at least in part on a physical traversal by the VR device of one or more current spatial risk zones in a plurality of current spatial risk zones can include detecting traversal of two or more current spatial risk zones in the plurality of current spatial risk zones, determining a total risk severity value based at least in part on the traversed two or more current spatial risk zones, and identifying a warning action based at least in part on the determined total risk severity value.

The step of determining a total risk severity value based at least in part on the traversed two or more current spatial risk zones can include determining two or more durations associated with the traversal of the two or more current spatial risk zones and adjusting the total risk severity value based at least in part on the two or more durations.

The plurality of current spatial risk zones can include a plurality of volumetric risk zones and physical traversal by the VR device of one or more current spatial risk zones in a plurality of current spatial risk zones can include displacement of the VR device into a spatial volume corresponding to a volumetric risk zone in the plurality of volumetric risk zones.

The plurality of current spatial risk zones can include a plurality of orientation risk zones and physical traversal by the VR device of one or more current spatial risk zones in a plurality of current spatial risk zones can include rotation of the VR device into an angular position corresponding to an orientation risk zone in the plurality of orientation risk zones.

The one or more warning actions can include one or more of: a visual warning displayed on a display of the VR device, a three-dimensional mesh of the one or more current spatial risk zones displayed on the display of the VR device, an audio warning transmitted through an audio output of the VR device, a haptic feedback warning transmitted through the VR device, and/or switching the display of the VR device to a camera mode to display a pass-through image captured by a camera of the VR device.

The step of identifying spatial information corresponding to a user of the VR device can include one or more of: receiving at least a portion of the spatial information from the user of the VR device via an input interface of the VR device, receiving at least a portion of the spatial information from a server communicatively coupled to the VR device, receiving at least a portion of the spatial information from a remote device communicatively coupled to the VR device, determining at least a portion of the spatial information by querying a spatial information database, or determining at least a portion of the spatial information based at least in part on an analysis of sensor data from one or more sensors of the VR device.

The spatial information corresponding to the user of the VR device can include one or more of: spatial positions and physical dimensions of one or more physical obstructions proximate to the user of the VR device, spatial positions and physical dimensions of one or more fixtures proximate to the user of the VR device, a spatial position and physical dimensions of a seat of the user, a spatial position and physical dimensions of the one or more seats adjacent to the seat of the user, physical dimensions of an area surrounding the user, physical attributes of the user, and/or physical attributes of one or more persons adjacent to the user.

The first plurality of spatial risk zones can include a first plurality of risk severity values corresponding to the first plurality of spatial risk zones and the step of loading a first risk profile corresponding to the spatial information into the spatial risk warning routine can include setting the plurality of current risk severity values to the first plurality of risk severity values.

The second plurality of spatial risk zones can include a second plurality of risk severity values corresponding to the second plurality of spatial risk zones and the step of loading a second risk profile corresponding to the spatial information into the spatial risk warning routine can include setting the plurality of current risk severity values to the second plurality of risk severity values.

The situational risk event can include one of: a meal or drink service event, a cruising event, a landing event, a takeoff event, a turbulence event, a disembarking event, or a boarding event.

The step of receiving a notification of a situational risk event in a plurality of situational risk events can include receiving the notification from a server communicatively coupled to the VR device or receiving the notification from a remote device communicatively coupled to the VR device.

The method can additionally include the steps of receiving, by the VR device, a second notification indicating a termination of the situational risk event and loading, by the VR device, the first risk profile into the spatial risk warning routine based at least in part on receiving the second notification, wherein loading the first risk profile comprises setting the plurality of current spatial risk zones to the first plurality of spatial risk zones.

The VR device can optionally be configured to communicate with a server via a middleware application executing on the VR device, the middleware application being disposed as an intermediary between the server and one or more VR applications executing on the VR device.

The method can additionally include the steps of determining, by the VR device, an optimal location for a user interface element on a user interface of the VR device based at least in part on the plurality of current spatial risk zones and transmitting, by the VR device, the user interface element at the determined location.

The present invention additionally relates to a Virtual Reality (VR) device apparatus for implementing an adaptive VR Safety System. The VR device apparatus can comprise one or more processors and one or more memories operatively coupled to at least one of the one or more processors and having instructions stored thereon that, when executed by at least one of the one or more processors, cause at least one of the one or more processors to perform one or more of the above-mentioned method steps.

The present invention additionally relates to at least one non-transitory computer-readable medium storing computer-readable instructions that, when executed a Virtual Reality (VR) device, cause the VR device to perform one or more of the above-mentioned method steps.

The method, apparatus, and computer-readable medium of the adaptive VR safety system disclosed herein provides several benefits.

The disclosed VR safety system generates dynamic risk zones that are customized to a VR user's current environment and spatial surroundings, rather than providing a "one-size-fits-all" scheme that may not be appropriate for certain environments or seating arrangements. The dynamic risk zones allow for granular and customized spatial risk zones that can be adjusted for a variety of scenarios, such as different seating arrangements and seat sizes.

The disclosed VR safety system takes into account nearby persons and users and determines the spatial risk zones accordingly. This allows the system to adapt to scenarios where the VR user is surrounded by other persons (in a crowded plane), as well as scenarios where the VR user has greater freedom of movement.

The disclosed VR safety system provides detection of different types spatial risks, including risks stemming from movement of the VR device and head of the user into regions that contain obstructions (volumetric risk zones), as well as risks stemming from the orientation of the head of the user (orientation risk zones).

The disclosed VR safety system dynamically adjusts not just to variable spatial arrangement, but also to variable situations. In particular, the VR safety system dynamically adjusts spatial risk zones and severity values associated with risk zones in response to changing situations. This enables the VR safety system to provide the VR user with greater freedom of movement in low-risk situations and better protect the VR user in high risk situations.

The disclosed VR safety system also optimizes the screen area and interface of the VR device. By assessing the user's spatial situation, the VR safety system is able to determine an optimal location within the VR interface to place user interface or other graphical elements. This ensures that the user's gaze and head is positioned in the direction and space that contains the least amount of obstructions and the most free space.

The disclosed VR safety system also allows for centralized control and management of the safety settings of multiple VR devices in a particular space, such as a passenger train or an airplane. By propagating customized VR safety settings and risk profiles to each device within the area, the administrator of the VR devices and the VR experience can ensure that all users within the area are safely operating the VR devices as appropriate to their area, spatial surroundings, and local situation.

BRIEF DESCRIPTION OF THE DRAWINGS

FIGS. 8A-8C illustrate the axes used to define orientation risk zones and example orientation risk zones according to an exemplary embodiment.

DETAILED DESCRIPTION

Figure 1:
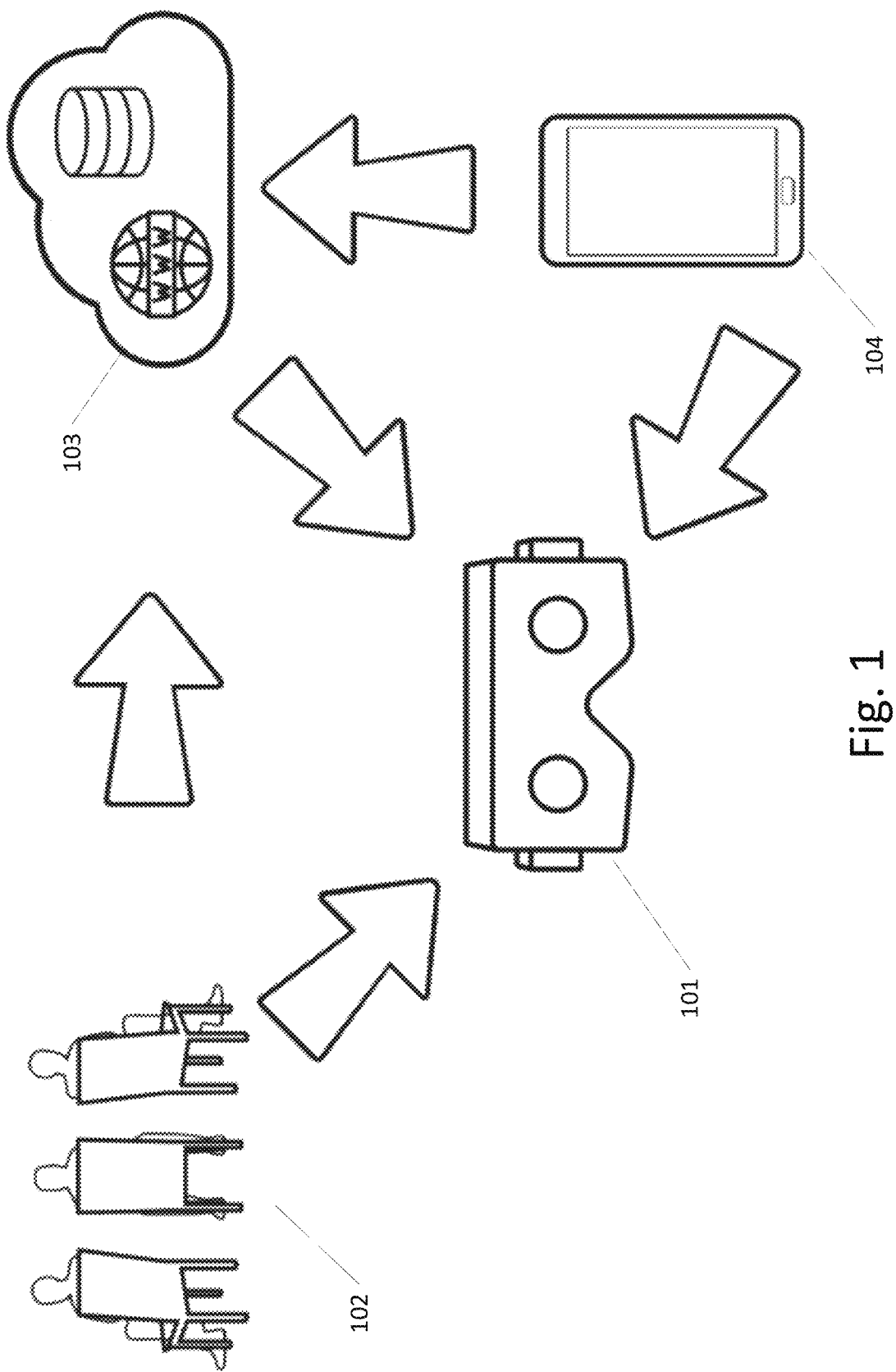
FIG. 1 illustrates the components of, and information utilized by, the adaptive VR safety system according to an exemplary embodiment.

While methods, apparatuses, and computer-readable media are described herein by way of examples and embodiments, those skilled in the art recognize that methods, apparatuses, and computer-readable media managing notifications delivered to a virtual reality device are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word "can" is used in a permissive sense (i.e., meaning having the potential to) rather than the mandatory sense (i.e., meaning must). Similarly, the words "include," "including," and "includes" mean including, but not limited to.

As described above, VR has the power to deeply immerse users into rendered environments. As a result, passengers can easily lose their situational awareness and resulting in the user entirely forgetting about the physical space around them. Depending on the content of the VR experience, this can oftentimes cause injuries or discomfort on the users themselves or others that are in close proximity to the user.

Existing VR safety systems do not provide an adequate solution to this problem. Typically, a user is given an interface with which they can define their available physical space (e.g., width and length) at the very beginning of the experience. Thereafter, the system warns the user every time they are approaching the limits of the predefined physical space. These safety or play area implementations are mainly designed for standing VR experiences (room-scale VR) and use of VR in a user's own space.

However, there are several cases where VR users are provided with a headset or bring their own device to use in 3rd party locations, with very specific space restrictions. Oftentimes, the user is required to be seated and the physical space's fixtures are very narrow, with risk for injuries on any side of the space. Take the example of a user experiencing VR inside an airplane, where the user might be seated by the window, the aisle, or the middle seat (each resulting in slightly different fixtures). Moreover, there might be other VR users or non-users nearby who should be considered (e.g., other passengers in the aircraft). Finally, there might be variable situations where the user has a lesser or a greater need for protection/interference from a VR system. For example, in the airplane scenario, when hot meals and drinks are served, there is a greater danger that the users might be injured. Similar variable scenarios might take place in other means of transportation (train, bus, car) or in other seated situations like in a theater, a concert hall, a classroom, or an office space. In certain situations, an immersed user can also be a nuisance for persons relevant to the particular context. For example, during meal service in a flight context, the immersed user can present difficulties for other passengers on flight crew. In these situations, it is important to not only protect the VR user, but also at the same time to provide the user with a pleasant immersive experience with the minimum number of interruptions (e.g., from safety warnings).

The inventors have discovered a novel adaptive VR safety system, method, apparatus, and computer-readable medium that can adapt to the physical space restrictions, risks and variable situations during the VR experience, and that optimizes the system's reactions and feedback to the user in order to enhance the user experience.

The methods and systems for implementing an adaptive VR safety system are frequently described in the context of flight-based VR systems, but it is understood that the adaptive VR safety disclosed herein is applicable to any VR usage environment in order to protect the safety of the VR user and/or nearby persons.

FIG. 1 illustrates the components of, and information utilized by, the adaptive VR safety system according to an exemplary embodiment. As shown in FIG. 1, the VR device 101 can include a software development kit (SDK) implementing the adaptive VR system and, optionally, a middleware component executing on the VR device.

The VR safety SDK is a plugin that can be used by any VR application to manage safety settings for VR experiences. However, the SDK is not required and the corresponding functionality can be implemented in any game engine or native code. It is understood that references to functionality performed by the SDK includes functionality performed by the SDK or equivalent software (e.g., native software). The primary purpose of the safety system, whether implemented via the SDK or otherwise, is to manage the given safety settings and configurations and react to the user's activity to protect the user and nearby users or non-users from injuries.

The VR safety system can connect to the remote server in order to establish a message exchange for configurations, user inputs or moderator inputs. The messaging can be supported by two different protocols: REST API and Socket (e.g., Web Socket), with the endpoints being developed on the server side.

The VR safety system can also connect to a background-running service (e.g., the "middleware," discussed further below) that can facilitate communication with the server. As another alternative, the system can operate without a server. For example, the system can directly read the seats and safety settings from a configuration file, stored locally in the VR unit (inside the headset, if a standalone VR headset is utilized, or in a connected computing device, if a tethered VR solution is utilized). Of course, it is understood that many variations and technology stacks can be used to implement the disclosed adaptive VR safety system, and these examples are not intended to be limiting.

Referring to FIG. 1, the system can also include connected network components 103 such as servers, remote computing devices, databases, artificial intelligence software, etc. As will be described in greater detail below, the system can utilize seating, space, and location information 102 to configure spatial risk zones, severities, and warnings/alerts. Additionally, the system can include one or more moderator/administrator devices 104 that can be used to adjust the settings, status, and/or scenarios of the adaptive VR safety system, for example, through an external application.

Figure 2:
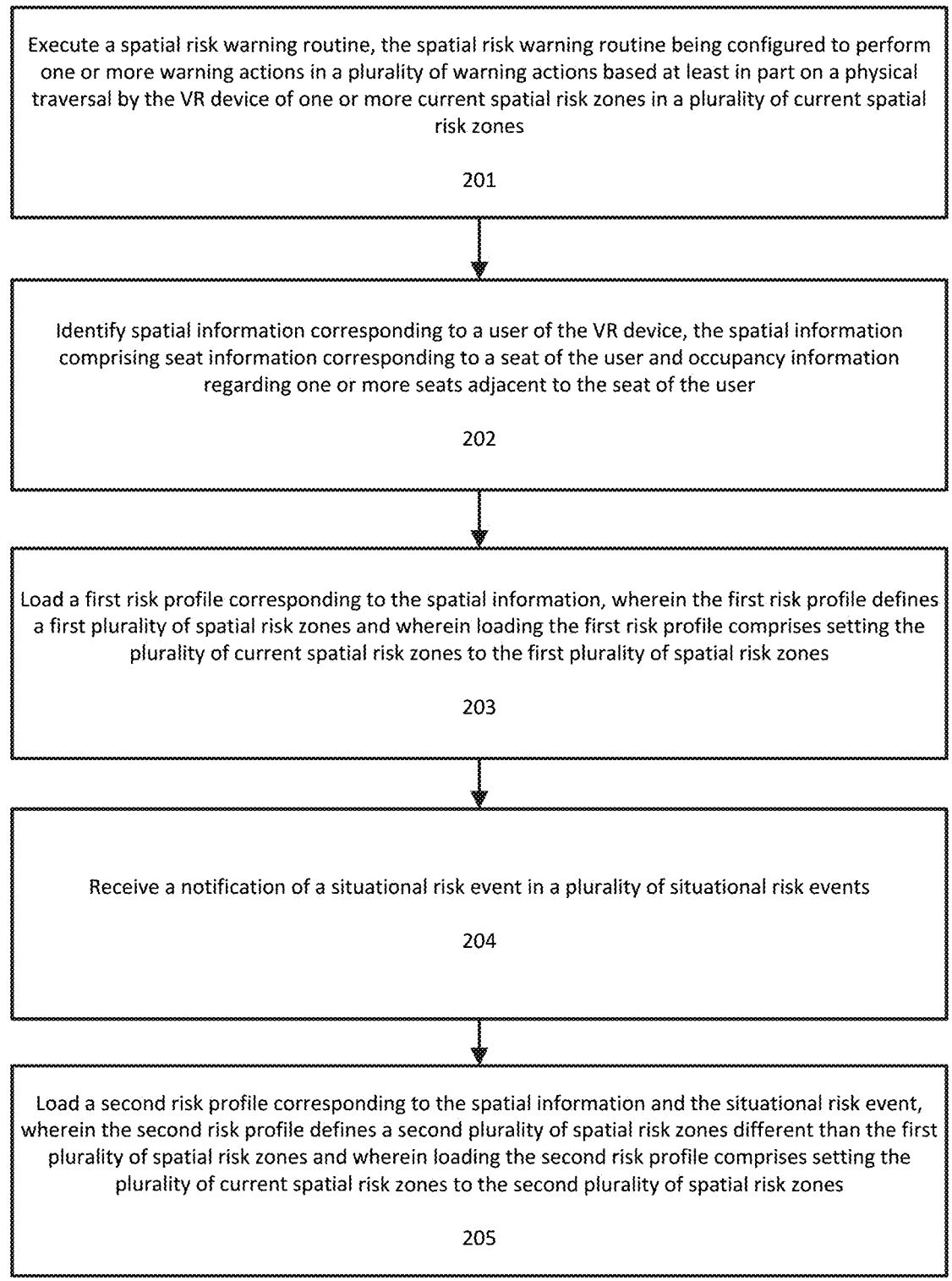
FIG. 2 illustrates a flowchart for a method of implementing an adaptive VR safety system according to an exemplary embodiment.

FIG. 2 illustrates a flowchart for a method of implementing an adaptive VR safety system according to an exemplary embodiment. At step 201 a spatial risk warning routine is executed by a VR device. As explained in greater detail below, the spatial risk warning routine is configured to perform one or more warning actions based at least in part on a physical traversal by the VR device of one or more current spatial risk zones in a plurality of current spatial risk zones. As used herein, traversal includes any physical entry, including a partial entry, of the VR device into a spatial risk zone. As discussed below, the spatial risk zones can optionally be defined as volumetric risk zones and/or orientation risk zones. In this case, traversal includes any physical entry, including partial entry, of the VR device into a volumetric risk zone and/or an orientation risk zone.

Figure 3:
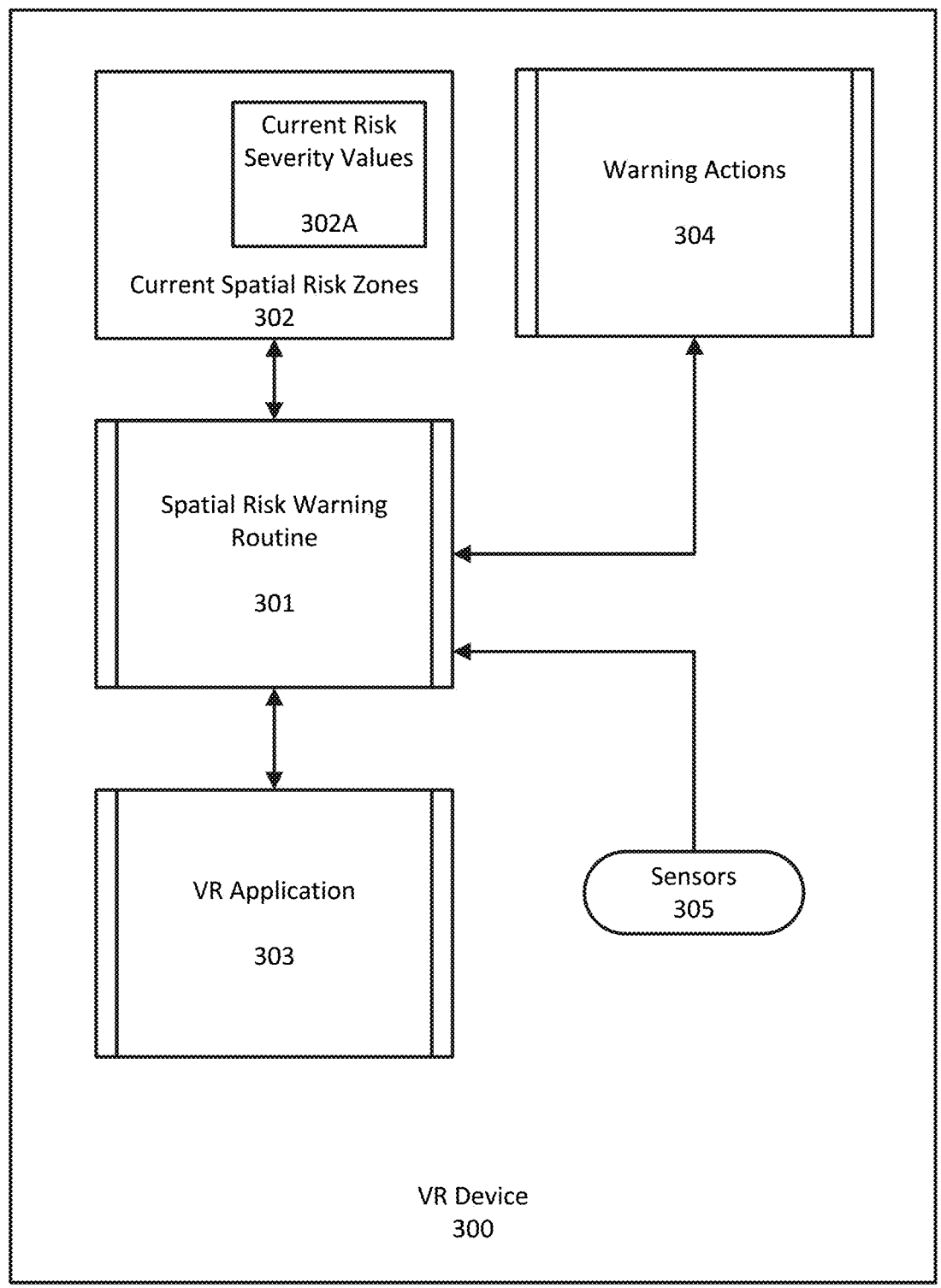
FIG. 3 illustrates a VR device 300 executing the adaptive VR safety system according to an exemplary embodiment.

FIG. 3 illustrates a VR device 300 executing the adaptive VR safety system according to an exemplary embodiment. As shown in FIG. 3, the VR device 300 executes a VR Application 303, which can be, for example, a game, an entertainment application, a media application, etc. The VR device 300 additionally executes spatial risk warning routine 301. As discussed previously, this spatial risk warning routine can be implemented via the SDK or can be part of another software package on the VR device 300. Although the spatial risk warning routine 301 is shown distinct from the VR Application 303, it is understood that the spatial risk warning routine 301 can be part of the VR Application 303. For example, the spatial risk warning routine 301 can be part of the native code of the VR Application 303 or can be a plugin that executes within the VR Application 303.

The VR device 300 additionally stores current spatial risk zones 302. The spatial risk zones are described in greater detail below. The current spatial risk zones define the spatial risk zones (e.g., volumetric zones and/or angular orientation zones) that currently delimit the boundaries of areas or orientations beyond which a risk of injury is presented to the user and/or to other users. As shown in the figure, the current spatial risk zones include a plurality of current risk severity values 302A. The plurality of current risk severity values 302A correspond to the plurality of current spatial risk zones, with each current risk severity value indicating the severity of risk associated with traversal of a corresponding current spatial risk zone. For example, a spatial risk zone corresponding to a solid object, such as a food tray, can have a risk severity value that is higher than a spatial risk zone corresponding to a soft object, such as a headrest.

The VR device 300 additionally stores a one or more possible warning actions 304. The warning actions are subroutines configured to cause the VR device to output different types of warnings to the user and can be selected based upon the particular current spatial risk zone that is traversed and/or the associated current risk severity values associated with those current spatial risk zones.

The warning actions can include, for example, a visual warning displayed on a display of the VR device, a three-dimensional mesh of the one or more current spatial risk zones displayed on the display of the VR device, an audio warning transmitted through an audio output of the VR device, a haptic feedback warning transmitted through the VR device, or switching the display of the VR device to a camera mode to display a pass-through image captured by a camera of the VR device.

As shown in FIG. 3, the VR device also includes various positional sensors 305 that provide data to the spatial risk warning routine 301 that allows the system to determine when a spatial risk zone has been traversed. These sensors can include, for example, cameras, accelerometers, angular sensors, movement sensors, etc.

Although shown as a distinct element for the purpose of illustration, it is understood that the warning actions 304, the current spatial risk zones 302, and the current risk severity values 302A can be stored as part of the spatial risk warning routine 301.

Figure 4:
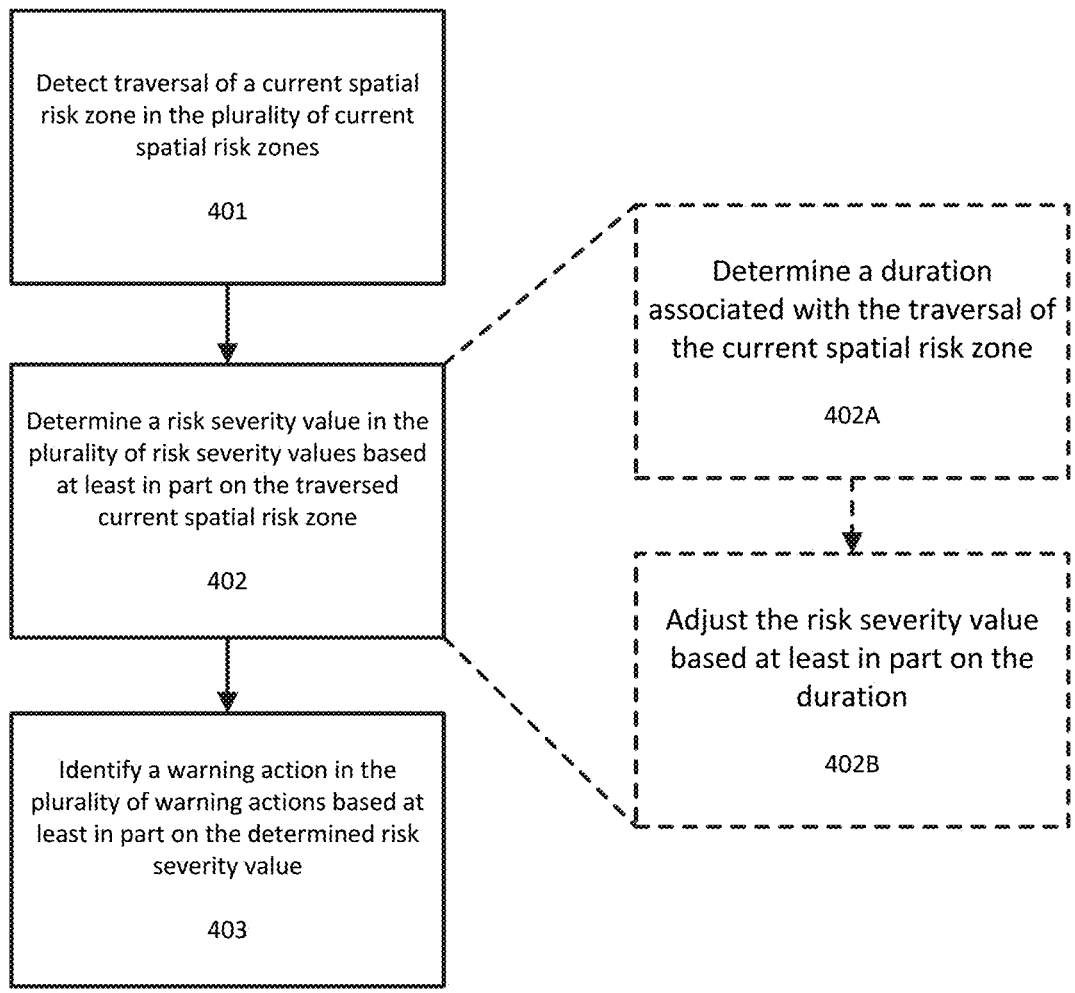
FIG. 4 illustrates a method for performing one or more warning actions based at least in part on a physical traversal by the VR device of one or more current spatial risk zones in a plurality of current spatial risk zones according to an exemplary embodiment.

FIG. 4 illustrates a method for performing one or more warning actions based at least in part on a physical traversal by the VR device of one or more current spatial risk zones in a plurality of current spatial risk zones according to an exemplary embodiment.

At step 401 traversal of a current spatial risk zone in the plurality of current spatial risk zones is detected. As discussed below, this step can vary depending on the type of current spatial risk zone.

As will be discussed below, the "current" risk zones can be set after spatial information corresponding to a user is identified (e.g., after a user selects a seat and a space arrangement). After spatial information is identified, two separate collections of risk zones are loaded. A first set of risk zones is defined for position and size (volume) in space and another set of risk zones is identified for orientation. Each risk zone, independently of their type, is accompanied by a set of risk values. The risk values define the risk's severity and, optionally, the time that the system should take to react when a risk zone is crossed. Optional sensitivity or smoothing parameters can also be added to the set of risk values.

Figure 6:
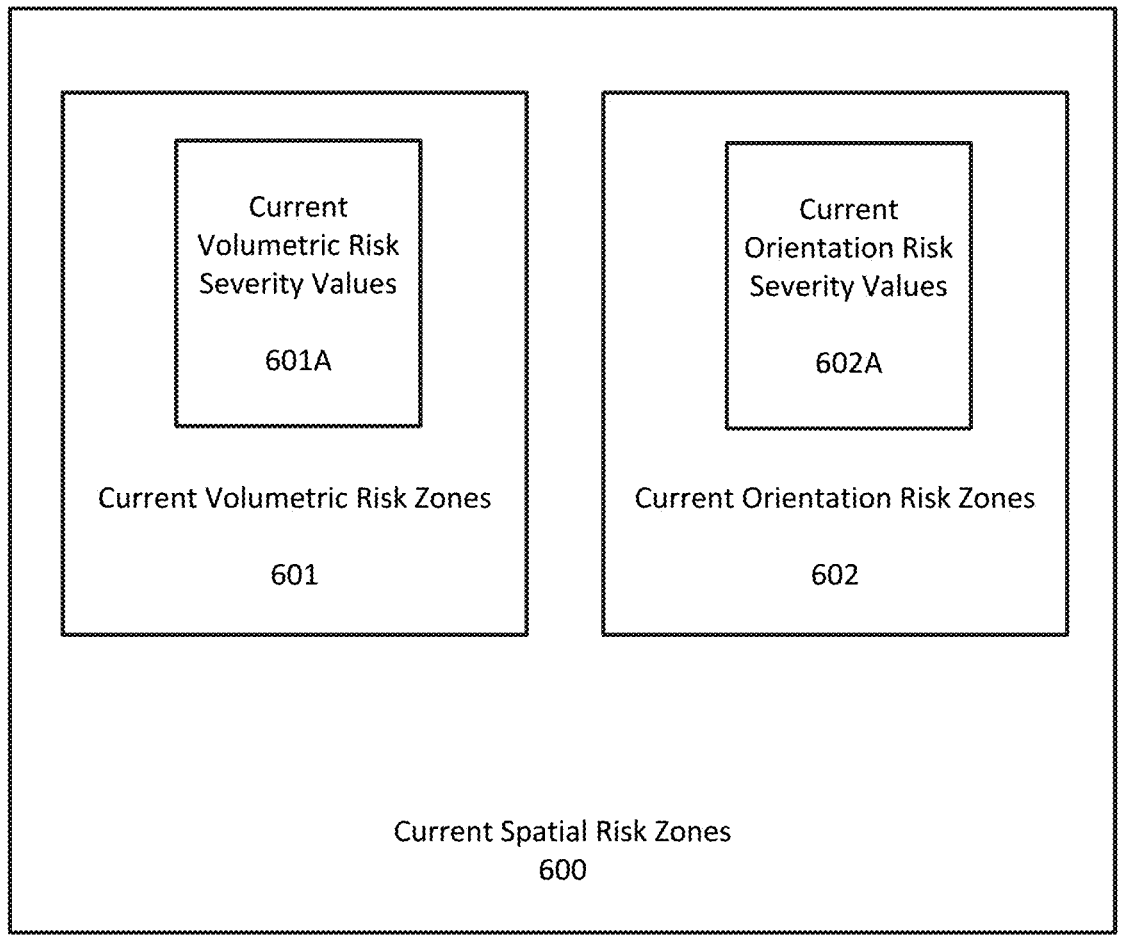
FIG. 6 illustrates different types of current spatial risk zones 600 according to an exemplary embodiment.

FIG. 6 illustrates different types of current spatial risk zones 600 according to an exemplary embodiment. As shown in FIG. 6, the current spatial risk zones 600 can include current volumetric risk zones 601 having corresponding current volumetric risk severity values 601A and current orientation risk zones 602 having corresponding current orientation risk severity values 602A.

Volumetric risk zones define spatial volumes (e.g., the position and size of a spatial volume) around the VR user that correspond to different risks. For example, a current volumetric risk zone can include a spatial volume corresponding to a seat in front of the user.

Orientation risk zones define angular orientations of the VR device and the head of the user (along one or more axes of rotation, such as pitch, yaw, and/or roll), that correspond to different risks. For example, a yaw beyond a certain angular position may indicate a risk corresponding to an adjacent passenger (e.g., appearing to gaze at an adjacent passenger or making contact with an adjacent passenger).

Considering the two types of spatial risk zones (volume/volumetric and orientation), the system utilizes two types of boundary crossing detection algorithms to detect traversal of a spatial risk zone. A first boundary crossing detection algorithm detects if the user crosses with their head or their hands a given volume in space, and a second boundary crossing detection algorithm detects if the head orientation of the user enters a given orientation area, as discussed below. Volumetric risk zones are alternatively referred to herein as "v-risk zones" and to orientation risk zones are alternatively referred to herein as "o-risk zones."

Figure 7:
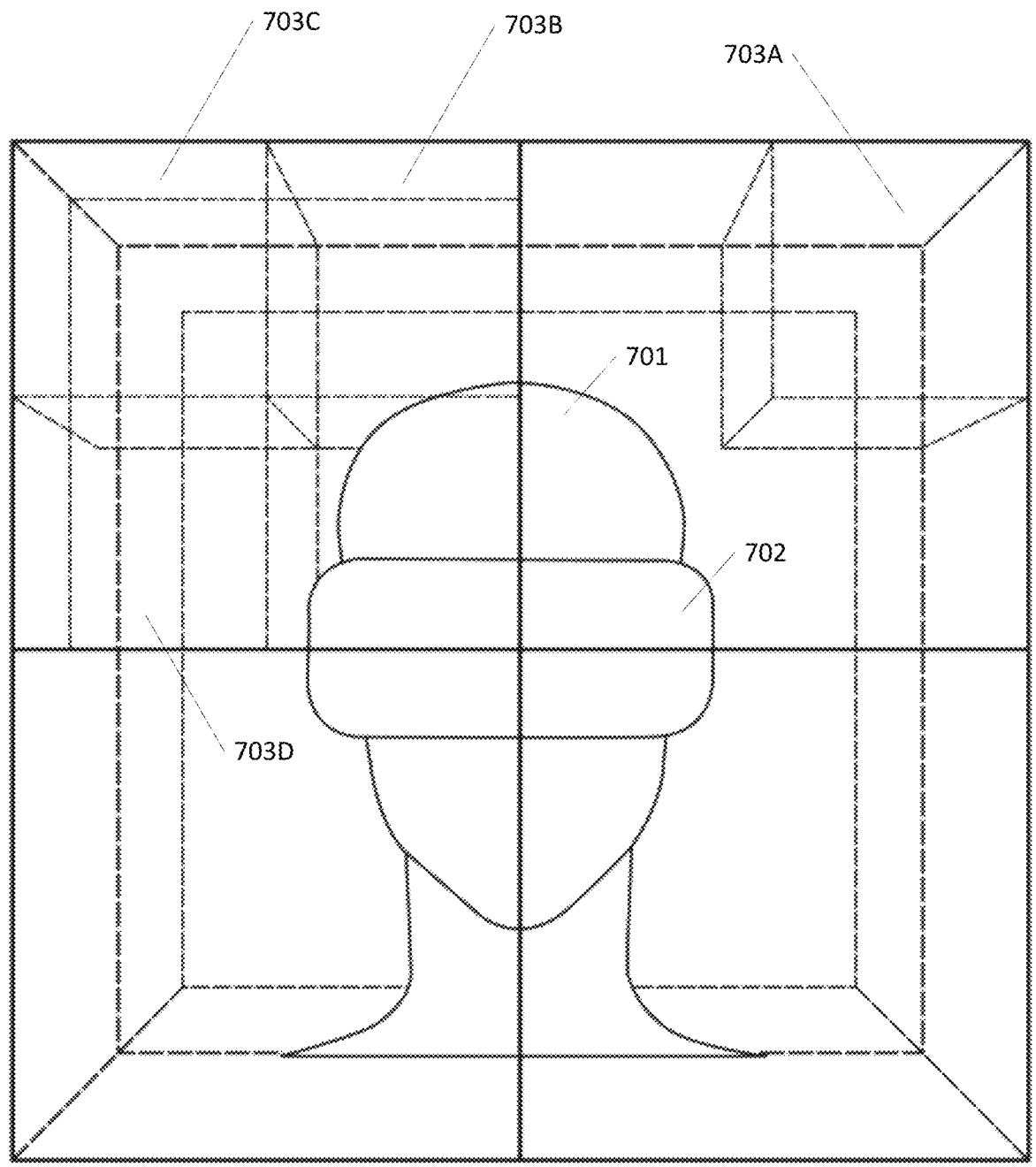
FIG. 7 illustrates an example of volumetric risk zones according to an exemplary embodiment.
Figure 25:
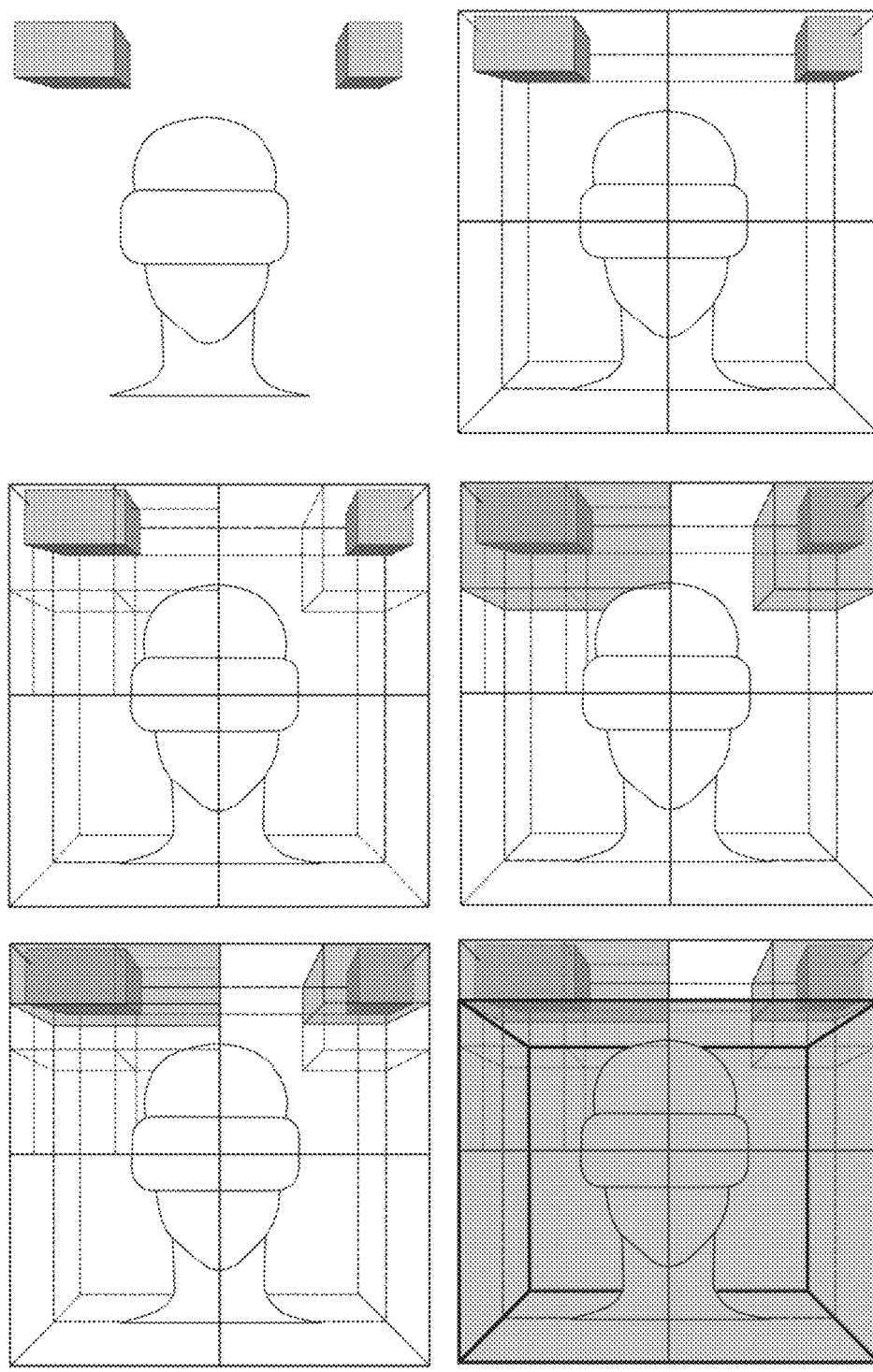
FIG. 25 illustrates how the space recommendation/optimal positioning system processes the space arrangement information input according to an exemplary embodiment.

FIG. 7 illustrates an example of volumetric risk zones according to an exemplary embodiment. As shown in the figure, the volume can be divided into cuboid regions, such as region 703B and 703D. Some of these regions, portions of these regions, or groups of regions, can define volumetric risk zones, such as risk zones 703A and 703C corresponding to physical obstructions that are near the head 701 of a user wearing the VR device 702. Note that all of the volumetric zones shown in FIG. 7 are not required to be "risk" zones and can be defined as risk zones depending on the particular circumstances of the user, as will be discussed further below. FIG. 25 illustrates an example of volumetric zones that include risk zones, due to the presence of obstructions/objects in those zones. In this case, the dark boxes in FIG. 25 indicate obstructions that should be avoided. Additionally, the volumetric zones are not required to be equally sized and can have varying sizes and/or shapes.

Referring back to step 401 of FIG. 4, when the plurality of current spatial risk zones include a plurality of volumetric risk zones, then physical traversal by the VR device of one or more current spatial risk zones in a plurality of current spatial risk zones can include displacement of the VR device into a spatial volume corresponding to a volumetric risk zone in the plurality of volumetric risk zones.

Once the bounding box of each risk zone is created, a collision detection system is utilized to determine when the user's head or hands crosses one of these areas. The volume collision detection algorithm can be used to detect collisions of both head and hands of the user with the volumetric risk zones.

For this step, a volume collision detection algorithm can be used that receives as an input a set of v-risk zones defined by the administrator, loaded from a file or other storage, or procedurally generated. These are the "current" volumetric risk zones 601 shown in FIG. 6. The v-risk zones are defined by a position and their size, and they are accompanied by risk/risk severity values. The position input can be a three-dimensional point or vector with origin (0,0,0) the position of the VR camera (head position of the user), which defines the distance from the VR camera. The size can be a three-dimensional variable that defines the shape of each risk zone (cuboid), or it can simply be one number that defines the size of a cube. With this information, the system can generate a box collider for each risk zone. The risk zones optionally should not overlap. In the event that a particular configuration contains overlapping risk zones, the system can randomly choose to react to one of the overlapping collision detections. The system can also prioritize certain risk zones within overlapping zones based on severity values associated with each risk zone, so that higher risk zones are given precedence.

It is not necessary to cover 100% of the surrounding volume of the user with risk zones. To improve performance, optimize processing speed, and minimize required storage, the quantity of risk zones can be minimized to only necessary risk zones. When current volumetric risk zones are loaded for a particular configuration/spatial arrangement, only the volumetric zones which are designated "risk" zones can be loaded, along with associated risk values, in order to improve performance. Additionally, the defined risk zones can cover a larger space than the actual physical fixtures. This ensures that the area before a particular fixture is defined as risky and the system reacts before the user reaches the actual fixture.

FIGS. 8A-8C illustrate the axes used to define orientation risk zones and example orientation risk zones according to an exemplary embodiment. The axes can include pitch, yaw, and roll (which is not used to define orientation risk zones in this example but would cover orientations where the user tilts their head to one side or another) and all have as their central point or baseline (i.e., angular position=0) the VR device 802 on the head 801 of the user when the user is facing in the default (i.e., forward) direction.

FIG. 8B illustrates angular measurements corresponding to pitch according to an exemplary embodiment. As shown in FIG. 8B, when the user is looking neither up nor down, the angle is 0 degrees (also referred to as 360 degrees). When the user looks straight down the angle is 90 degrees and straight up is 270 degrees (which can also be referred to as −90 degrees). Of course, it is understood that these angle measurements are provided only as an example and a frame of reference for the discussion of orientation risk zones and the actual angle values used to delimit angular positions along the pitch axis can vary.

FIG. 8C illustrates angular measurements corresponding to yaw according to an exemplary embodiment. As shown in FIG. 8C, when the user is looking neither left nor right, the angle is 0 degrees (also referred to as 360 degrees). When the user looks right the angle is 90 degrees and left is 270 degrees (which can also be referred to as −90 degrees). Of course, it is understood that these angle measurements are provided only as an example and a frame of reference for the discussion of orientation risk zones and the actual angle values used to delimit angular positions along the yaw axis can vary.

The example in FIG. 8A defines eight equal size orientation risk zones as follows:

Zone 1:[pitch_min=0°,pitch_max=90°,yaw_min=−90°,yaw_max=0°];

Zone 2:[pitch_min=0°,pitch_max=90°,yaw_min=0°,yaw_max=90°];

Zone 3:[pitch_min=−90°,pitch_max=0°,yaw_min=0°,yaw_max=90°]

Zone 4:[pitch_min=−90°,pitch_max=0°,yaw_min=−90°, yaw_max=020 ]

Zone 5:[pitch_min=0°,pitch_max=90°, yaw_min=180°,yaw_max=−90°]

Zone 6:[pitch_min=0°,pitch_max=90°,yaw_min=90°, yaw_max=180°]

Zone 7:[pitch_min=−90°,pitch_max=0°, yaw_min=90°,yaw_max=180°]

Zone 8:[pitch_min=−90°,pitch_max=0°, yaw_min=180°,yaw_max=−90°]

The four front orientation risk zones in the example of FIG. 8A include
risk zone 803A, which corresponds to a pitch of 0 to 90 degrees, and a yaw of 0 to 90 degrees, risk zone 803B, which corresponds to a pitch of 0 to 90 degrees and a yaw of 0 to −90 degrees, risk zone 803C, which corresponds to a pitch of 0 to −90 degrees and a yaw of 0 to 90 degrees, and risk zone 803D, which corresponds to a pitch of 0 to −90 degrees and a yaw of 0 to −90 degrees.

All of the orientation zones identified in FIG. 8A are not required to be "risk" zones and the zones that are designated as risk zones can depend upon the particular seating arrangements of the user, as will be discussed in greater detail below. Additionally, the orientation zones are not required to be equally sized and can have varying sizes.

Of course, these risk zones are presented only as an example of orientation risk zones for the purpose of explanation, and various different orientation risk zones can be defined, including orientation risk zones that utilize roll, orientation risk zones that break each axis up into more or fewer segments, orientation risk zones that utilize only pitch or only yaw, etc.

Figure 9:
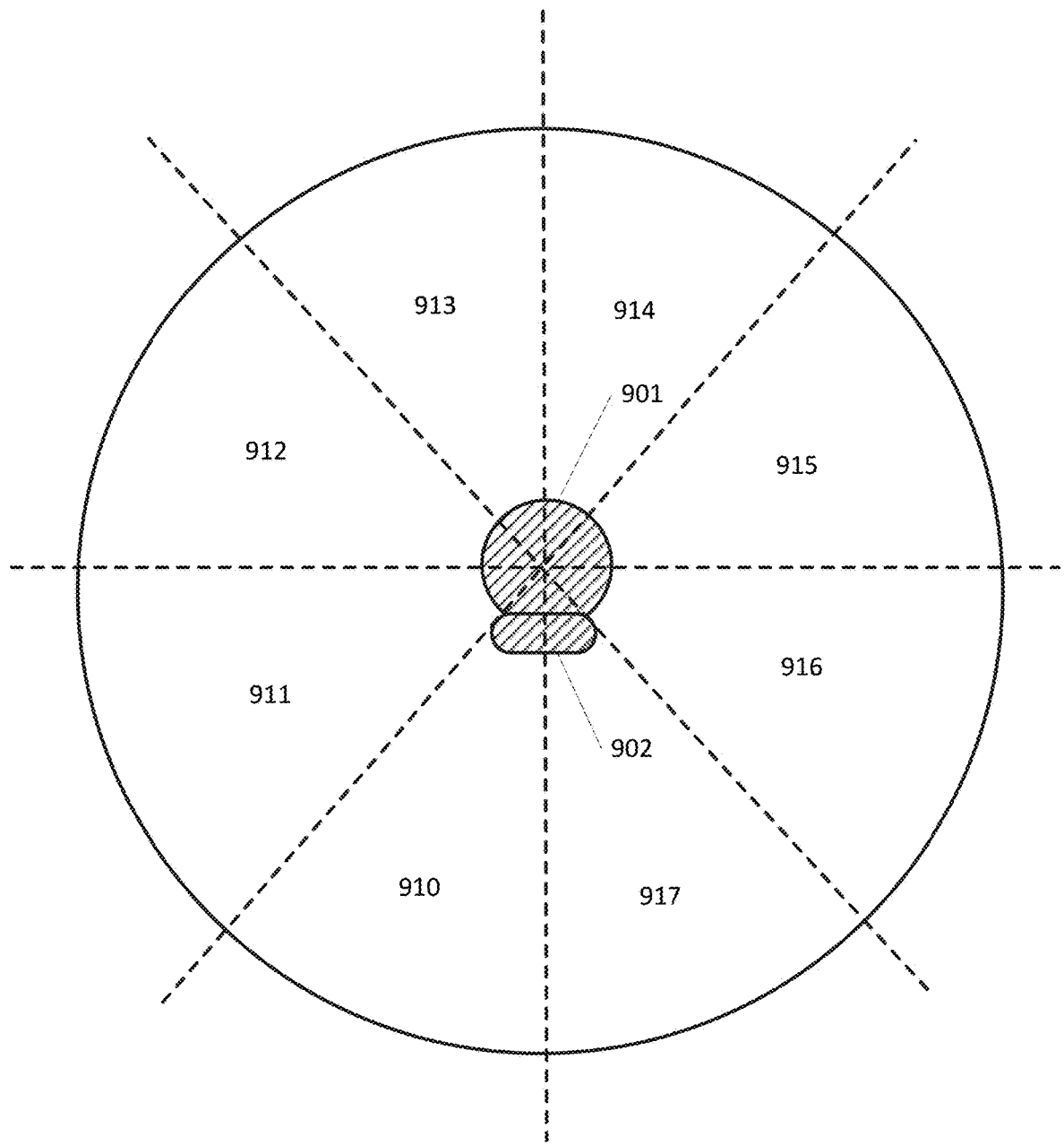
FIG. 9 illustrates an example of orientation zones defined solely on the basis of yaw according to an exemplary embodiment.

Another example of orientation zones can utilize only a single axis, such as yaw. FIG. 9 illustrates an example of orientation zones defined solely on the basis of yaw according to an exemplary embodiment. As shown in FIG. 9, which is a top-down view of the user, the zones are defined relative to the VR device 902 on the head 901 of the user, and include:

Zone 1(numeral 910):[yaw_min=0°,yaw_max=45°]

Zone 2(numeral 911):[yaw_min=45°,yaw_max=90°]

Zone 3(numeral 912):[yaw_min=90°,yaw_max=135°]

Zone 4(numeral 913):[yaw_min=135°,yaw_max=180°]

Zone 5(numeral 914):[yaw_min=180°,yaw_max=225°]

Zone 6(numeral 915):[yaw_min=225°,yaw_max=270°]

Zone 7(numeral 916):[yaw_min=270°,yaw_max=315°]

Zone 8(numeral 917):[yaw_min=315°,yaw_max=0°]

It is understood that the orientation risk zone axes (e.g., yaw, pitch, etc.) are defined along a 360 circle, and that negative degrees or positive degrees from a starting position can be used interchangeably. For example, 225° is equivalent to −135°. Additionally, these orientation zones are presented as an example and other variations are possible. For example, four orientation zones can be utilized, corresponding to different yaw quadrants. Orientation zones can also be defined with varying angle ranges. Additionally, all the orientation zones do not need to be designated as "risk" orientation zones but can depend on the user's particular seating arrangement or other factors. When current orientation risk zones are loaded for a particular configuration/spatial arrangement, only the orientation zones which are designated "risk" zones can be loaded, along with associated risk values, in order to improve performance.

Referring back to step 401 of FIG. 4, when the plurality of current spatial risk zones include a plurality of orientation risk zones, then physical traversal by the VR device of one or more current spatial risk zones in a plurality of current spatial risk zones can include rotation of the VR device into an angular position corresponding to an orientation risk zone in the plurality of orientation risk zones.

For this step, an orientation detection algorithm can be used to allow the safety system to react, for example, when a user annoys nearby people by pointing their gaze ("looking") towards nearby people. The algorithm can be based on risk zones defined by head rotation thresholds. Similar to the v-risk zones, the system can receive the set of o-risk zones on the orientation space around the camera position. As discussed above, the o-risk zones can be defined by a min and a max rotation threshold in a pitch and/or yaw axis around the VR camera (head of the user). Like the v-risk zones, the o-risk zones are accompanied by risk values.

Once the o-risk zones are known, the system can periodically check if the rotation of the user's head enters one of the defined thresholds sets and can trigger a trespassing event with associated risk values when a user's head enters one of the defined thresholds. The periodic checking can occur according to variable intervals, such as multiple times per second, every second, every few seconds, etc. Ideally, the periodic checking occurs multiple times per second to ensure user safety. Unlike the v-risk zones, the o-risk zones can be triggered only by head movement, as opposed to head and/or hand movement (for v-risk zones).

The two spatial risk zone traversal detection algorithms (i.e., v-risk zone traversal and o-risk zone traversal) can be combined or used individually, depending on the scenario. For example, a particular use-case may not involve other nearby seated people. In this case, there is no risk of annoying a neighbor and rotation detection and o-risk zones can be omitted. In another example, when the VR headset only supports 3 degrees of freedom (3DoF) tracking, rotation detection and o-risk zones can be the primary mechanism for risk detection, since positional tracking is not supported. Such headsets may be used for seated experiences where positional displacements are not possible or necessary.

In another example, the headset might support 6DoF, but the system may only provide 3DoF camera movements to unconsciously restrict the user's movements (i.e., the user does not perceive spatial movements). In this case, the user still has the freedom to move around and run the risk of bumping into fixtures. Although there is no visual feedback of those movements, positional tracking can be still used in the background to detect collisions with the positional risk zones and warn the user accordingly.

At step 402 of FIG. 4 a risk severity value in the plurality of risk severity values is determined based at least in part on the traversed current spatial risk zone. As discussed earlier, each of the current spatial risk zones can correspond to a risk severity value. In the simplest case, the determination of a risk severity value can include looking up a corresponding risk severity value for a traversed current spatial risk zone.

As shown in FIG. 4, the step of determining a risk severity value in the plurality of risk severity values based at least in part on the traversed current spatial risk zone can include sub-steps 402A and 402B. At step 402A a duration associated with the traversal of the current spatial risk zone is determined. At step 402B the risk severity value is determined based at least in part on the duration. There are multiple different ways that a duration associated with the traversal of the current spatial risk zone can be used to determine or adjust the risk severity value, as explained below.

Risk zones can be associated with minimum durations. When minimum durations are utilized, the system will utilize the duration to determine whether to assign the risk severity value and/or whether to adjust the risk severity value. If the duration of traversal in the risk zone is greater than a predefined duration time, the safety system can assign the corresponding risk severity value or adjust the previously determined risk severity value corresponding to the current spatial risk zone. In this case, the minimum duration time is a delay that can be used to smooth the feedback to the user and skip unnecessary reactions in the event that the user stays in a risk zone for very short periods of time. In other words, if a user enters a current spatial risk zone only briefly, for less than the minimum duration time associated with that current spatial risk zone, then either no risk severity value is assigned, a risk severity value of zero can be assigned, or the previously determined risk severity value can be adjusted to zero.

The system can also adapt or adjust risk severity values based on duration. This adaptive risk severity process can utilize the initial duration associated with the traversal and/or subsequent duration values that track the time that has elapsed since a previous warning was issued. The adaptive risk severity process can be used to trigger weighted reactions based on the initially defined risk severity and the duration within the risk zone. For example, if a user a "looks" toward another person (i.e., enters an o-risk zone) for a first duration, the safety system can assign a risk severity value that corresponds to a low risk severity warning (e.g., the application reacts with a simple pop-up warning). If the user ignores the warning and remains in the o-risk zone, staying more than a predetermined amount of time (i.e., an escalation threshold), the system can adjust the risk severity value upwards to a higher risk severity value and trigger another warning event associated with a higher risk severity (e.g., the application enables the system's see-through functionality). This process can continue to escalate again with a more severe risk severity value and a more severe warning if the user continues to stay in the o-risk zone. The amount that the risk severity value is adjusted and the escalation thresholds for each escalation can be defined in a database and/or on the VR device for each current spatial risk zone.

Figure 11:
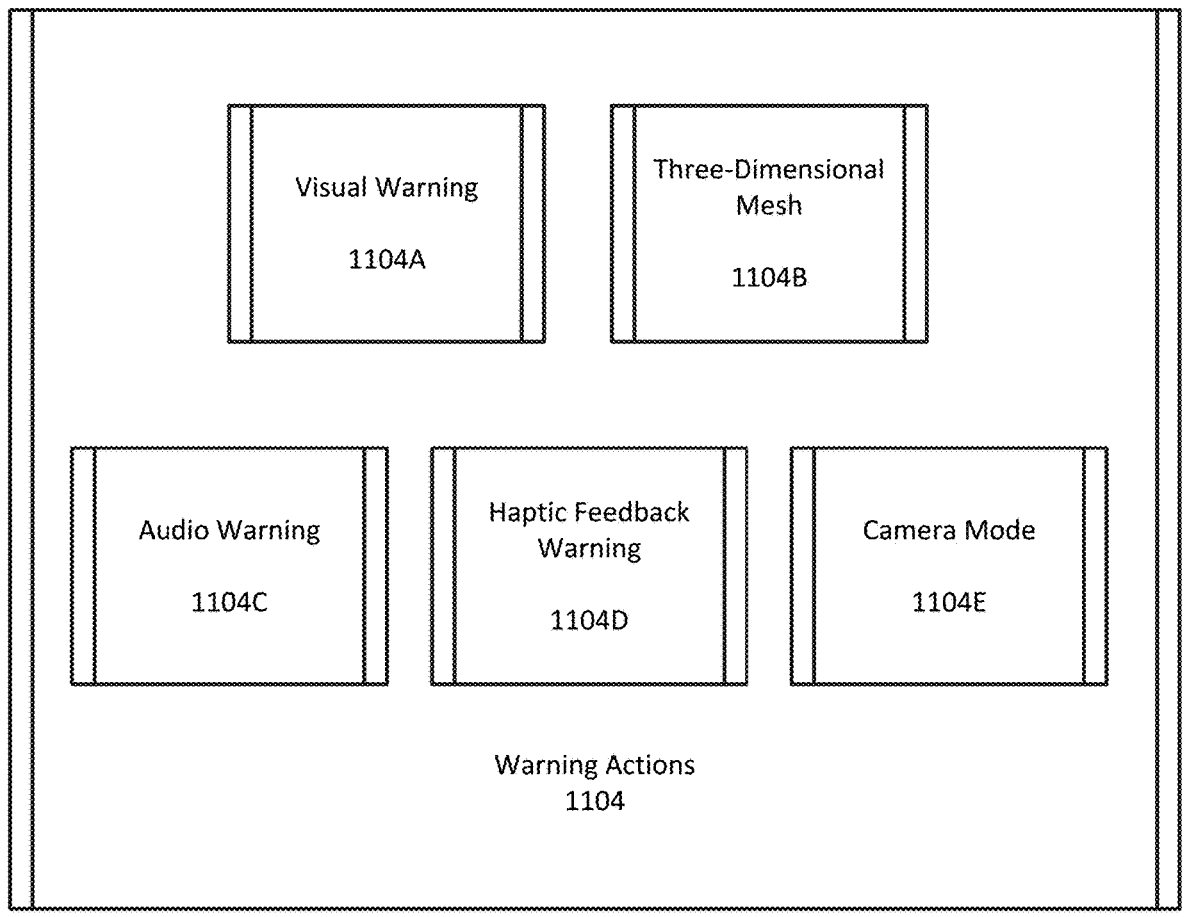
FIG. 11 illustrates an example of warning actions 1104 that can be utilized by the system according to an exemplary embodiment.

At step 403 a warning action is identified based at least in part on the determined and/or adjusted risk severity value. Different warning actions can correspond to different risk severity values or ranges of risk severity values. FIG. 11 illustrates an example of warning actions 1104 that can be utilized by the system according to an exemplary embodiment. As shown in FIG. 11, warning actions 1104 can include visual warnings 1104A, a three-dimensional mesh 1104B, audio warnings 1104C, haptic feedback warnings 1104D, and camera mode warnings 1104E.

Visual warnings 1104A can include, for example, textual or graphical alerts, color coded warnings (i.e., red text), and/or images or pictures displayed on the display of the VR device. The visual warnings can include flashing text or graphical alerts, with the frequency of the flashing being adjusted based upon risk severity values. For example, a low risk severity value can correspond to a low frequency of flashing and a higher risk severity value can corresponding to a high frequency of flashing. Visual warnings can be integrated into a particular VR application, into the spatial risk warning routine (e.g., via the SDK), and/or based on the system's messaging (e.g., using Android's toast messages as a way to notify the user).

The three dimensional mesh warning 1104B can display a three dimensional mesh of the user's surrounding area or a portion of the surrounding area onto the display of the VR device. This mesh can be superimposed on the VR content and/or can take the place of the VR content that would ordinarily be displayed. Optionally, the three dimensional mesh can display mesh only corresponding to regions that are part of, or adjacent to, one or more current spatial risk zones that are currently being traversed.

Audio warnings 1104C can include pre-recorded voice messages or synthesized voice messages warning the user of danger or instructing the user to take a certain action, such as averting their gaze. The audio warnings 1104C can also include beeps, rings, alarms, or other noises to alert the user regarding any risks that are present.

Haptic feedback warnings 1104D can include any touch based output from the VR device. For example, the VR device can vibrate or pulse. The duration, frequency, or intensity of the haptic feedback or vibrations can depend on the risk severity value associated with a particular warning.

Camera mode warnings 1104E can replace the display of the VR device with a feed from a camera of the VR device in order to display any risks that surround the user. A portion of the display or the entirety of the display can be replaced when the camera mode warnings are utilized. Optionally, a portion of the VR display can be maintained (e.g., a portion that does not relate to the location of a particular risk).

As explained above, the safety system is able to detect when a user has exceeded or certain rotation or volumetric thresholds that are associated with each o-risk zone and/or v-risk zone, respectively. A set of custom reactions/warnings can be defined and implemented for each scenario/application. As explained, the warnings can vary between audio or haptic warnings, visual notifications, boundary mesh representations, an overlay of the 3D model of the physical space representation, see-through camera input of the real world and/or other warnings. Each particular warning can be associated with a particular risk severity value that triggers the warning as well as the o-risk zones and/or the v-risk zones that have been traversed. For example, the traversal of a certain o-risk zone in conjunction with a certain v-risk zone can result in particular risk severity value being assigned and a particular warning or sequence of warnings being utilized. The safety system then triggers the warning that is associated with the severity value of the trespassed risk zone or zones. The warnings and severity pairings can be stored on a server or database in communication with the VR device and sent to the VR device upon request. Alternatively or additionally, the pairings can be directly stored on the VR device (e.g., in a configuration file).

In certain configurations, the safety system can track the user's motion through multiple different current spatial risk zones and use that information to adjust the risk severity value.

Figure 5:
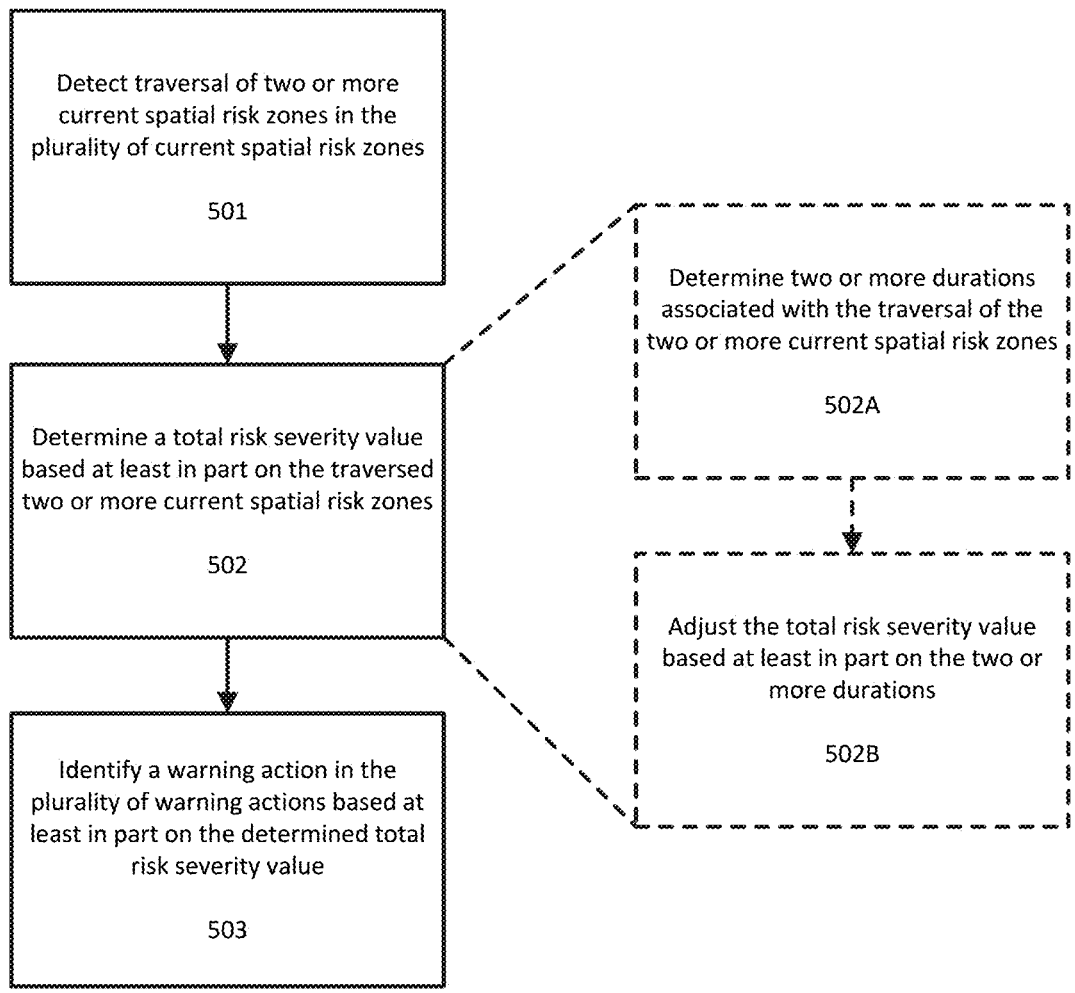
FIG. 5 illustrates a flowchart for identifying a warning action based on traversal of two or more current spatial risk zones according to an exemplary embodiment.

FIG. 5 illustrates a flowchart for identifying a warning action based on traversal of two or more current spatial risk zones according to an exemplary embodiment. At step 501 traversal of two or more current spatial risk zones in the plurality of current spatial risk zones is detected. This detection can be performed in a manner similar to the detection performed for a single current spatial risk zone, discussed above. The two or more traversed current spatial risk zones can be current orientation risk zones, current volumetric risk zones, and/or a combination of the two.

At step 502 a total risk severity value is determined based at least in part on the traversed two or more current spatial risk zones. This step can include combining the risk severity values (or adjusted risk severity values) corresponding to each of the traversed current spatial risk zones in a variety of different ways. For example, the risk severity values can be added together, combined in some other way, or analyzed in sequence (as discussed below) to determine the total risk severity value.

As discussed above, the total risk severity value can be adapted based upon the multiple spatial risk zones traversed. The safety system can also factor in the risk severity values corresponding to previous spatial risk zones traversed when determining a total. In particular, the safety system can check if a user is crossing between risk zones with different risk severities when determining the total risk severity values. For example, when the user passes from a zone having risk severity=0 to a zone having risk severity=4, the system can assign a larger total risk severity value to the traversal than a transition from a zone having risk severity=3 to a zone having risk severity=4.

A smoothing method can be used to determine total risk severity when the user traverses between spatial risk zones with different risk severity values. This smoothing method can be the product of the delta (i.e., net difference) between risk severities multiplied by the newer/more recent risk zone severity. This smoothing method can be defined as f(x,y), as follows:

$$f(x,y)=y*([(y-x)>0])$$

Where x is the risk severity of the previous spatial risk zone, and y is the risk severity of the newer/more recent spatial risk zone. The total risk severity value has the following range [0, max_severity]. This range could be mapped to [0, max_severity] after smoothing is applied in order to reflect initially defined severity-reactions pairs.

The function f(x, y) can be used to determine the total risk severity and corresponding warning when entering a new risk zone, or to directly determine an adapted severity for the risk zone entered. An example for this smoothing approach is explained below.

For this example, assume that the o-risk zones are defined as follows:

Zone 1(left-top zone):[pitch_min=−90°,pitch_max=−45°,yaw_min=45°, yaw_max=90°],severity=5

Zone 2(left-bottom zone):[pitch_min=−90°,pitch_max=−45°,yaw_min=0°, yaw_max=45°],severity=2

Zone 3(right-top zone):[pitch_min=45°,pitch_max=90°,yaw_min=45°, yaw_max=90°],severity=5

Zone 4(right-bottom zone):[pitch_min=45°,pitch_max=90°,yaw_min=0°, yaw_max=45°],severity=2

If a user moves from a no-risk zone to Zone 2, which has a risk severity of 2, then f(x, y) returns a total risk severity value of 4 ((2−0)*2). This total risk severity value can be mapped to a "level 1" warning reaction (for example, a textual alert). However, if a user moves from Zone 2 (having a risk severity value of 2) to Zone 1 (having a risk severity of 5), then f(x, y) will return a total risk severity value of 15 ((5−2)*5). The total risk severity of 15 can, for example, be mapped to a "level 3" warning reaction (e.g., a mesh overlay and a textual warning). In this example, if a user moves from a no-risk zone to Zone 1, then f(x, y) would return a total risk severity value of 25 ((5−0)*5), which can be the maximum severity. In this case, the total risk severity value of 25 can be mapped to a "level 5" warning (e.g., a camera view display, haptic feedback, and audio warnings).

The smoothing parameters can be enabled or disabled by the safety system according to settings communicated by a server in communication with the VR device (or a configuration file stored on the VR device) and/or set by a system administrator. In practice, administrators can use smoothing parameters to balance between safety necessities and the invasiveness of the system by utilizing the appropriate warnings and adjusting risk severities, timings, and smoothing parameter formulation.

As shown in FIG. 5, step 502 can optionally include steps 502A and 502B. At step 502A two or more durations associated with the traversal of the two or more current spatial risk zones are determined. At step 502B the total risk severity value is adjusted based at least in part on the two or more durations. These steps are similar to steps 402A and 402B, described above, and can be performed similarly to those steps for each of the two or more traversed spatial risk zones.

At step 503 a warning action is identified based at least in part on the determined total risk severity value. This step is similar to step 403 of FIG. 4 and can be performed similarly to that step, utilizing the total (and optionally adjusted) risk severity value determined in step 502 rather than the single (and optionally adjusted) risk severity value determined in step 402.

Figure 10:
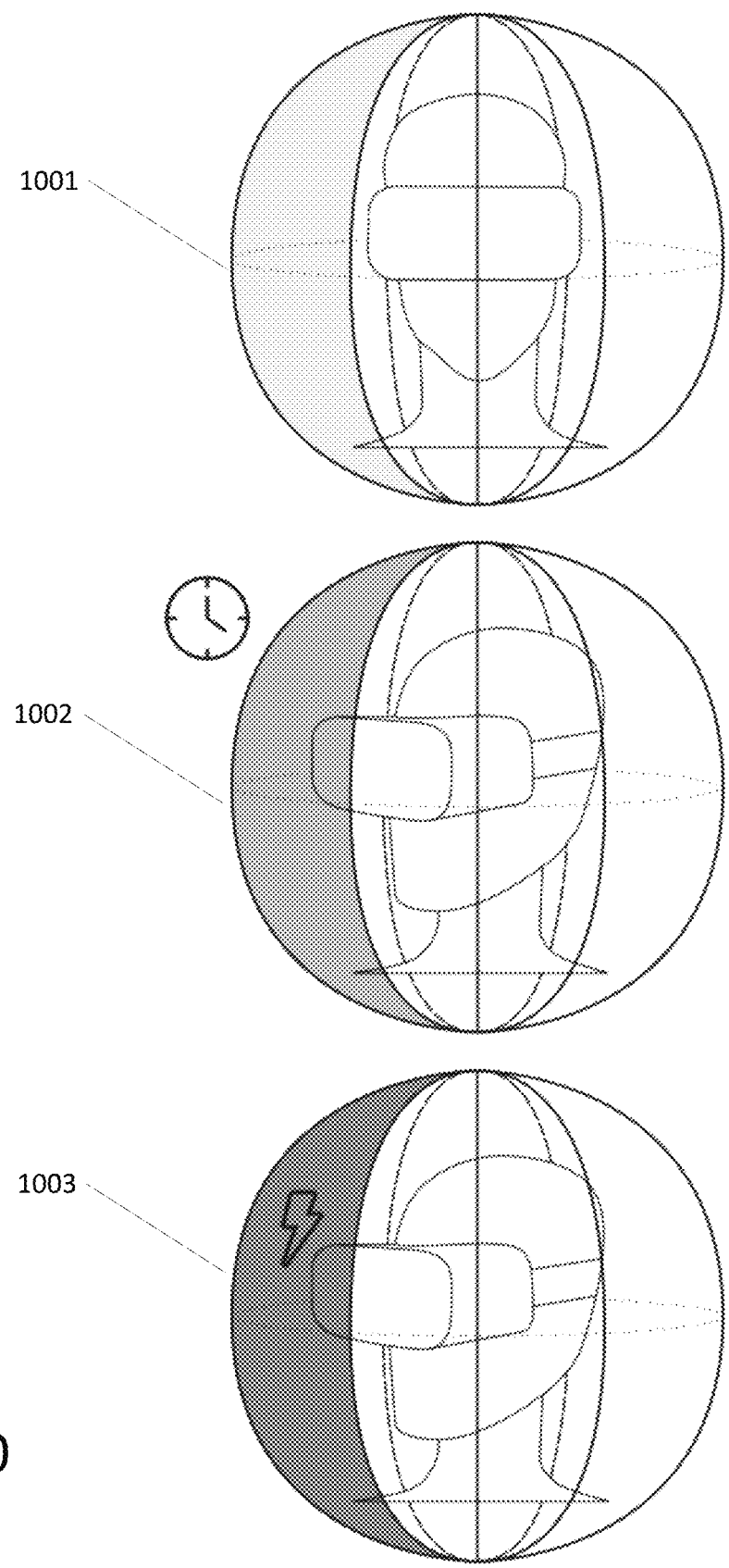
FIG. 10 illustrates examples of the spatial risk zone traversal and warning process according to an exemplary embodiment.

FIG. 10 illustrates examples of the spatial risk zone traversal and warning process according to an exemplary embodiment. The examples of FIG. 10 illustrate the rotation of the user's head (and the VR device) into orientation risk zones and the resulting processes. When the user wears the VR device, as shown in 1001, the safety system tracks the user's head rotation and resulting orientation (e.g., via hardware in the VR device such as a gyroscope or accelerometer or via a combination of hardware and software such as a camera on the VR device and orientation determination software). When the user traverses an o-risk zone, the system can wait a predetermined amount of time before assigning a risk severity value and triggering a warning, as shown in 1002. When either the required duration has passed or no duration is associated with the traversed orientation risk zone, a risk severity value is assigned to the traversal and a warning is output, as shown in 1003.

Returning to FIG. 2, at step 202 spatial information corresponding to a user of the VR device is identified. The spatial information can include seat information corresponding to a seat of the user and occupancy information regarding one or more seats adjacent to the seat of the user. The spatial information can also include one or more of the following:

- spatial positions and physical dimensions of one or more physical obstructions proximate to the user of the VR device;
- spatial positions and physical dimensions of one or more fixtures proximate to the user of the VR device;
- a spatial position and physical dimensions of a seat of the user;
- a spatial position and physical dimensions of the one or more seats adjacent to the seat of the user;
- physical dimensions of an area surrounding the user;
- physical attributes of the user; or
- physical attributes of one or more persons adjacent to the user.

Figure 12:
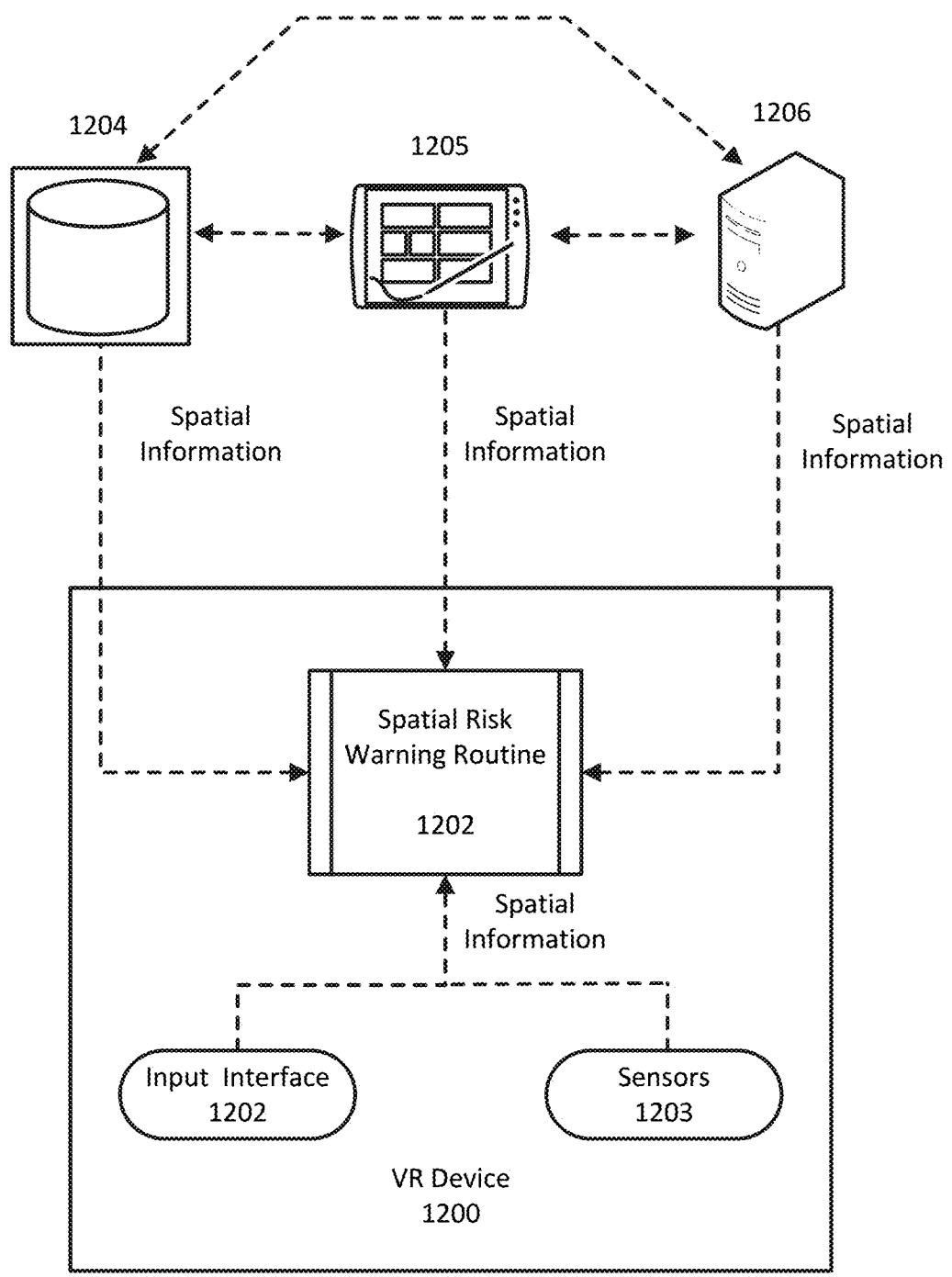
FIG. 12 illustrates possible sources of spatial information according to an exemplary embodiment.

The spatial information can be received from a variety of sources. FIG. 12 illustrates possible sources of spatial information according to an exemplary embodiment. As shown in FIG. 12, the spatial risk warning routine 1202 can receive spatial information from one or more remote devices on the network, such as a system hosting database 1204, remote device 1205, and/or a server 1206. On a flight the remote device 1205 can be, for example, an administrator device such as a flight attendant device that flight attendants can use to enter spatial information for a particular passenger. The server 1206 can be, for example, a flight server onboard the aircraft that stores the relevant information (such as seat information and passenger information). The database 1204 can be a customer, passenger, or flight database.

The spatial risk warning routine 1202 can also receive spatial information from an input interface 1202 of the VR device. The input interface can be, for example, a touch screen, a tactile interface (e.g., a remote, controller, or physical button on the device), a gesture or gaze based input interface, or any other type of input interface. Typically, it will be the user of the VR device that enters the spatial information using the input interface 1202.

The spatial risk warning routine 1202 can further receive spatial information via one or more sensors 1203 of the VR device 1200. The sensors 1203 can include, for example, an onboard camera that captures dimensions of a seat, the presence or absence of adjacent persons/passengers, or other spatial information.

The step of identifying spatial information corresponding to a user of the VR device can include receiving at least a portion of the spatial information from the user of the VR device via an input interface of the VR device. The step of identifying spatial information can also include receiving at least a portion of the spatial information from a server communicatively coupled to the VR device, receiving at least a portion of the spatial information from a remote device communicatively coupled to the VR device, determining at least a portion of the spatial information by querying a spatial information database, and/or determining at least a portion of the spatial information based at least in part on an analysis of sensor data from one or more sensors of the VR device. Examples of each of these methods of receiving and/or identifying spatial information are described below.

The step of identifying spatial information can also include automatically determining the spatial information using an artificial intelligence software component that takes user/passenger information, seat information, and/or flight information as input to determine the relevant spatial information.

Figure 13:
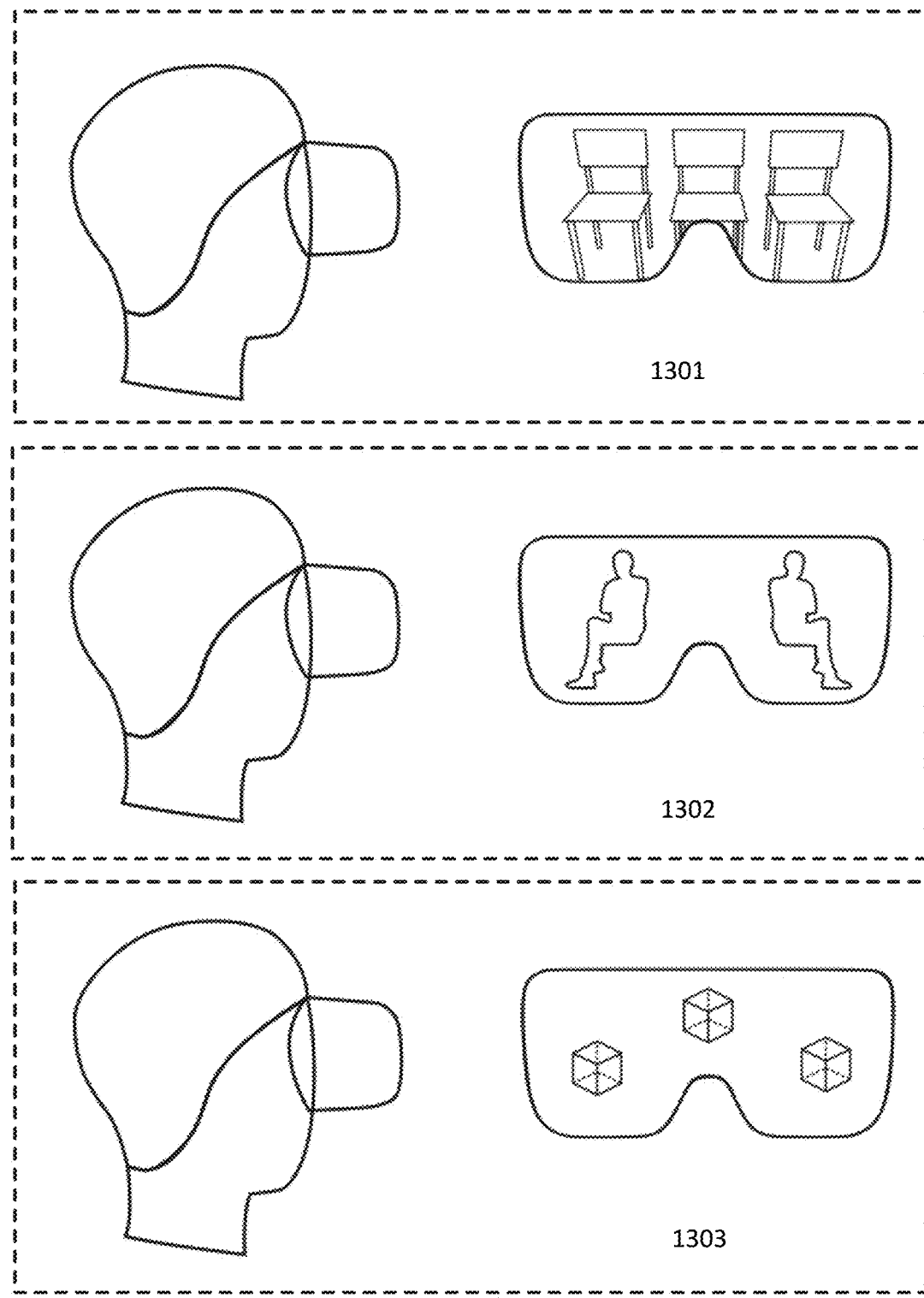
FIG. 13 illustrates an example of the information that can be provided by a user of the VR device according to an exemplary embodiment.

FIG. 13 illustrates an example of the information that can be provided by a user of the VR device according to an exemplary embodiment. As shown in box 1301 of FIG. 13, a user on a flight can enter their seat position (e.g., window seat, middle seat, aisle seat). The user can also indicate whether there are other passengers/persons located to the left or the right of the user, as shown in box 1302. Box 1303 visualizes the possible risk zones around a user. For example, there can be a risk zone in front of the user (represented by the center cube), a risk zone to the left of the user when there is a passenger/person to the left of the user (represented by the left cube), and a risk zone to the right of the user when there is a passenger/person to the right of the user (represented by the right cube).

In order to allow users to input spatial information, the VR safety system can procedurally generate a user interface (UI) that allows the user to choose a seat arrangement. Alternatively, the safety system can utilize application programming interfaces (APIs) to interface with VR applications to allow the creators of those applications to create custom UIs that are more suitable to a particular application (e.g., with matching content or art styles. The seat arrangement options are provided by a server (or a configuration file on the VR device) in various formats, such as a text (json) format. The procedurally generated UI can also be accompanied by contextual images or icons depending on the particular application of the VR safety system (e.g., airplanes, classrooms, etc.). For example, in the airplane scenario, the user can see the following seat options with contextual icons and/or text in four steps:

- Economy or business class seat;
- Left/right window, left/right aisle or middle seat;
- Extra legroom seat or normal seat; and
- Presence of another passenger on the left or right depending on the seat arrangement.

Additionally, the user can enter their size/height (or level of chair/floor), to give the system more detailed information regarding distances between the user and the space arrangements. The user can provide any details relating to arrangement of seating and occupancy. The options presented to a user can vary depending on the particular VR usage scenario (i.e., flight, aircraft, train, school, etc.) in the initial configuration by the administrator of the safety system. The input steps, options, icons, and text can all be defined in the initial configuration.

The user can optionally also just provide a seat number and allow the VR device or a communicatively coupled server to population spatial information based upon the seat information. For example, the server or VR device can utilize a seat number to lookup whether the seat is an aisle seat, middle seat, or window seat, as well whether the seat is a premium seat (e.g., first class, business class, premier, extra legroom, emergency exit row, etc.) or a regular seat and the corresponding dimensions. The server can also check occupancy from reservations to estimate whether adjacent seats would be occupied.

An administrator/moderator can also be responsible for assigning a seat arrangement to a user. This would simplify the user experience of the VR user, but it would require the presence of a person responsible for assigning seats to all the users, such as a flight administrator or flight attendant. In this scenario, an attendant or other administrator can utilize a remote device to input each passenger's seat information to a flight server, which can then communicate directly with the relevant VR devices.

Once the spatial information is identified, such as through a seat setup process (e.g., an economy left window seat with another person sitting on their right), the safety system can locally store the spatial information on the VR device and/or send a message to the server with the spatial information. The message can contain, for example, a user's seat selection, together with a request for the safety settings that correspond to the spatial information (e.g., the selected seat and space arrangement). Alternatively, the VR device can store the spatial information locally and perform a lookup for the corresponding safety settings in a configuration file.

Returning to FIG. 2, at step 203 a first risk profile corresponding to the spatial information is loaded into the spatial risk warning routine. The first risk profile defines a first plurality of spatial risk zones and the step of loading the first risk profile can include setting the plurality of current spatial risk zones to the first plurality of spatial risk zones.

For example, if the orientation space was split in 8 equal zones, the VR Safety System can receive a subset (or all) of this dataset with their associated risk values:

Zone 1(top-left-front):[pitch_min=0°,pitch_max=90°, yaw_min=−90°, yaw_max=0°]

Zone 2(top-right-front):[pitch_min=0°,pitch_max=90°,yaw_min=0°, yaw_max=90°]

Zone 3(bottom-right-front):[pitch_min=−90°,pitch_max=0°,yaw_min=0°, yaw_max=90°]

Zone 4(bottom-left-front):[pitch_min=−90°,pitch_max=0°,yaw_min=−90°, yaw_max=0°]

Zone 5(top-left-back):[pitch_min=0°,pitch_max=90°, yaw_min=180°, yaw_max=−90°]

Zone 6(top-right-back):[pitch_min=0°,pitch_max=90°,yaw_min=90°, yaw_max=180°]

Zone 7(bottom-right-back):[pitch_min=−90°,pitch_max=0°,yaw_min=90°, yaw_max=180°]

Zone 8(bottom-left-back):[pitch_min=−90°,pitch_max=0°,yaw_min=180°, yaw_max=−90°]

For example Zone 2, 4, 6 and 8 could be defined as the o-risk zones associated with a neighbor sitting on the right side of the user. Zones 2 and 6 can have higher risk (top zones, towards the face of the neighbor), and zones 4 and 8 can have a lower risk, since they might be considered less invasive zones for the neighbor.

Similarly, if space is split in 8 zones only in the horizontal direction, the VR Safety System can receive a subset (or all) of the following dataset with their associated risk values:

Zone 1:[yaw_min=0°,yaw_max=45°]

Zone 2:[yaw_min=45°,yaw_max=90°]

Zone 3:[yaw_min=90°,yaw_max=135°]

Zone 4:[yaw_min=135°,yaw_max=180°]

Zone 5:[yaw_min=180°,yaw_max=225°]

Zone 6:[yaw_min=225°,yaw_max=270°]

Zone 7:[yaw_min=270°,yaw_max=315°]

Zone 8:[yaw_min=315°,yaw_max=0°]

For example, Zones 6 and 7 can be considered risk when there is a neighbor on the user's front-left side. In this case, only the risk zone information for these zones can be transmitted as part of the risk profile.

As with the volumetric space, the orientation space can be split unequally, while not the entire space needs to be covered. This could help for cases where only very certain areas are considered risky for the orientation (e.g., only 1 neighbor near the user):

Zone 1(left-neighbor zone):[pitch_min=−20°,pitch_max=80°,yaw_min=70°, yaw_max=110°]

Figure 14:
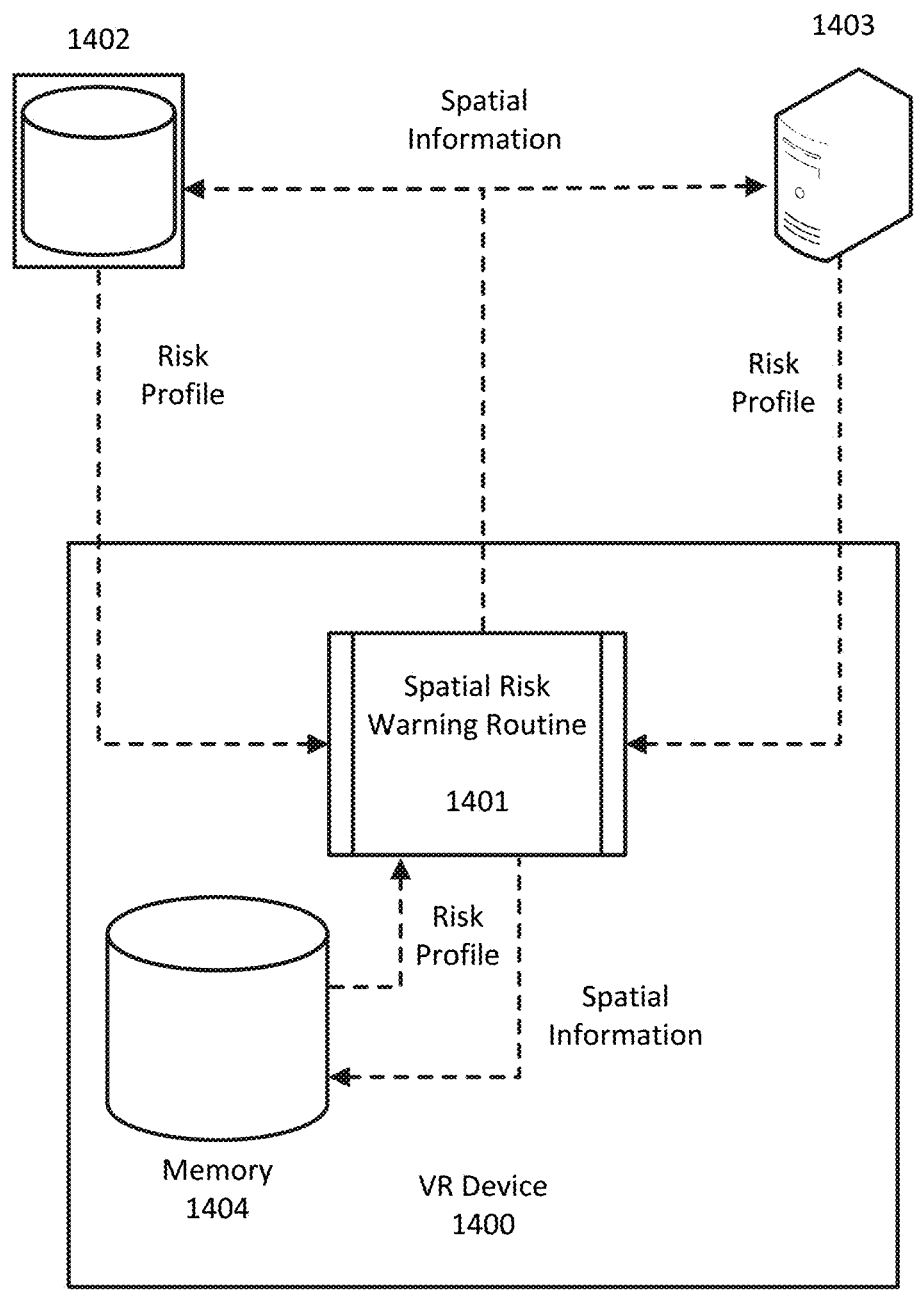
FIG. 14 illustrates possible sources of the risk profile according to an exemplary embodiment.

The risk profile can be received from a variety of sources. FIG. 14 illustrates possible sources of the risk profile according to an exemplary embodiment. As shown in FIG. 14, the spatial risk warning routine 1401 can receive the risk profile from one or more remote devices on the network, such as a system hosting database 1402, a remote device (not shown), and/or a server 1403. On a flight the server 1403 can be, for example, a flight server onboard the aircraft that stores the relevant information (such as risk profiles). The database 1402 can be a remote risk profile database.

The risk profile can also be retrieved from a memory 1404 on the VR Device 1400. The memory 1404 can be, for example, a configuration file that stores risk profiles corresponding to different spatial information settings. As shown in FIG. 14, the risk profile can be loaded into the spatial risk warning routine. However, it is understood that the risk profile can also be loaded and stored anywhere on the VR device and communicatively coupled with the spatial risk warning routine. Optionally, the risk profile can be hosted on a server or remote database and accessed to load relevant settings.

Figure 15:
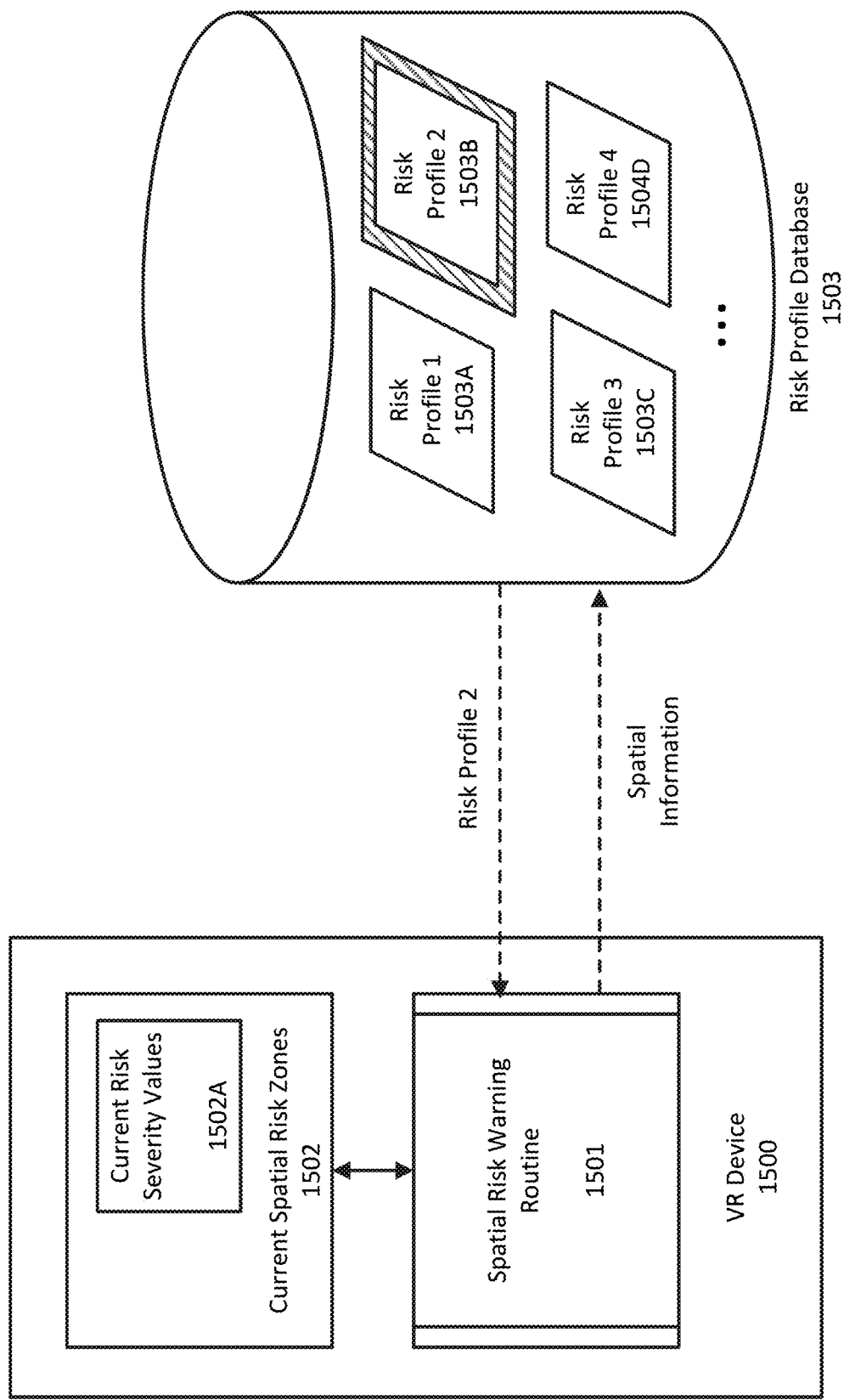
FIGS. 15-16 illustrate an example of loading a risk profile corresponding to spatial information into spatial risk warning routine according to an exemplary embodiment.
Figure 16:
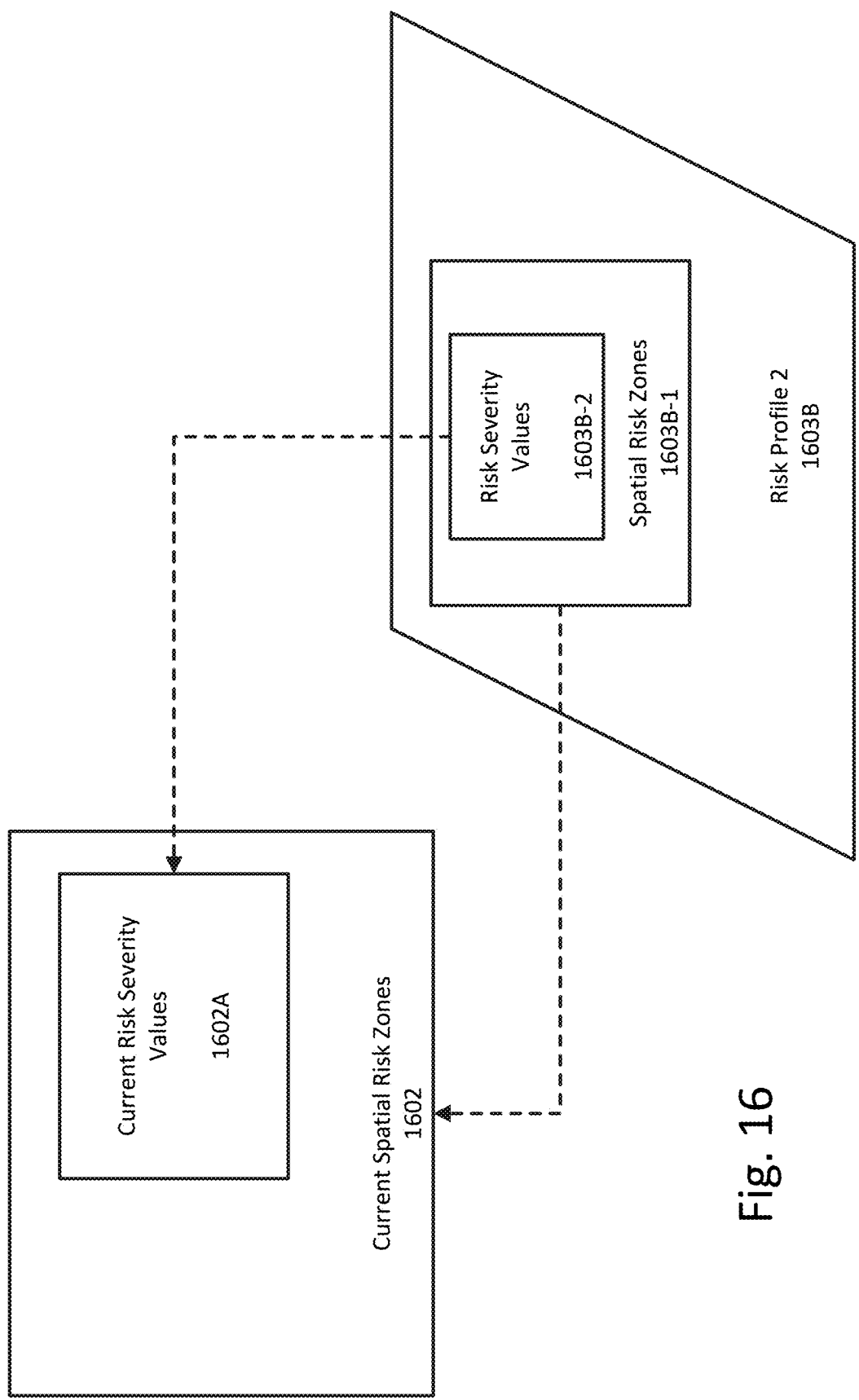

FIGS. 15-16 illustrate an example of loading a risk profile corresponding to spatial information into spatial risk warning routine according to an exemplary embodiment. As shown in FIG. 15, the VR device 1500 includes spatial risk warning routine 1501 and current spatial risk zones 1502. Additionally, the current spatial risk zones 1502 include corresponding current risk severity values 1502A. Initially, when the VR device is first powered on or activated, the current spatial risk zones 1502 and current risk severity values 1502A can be set to some default value or set to null/no spatial risk zones.

The risk profile database 1503 can include multiple different risk profiles, such as Risk Profile 1 1503A, Risk Profile 2 1503B, Risk Profile 3 1503C, and Risk Profile 4

1503D, corresponding to different spatial information configurations. The risk profile database 1503 can be an external database, such as a database on a flight server or elsewhere (in the flight context). Although shown separate from the VR device 1500, the risk profile database 1503 can optionally be stored on the VR device 1500 itself, such as in a configuration file or local database.

In addition to, or as an alternative to the risk profile database 1503, risk profiles (including spatial risk zones and severity values) do not have to be predefined and can be dynamically generated, such as based upon a machine learning or artificial intelligence process. If a large amount of spatial parameters are utilized, it may not be efficient or possible to store risk profiles corresponding to each permutation. In this case, baseline risk profiles can be stored and then adjusted dynamically using a risk profile generation algorithm. Alternatively, no risk profiles may be stored and all risk profiles can be dynamically generated.

As shown in FIG. 15, previously identified spatial information is provided from the spatial risk warning routine 1501 to the risk profile database 1503 to determine a risk profile corresponding to the identified spatial information. In the example shown, risk profile 2 1503B is identified as the risk profile corresponding to the received spatial information.

FIG. 16 illustrates the loading of current spatial risk zones and current risk severity values. As shown in FIG. 16, the plurality of current spatial risk zones 1602 are set to the spatial risk zones 1603B-1 in risk profile 2 1603B. Additionally, the plurality of current risk severity values 1602A are set to the risk severity values 1603B-2 in risk profile 2 1603B.

Figure 17:
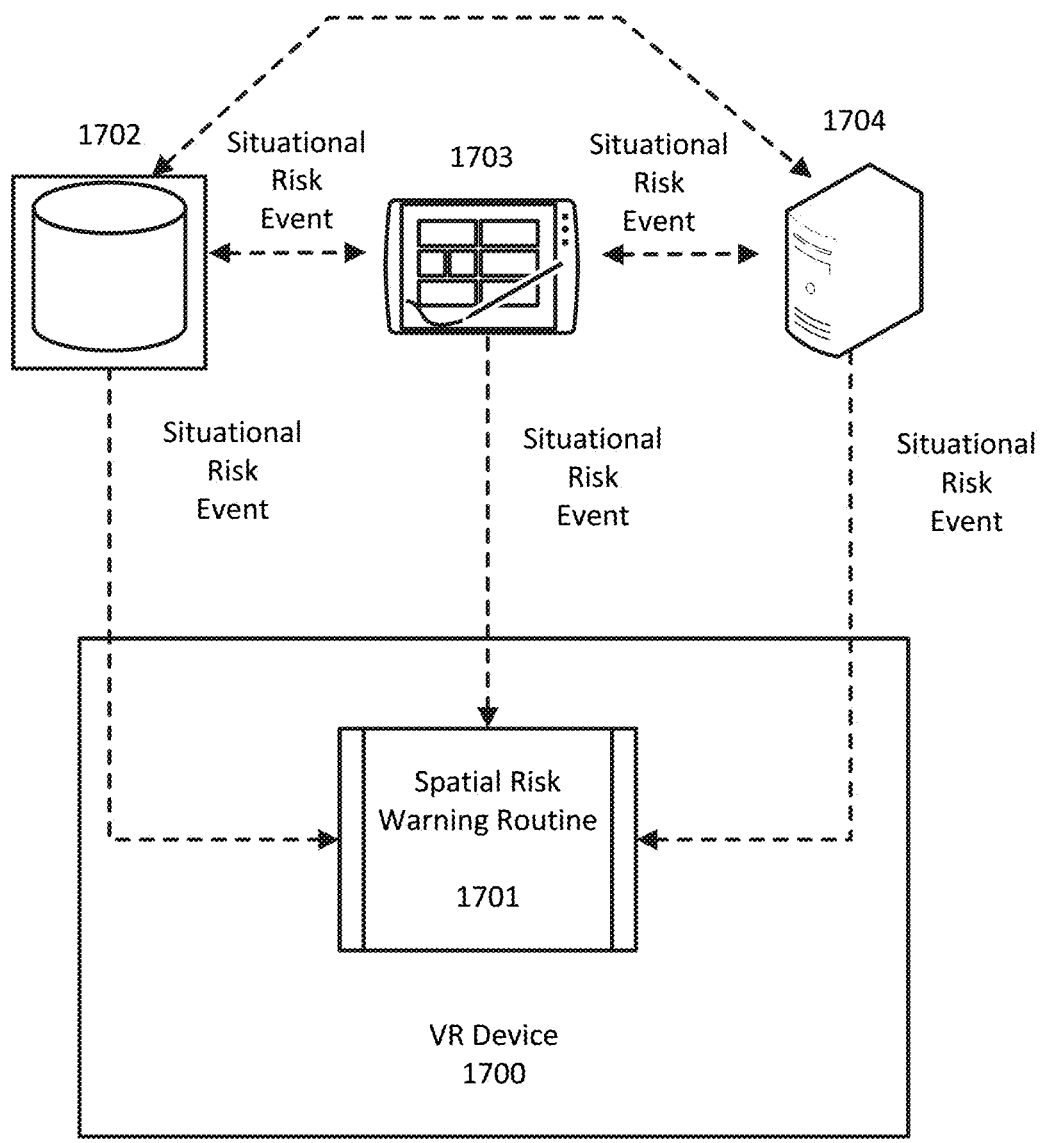
FIG. 17 illustrates possible sources of the notification of the situational risk event according to an exemplary embodiment.

The notification of the situational risk event and the information about the situational risk event can be received from a variety of sources. FIG. 17 illustrates possible sources of the notification of the situational risk event according to an exemplary embodiment. As shown in FIG. 17, the spatial risk warning routine 1701 on the VR device can information about the situational risk event from one or more remote devices on the network, such as a system hosting database 1702, remote device 1703, and/or a server 1704. On a flight the remote device 1703 can be, for example, an administrator device such as a flight attendant device that flight attendants can use to enter information about situational risk events for a particular passenger or for multiple passengers or groups of passengers. The server 1704 can be, for example, a flight server onboard the aircraft that stores the relevant information (e.g., meal serving times, landing, takeoff, etc.). The database 1702 can be a customer, passenger, or flight database.

The information about the situational risk event can also be passed through multiple devices before it reaches the VR device 1700. For example, in the flight context, a flight server 1704 can pass information about the situational risk event to an administrator computing device 1703, which can then forward the information to the VR device 1700.

In the flight/train or other passenger context, the situational risk event can be, for example, a meal or drink service event, a cruising event, a landing event, a takeoff event, a turbulence event, a disembarking event, or a boarding event.

There are multiple scenarios where the spatial risk zones and their respective severity can change. As discussed above, one of the scenarios in which the spatial risk zones and respective severity levels are when a situational risk event occurs. The situational risk event can be triggered in a variety of ways. Depending on the specific situational risk event and connectivity of the system, a change in the situation can be signaled by an external moderator (person or automated system). For example, a crew member can signal the meal serving through their mobile application. In that case, the system can load different risk zones, severity and time arrangements to increase the sensitivity of the reactions and protect the user more aggressively. Each seat can have different risk zones that are affected by the situation change. For example, in the airplane scenario, a passenger sitting in the aisle can have bigger and more severe risk zones in response to a situational risk event than someone sitting by the window seat. A situational risk event change can also affect only certain seats (e.g. meal serving in business class, will only affect business class seats). As explained above, the situational risk event notification can be sent from the server to the VR device using a Socket/Web Socket (e.g., with SocketIO) protocol. The safety system on the VR device can then load or update the risk profile and adapt spatial risk zones and severity levels accordingly.

Returning to FIG. 2, at step 205 a second risk profile corresponding to the spatial information and the situational risk event is loaded. The second risk profile defines a second plurality of spatial risk zones different than the first plurality of spatial risk zones. Similar to the first risk profile, loading the second risk profile includes setting the plurality of current spatial risk zones to the second plurality of spatial risk zones. The second plurality of spatial risk zones include a second plurality of risk severity values corresponding to the second plurality of spatial risk zones and the step of loading a second risk profile corresponding to the spatial information into the spatial risk warning routine can include setting the plurality of current risk severity values to the second plurality of risk severity values. The process of loading the second risk profile is similar to the process for loading the first risk profile, as shown in FIG. 16.

Figure 18A:
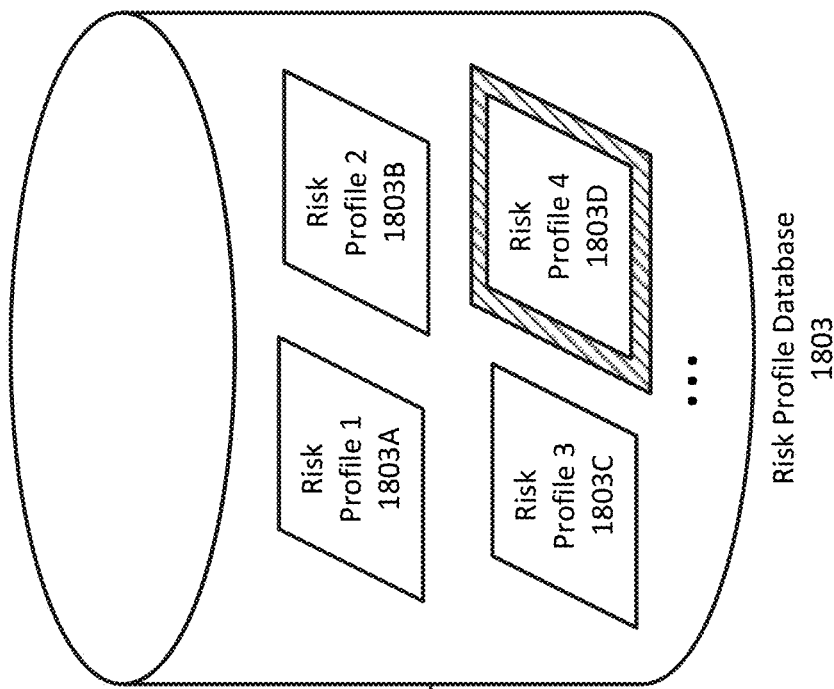
FIGS. 18A-18C illustrate different examples of loading a second risk profile corresponding to spatial information and a situational risk event according to an exemplary embodiment.
Figure 18A:
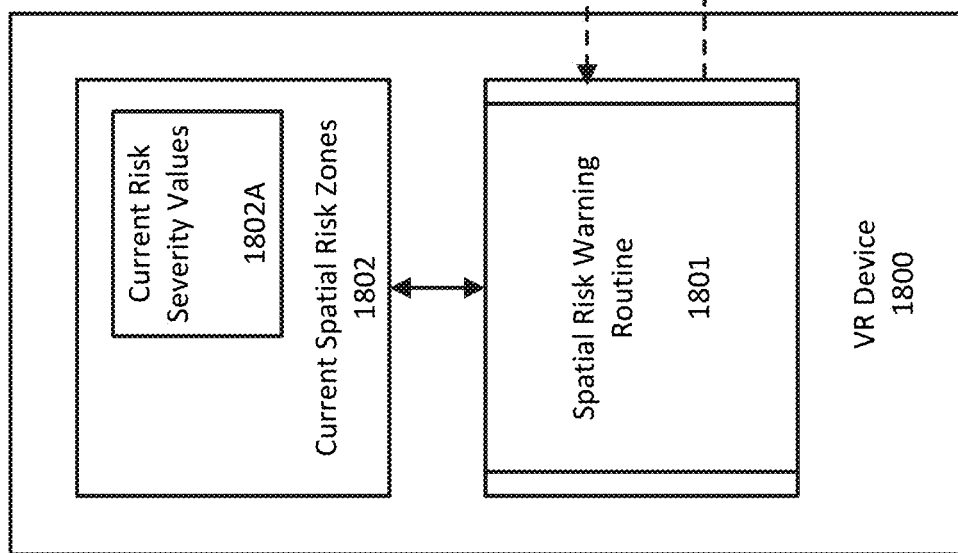
Figure 18B:
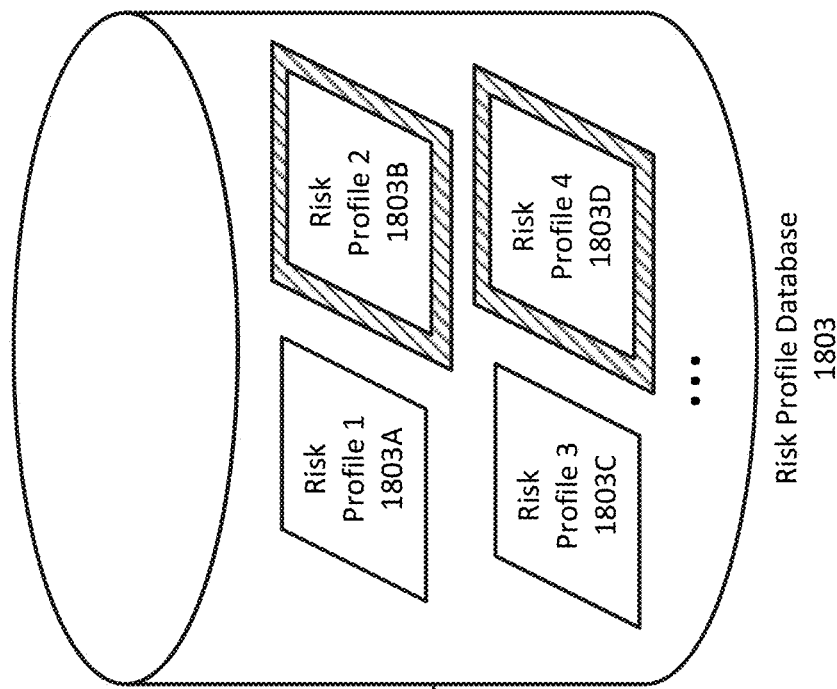
Figure 18B:
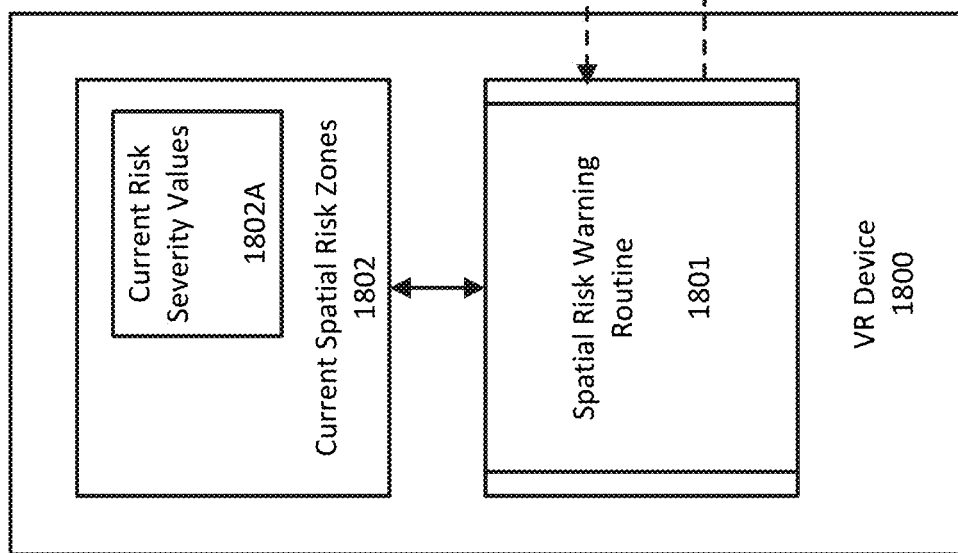
Figure 18C:
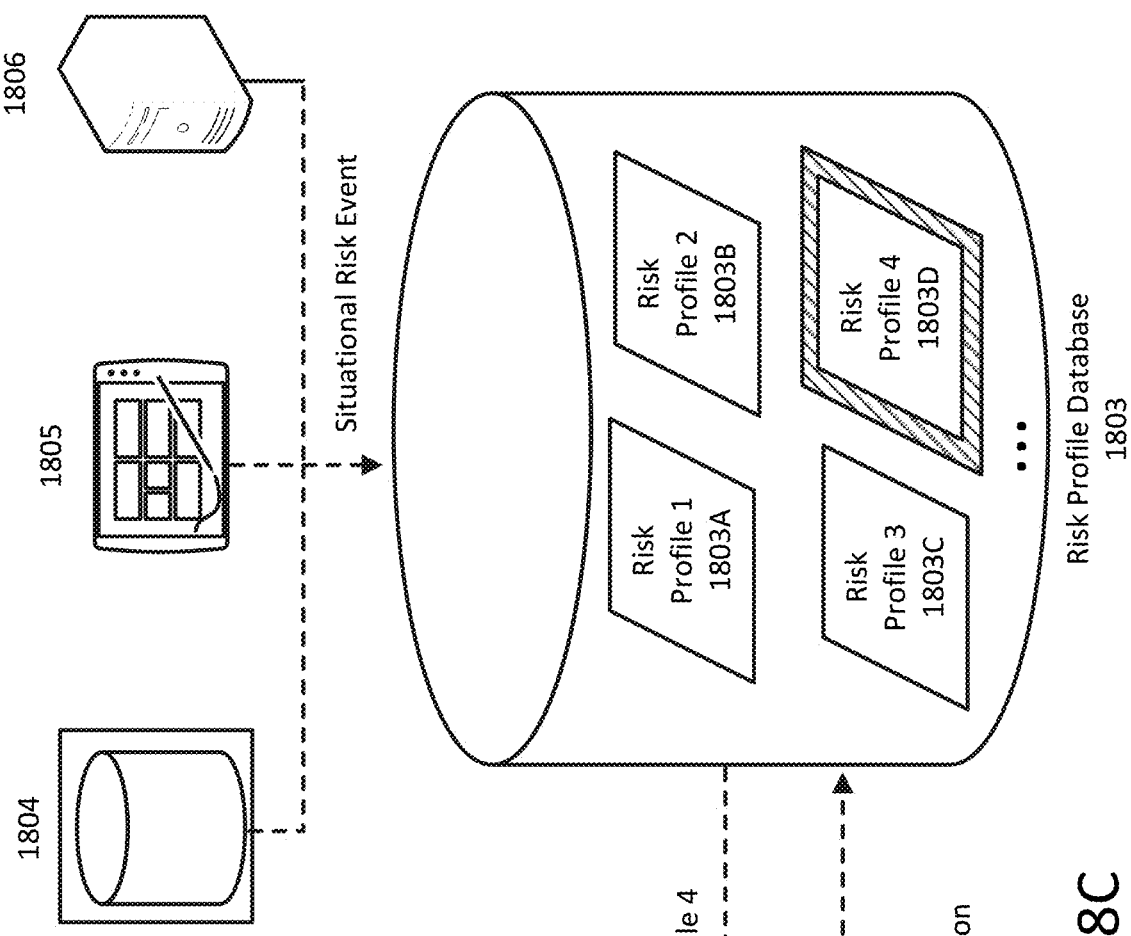
Figure 18C:
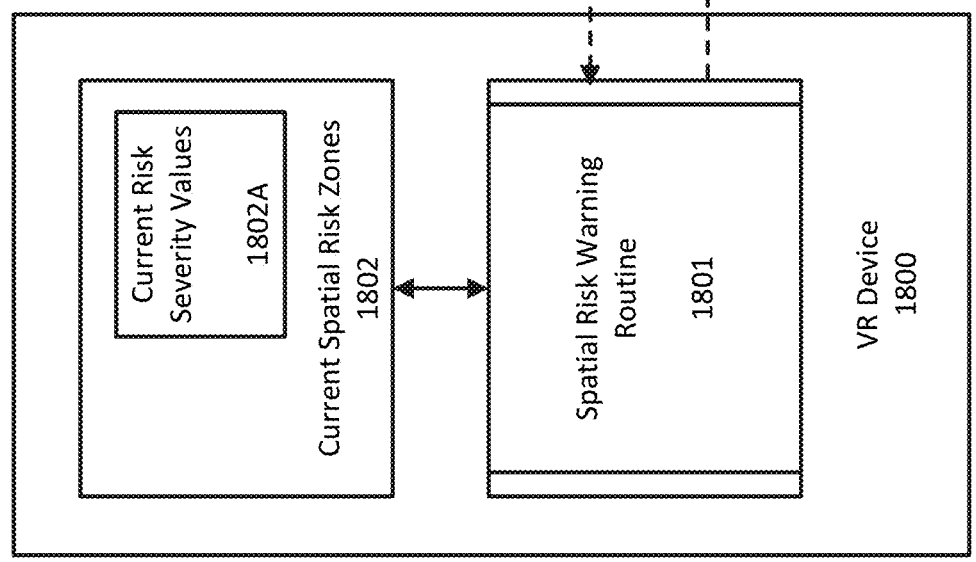

FIGS. 18A-18C illustrate different examples of loading a second risk profile corresponding to spatial information and a situational risk event according to an exemplary embodiment.

As shown in FIG. 18A, spatial information and situational risk event information can be sent from the spatial risk warning routine 1801 on VR Device 1800 to a risk profile database 1803. As discussed previously, the risk profile database 1803 can be stored external to the VR device (e.g., on a server, external database, or remote device) or can be stored on the VR Device 1800 itself.

The risk profile database 1803 can identify a risk profile corresponding to the combination of the spatial information and the situational risk event. In the example shown in FIG. 18A, risk profile 4 1803D is identified as corresponding to the combination of the spatial information and the situational risk event. Risk profile 4 1803D is then returned to the spatial risk warning routine 1801 on VR Device 1800.

FIG. 18B illustrates another example of loading a second risk profile corresponding to spatial information and a situational risk event according to an exemplary embodiment. In the example shown in FIG. 18B, the spatial information and the situational risk event information is sent from the spatial risk warning routine 1801 on VR Device 1800 to the risk profile database 1803. The risk profile database then identifies risk profile 2 1803B as corresponding to the received spatial information and identifies another risk profile, risk profile 4 1803D, as corresponding to the received situational risk event. The risk profile database 1803 can then send both risk profile 2 and risk profile 4 to the spatial risk warning routine 1801 on the VR device 1800. The spatial risk warning routine 1801 can then load both risk profiles. In this scenario, the safety system can combine or otherwise integrate spatial risk zones and risk severity values from multiple risk profiles into a single set of spatial risk zones and risk severity values.

FIG. 18C illustrates another example of loading a second risk profile corresponding to spatial information and a situational risk event according to an exemplary embodiment. As shown in FIG. 18C, spatial information is provided from the spatial risk warning routine 1801 to the risk profile database 1803. Additionally, the information/notification regarding the situational risk event can be sent to the risk profile database from a devices hosting a remote database 1804, a remote computing device 1805 (such as a flight attendant/administrator device), and/or a flight server 1806. The combination of the spatial information from the spatial risk warning routine 1801 and the situational risk event information from the database 1804, remote computing device 1805, and/or server 1806 can then be used by the risk profile database 1803 to determine a corresponding risk profile. In this example, risk profile 4 1803D is selected as the risk profile corresponding to the received spatial information and situational risk event and this risk profile is then sent to the spatial risk warning routine 1801 on the VR device 1800.

Figure 19:
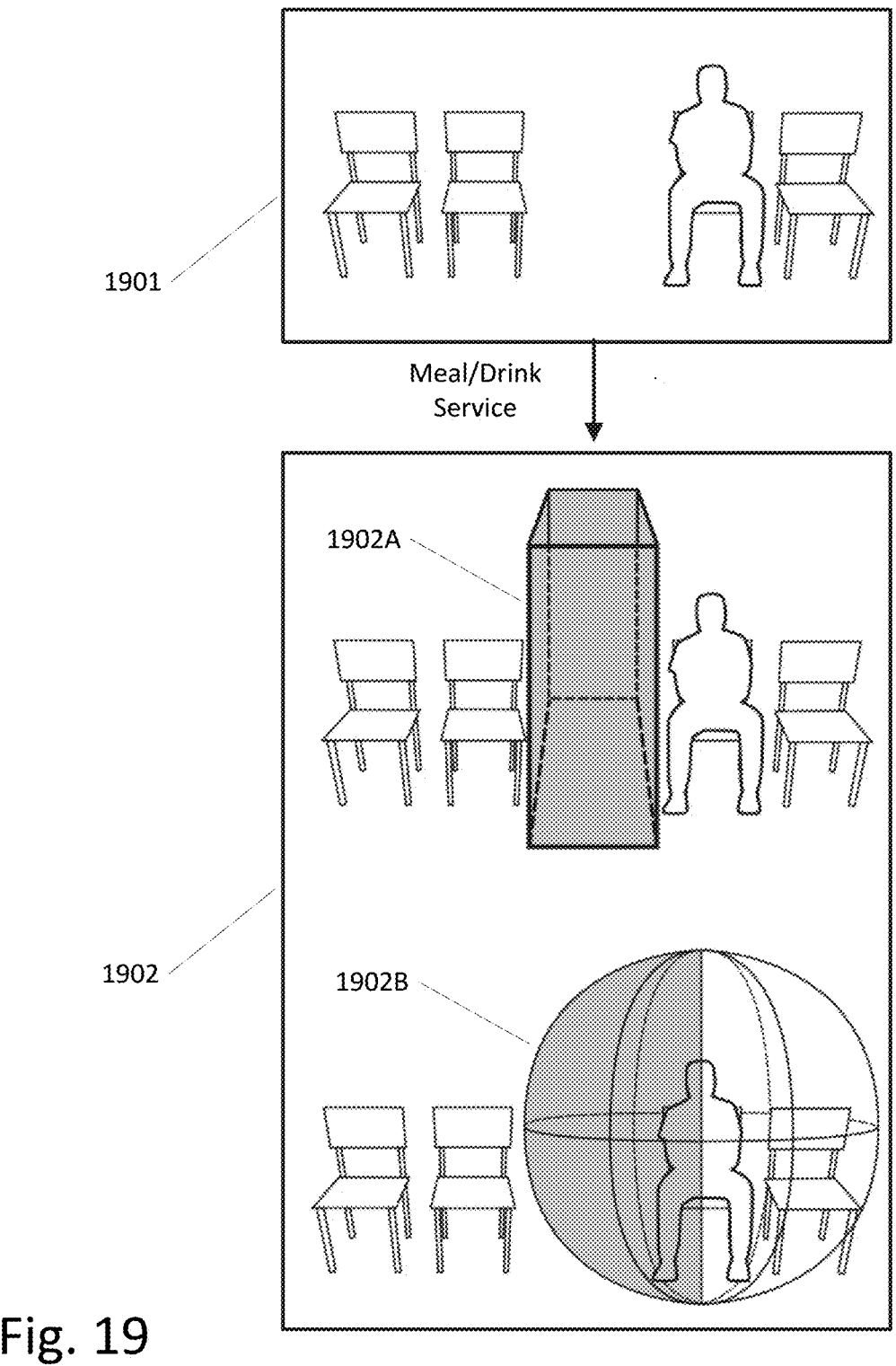
FIG. 19 illustrates examples of the changes in spatial risk zones resulting from a situational risk event according to an exemplary embodiment.

FIG. 19 illustrates examples of the changes in spatial risk zones resulting from a situational risk event according to an exemplary embodiment. Box 1901 illustrates a person seated in an aisle seat and corresponding spatial risk zone prior to a meal/drink service event occurring. Box 1902 illustrates the changes to spatial risk zones resulting from the meal/drink service event in an airplane or other passenger vehicle (e.g., a train or a bus). As shown in box 1902, as a result of the meal/drink service, a risk profile is loaded which includes a volumetric risk zone 1902A and/or an orientation risk zone 1902B to prevent the user from extending their head into the aisle space where meal/drink service carts may pass.

There are additional scenarios other than situational risk events where an updated or new risk profile can be loaded. For example, if a user change seats mid-flight or a neighbor of the user moves seats, then the user or a moderator/administrator can be given the option through a settings interface to update the user position/seat/spatial information and/or to update the user neighbor information. The safety system on the VR device can then communicate the new spatial settings to a server and request a new risk profile. Alternatively, when risk profiles are stored on the VR device (e.g., in a configuration file), then the safety system can load the new risk profile locally based on the updated spatial information.

In a flight, train, or other passenger scenario, situational risk events can also be staggered or adapted to different sections of the plane or vehicle. For example, when there is a meal service or drink service on a large flight, certain sections of the plane can be serviced before others. In this case, the server or crew application can transmit situational risk events to specific rows at a time (e.g., first class, business class, rows 1-10, rows, 11-20 etc.).

Figure 20:
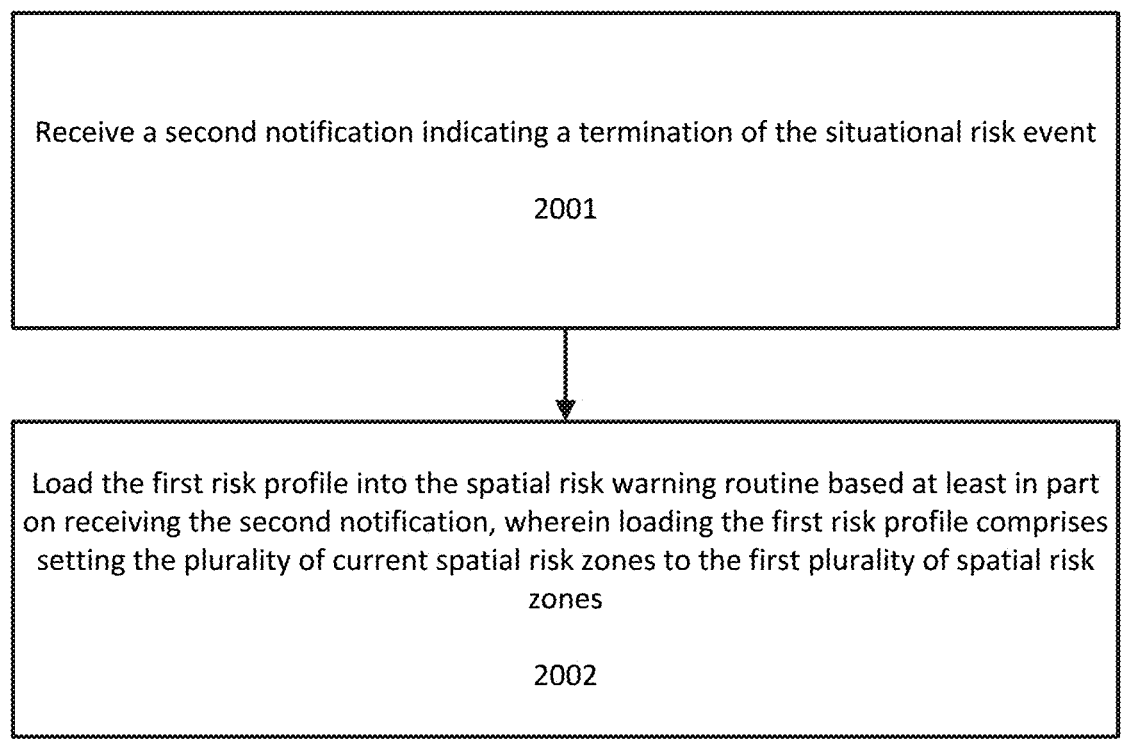
FIG. 20 illustrates a flowchart for adjusting the spatial risk warning routine based on termination of a situational risk event according to an exemplary embodiment.

Once the situational risk event is completed, it is necessary for the VR safety system to return the spatial risk zones and severity values back to the pre-event levels. FIG. 20 illustrates a flowchart for adjusting the spatial risk warning routine based on termination of a situational risk event according to an exemplary embodiment. The steps shown in FIG. 20 can be performed after the steps of FIG. 2 (e.g., after step 205).

At step 2001 a second notification indicating a termination of the situational risk event is received. Similar to the notification that indicates the initiation of the situational risk event, the termination notification can be received from an administrator device, a flight server, or some other remote device. For example, in the flight context, after a meal service has been completed, a flight attendant can use an administrator computing device to push a notification to VR devices in a particular section of the plane to indicate that meal service has been completed in that section.

Once the second notification indicating termination of the situational risk event is received, the safety system can remove the risk profile and spatial risk zone corresponding to the situational risk event. Referring to FIG. 20, at step 2002 the VR device loads the first risk profile (i.e., the risk profile in place prior to the initiation of the situational risk event) into the spatial risk warning routine based at least in part on receiving the second notification. Loading the first risk profile comprises setting the plurality of current spatial risk zones back to the first plurality of spatial risk zones and setting the plurality of current risk severity values back to the first plurality of risk severity values, as shown in FIG. 15B.

The communication between VR applications on the VR device and the flight server with the VR applications can optionally be facilitated by a "middleware" background service that remains in stand-by for messages. When utilizing a middleware application, the VR device is configured to communicate with a server via the middleware application executing on the VR device and the middleware application being disposed as an intermediary between the server and one or more VR applications executing on the VR device.

The middleware can be responsible for the REST API and Socket/Web Socket messaging with the server and can remove the burden of the communication from the VR SDK. A middleware based solution can be useful for standalone/mobile headsets, where there is usually the need for optimization for performance. Moreover, if the VR headset enters sleep-mode, a middleware service can remain awake in the background, ensuring that no messages are getting lost. A middleware can also facilitate communication if the user needs to switch between multiple VR applications running on the headset, keeping the management of the communication in one place. The middleware service can be offered as a standardized communication solution across VR hardware solutions that want to support the proposed VR safety system. The middleware can also be embedded by default in the VR devices with the factory settings.

Figure 21:
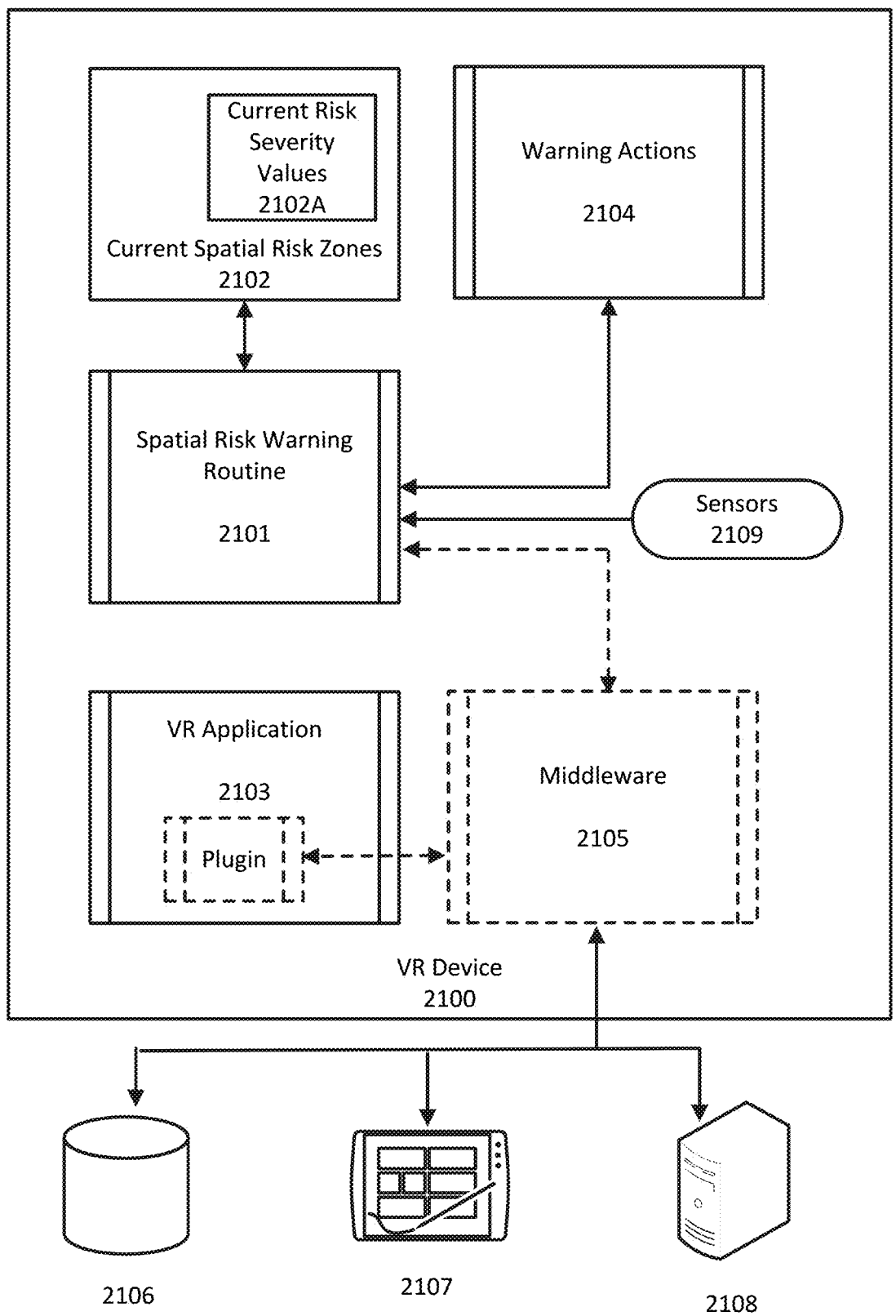
FIG. 21 illustrates a variation of the VR device with a middleware component according to an exemplary embodiment.

FIG. 21 illustrates a variation of the VR device with a middleware component according to an exemplary embodiment. As shown in FIG. 21, the VR device 2100 includes a middleware component 2105 that can communicate with remote devices such as database 2106, remote device 2107, and server 2108. The middleware 2105 includes a plugin component that is embedded in VR applications, such as VR application 2103 and allows the middleware to communicate with those applications and invoke safety features, such as the spatial risk zone traversal detection and warnings discussed above. Additionally, middleware 2105 communicates with the spatial risk warning routine to 2101 to implement the safety features discussed herein. VR device 2100 also stores current spatial risk zones 2102, current risk severity values 2102A, and warning actions 2104 that are accessed by spatial risk warning routine 2101. The VR device further includes sensors 2109 that communicate with the spatial risk warning routine 2101, as discussed with respect to FIG. 3.

Of course, additional variations of the device are possible in addition to the configurations shown in FIGS. 3 and 21. For example, the functionality performed by the middleware can be incorporated into native software of the VR device for VR devices used in a flight context.

The VR safety system disclosed herein can also be utilized to optimize the positioning of user interface element within the display of the VR device in order to improve safety and prevent the user from entering any of spatial risk zones, either v-risk zones or o-risk zones. The user interface element can be, for example, interactive elements, focus/gaze elements, menu or selection elements.

Figure 22:
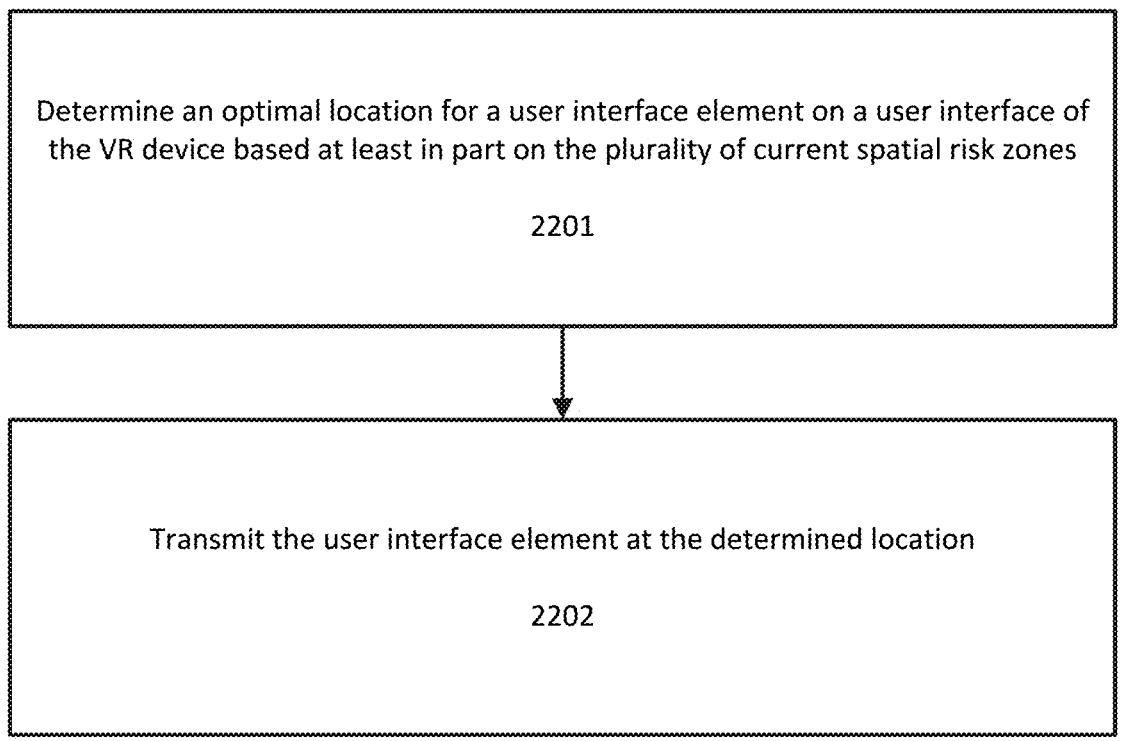
FIG. 22 illustrates a flowchart for optimally positioning a user interface element within the display of the VR device according to an exemplary embodiment.

FIG. 22 illustrates a flowchart for optimally positioning a user interface element within the display of the VR device according to an exemplary embodiment. At step 2201 an optimal location for a user interface element on a user interface of the VR device is determined based at least in part on the plurality of current spatial risk zones.

A recommendation system can be used for the placement of passive or interactive elements of a given VR application (e.g., a menu, a shooting target or a cinema screen). Considering the risk zones defined, the system can create recommendations for an optimal placement and orientation of UI elements and an optimal volume that the interactive elements can occupy in the VR space. The interactive elements or the entire focus/play area of a VR application can have some flexibility to be shifted (in position and orientation) and expanded or shrunk to occupy different amounts of space, taking advantage of the risk-free VR space. The recommendation system provides a recommended volume and/or orientation information and VR developers can use this information for their particular applications. The recommendation system provides an additional extra safety level that further minimizes the risk of potential collisions with the fixtures around the user or of annoying other people nearby.

The process of determining an optimal positioning of a user interface can include determining an optimal volume and orientation. If v-risk zones are defined, the recommendation system can calculate an optimal risk-free volume in space. This zone can be a convex volume; the result of the search could be a cube or a cuboid defined by its position in the VR space and its size (defined by a three dimensional vector). A spatial subdivision algorithm (such as an octree) can be used to find the optimal risk-free volume. If the configuration includes o-risk zones, it is necessary to ensure that the previously detected optimal volume is not occluded by an o-risk zone. If this occurs, the system can search again for the next best option, until a risk-free zone in volume and orientation is detected. Optionally, the search can be limited to only the frontal zones of the user. For example, in an airplane where seats are fixed, UI features would not be placed behind the user. However, there would be more space flexibility in an office space with rotating chairs.

If o-risk zones are defined the recommendation system can calculate an optimal risk-free orientation. The system can search for the direction vector from the user's head that is further away from o-risk zones and can provide that vector to the VR application. A developer can use the optimal volume for placing elements that require hand interactions, while the optimal orientation can be used for focus objects, for example placing a cinema screen slightly to the left or right of the user if there is a neighbor to one side.

Figure 23:
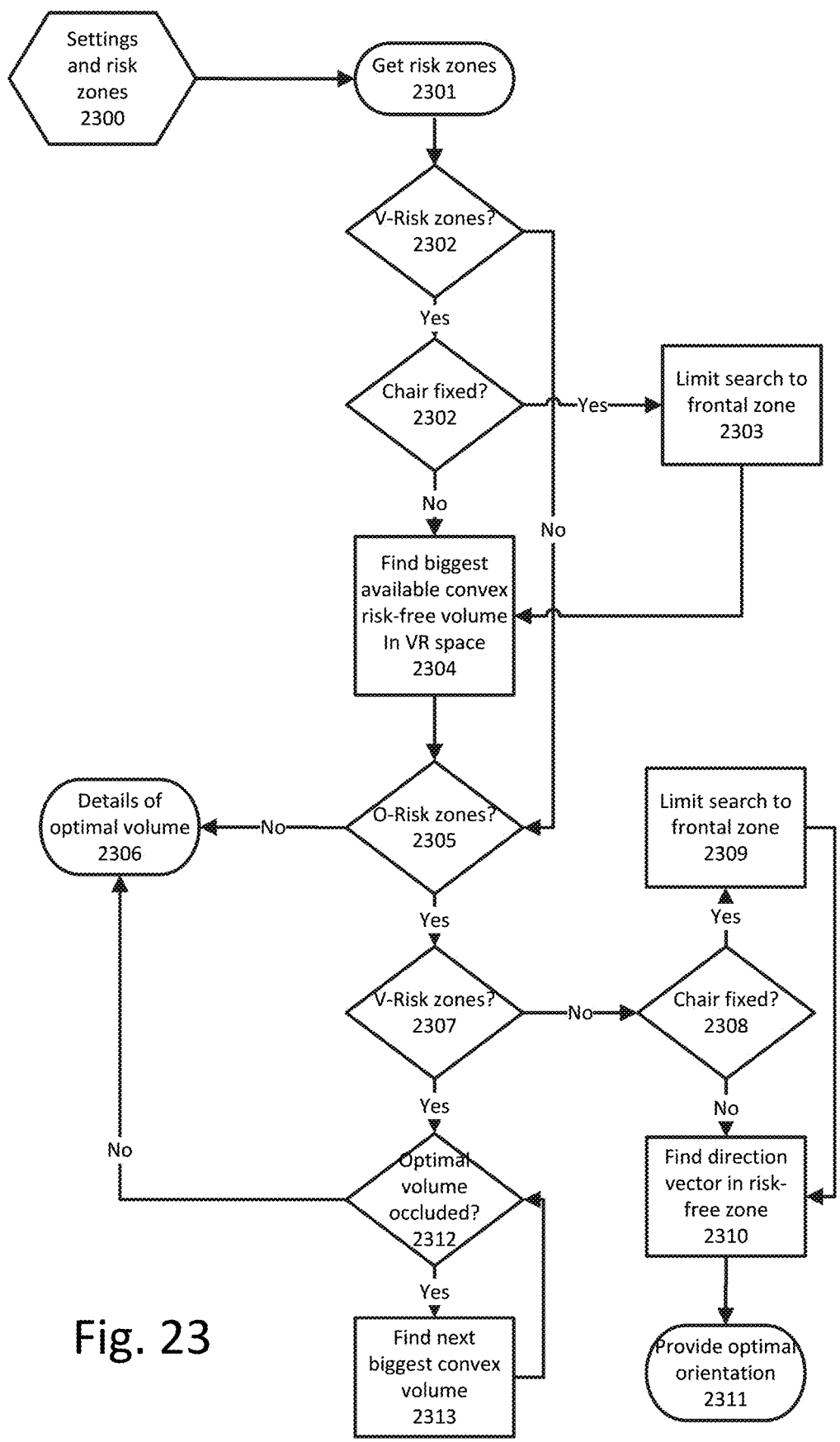
FIG. 23 illustrates a flowchart for determining an optimal positioning of a user interface element within the display of the VR device according to an exemplary embodiment.

FIG. 23 illustrates a flowchart for determining an optimal positioning of a user interface element within the display of the VR device according to an exemplary embodiment. The steps shown in FIG. 23 correspond to the process described above, resulting in an optimal volume 2306 and/or an optimal orientation 2311. The system can then provide the resulting optimal risk-free zone (volume and orientation) to the VR application. The process for determining an optimal positioning of a user interface element within the display of the VR device can be performed on the VR device and/or can be performed by a server or remote device and transmitted to the VR device. Upon receiving the risk zones and calculating the optimal volume and orientation, the safety system can provide this information to the VR application, which can make use of the optimal volume and orientation according to the particular requirements of the application.

Figure 24:
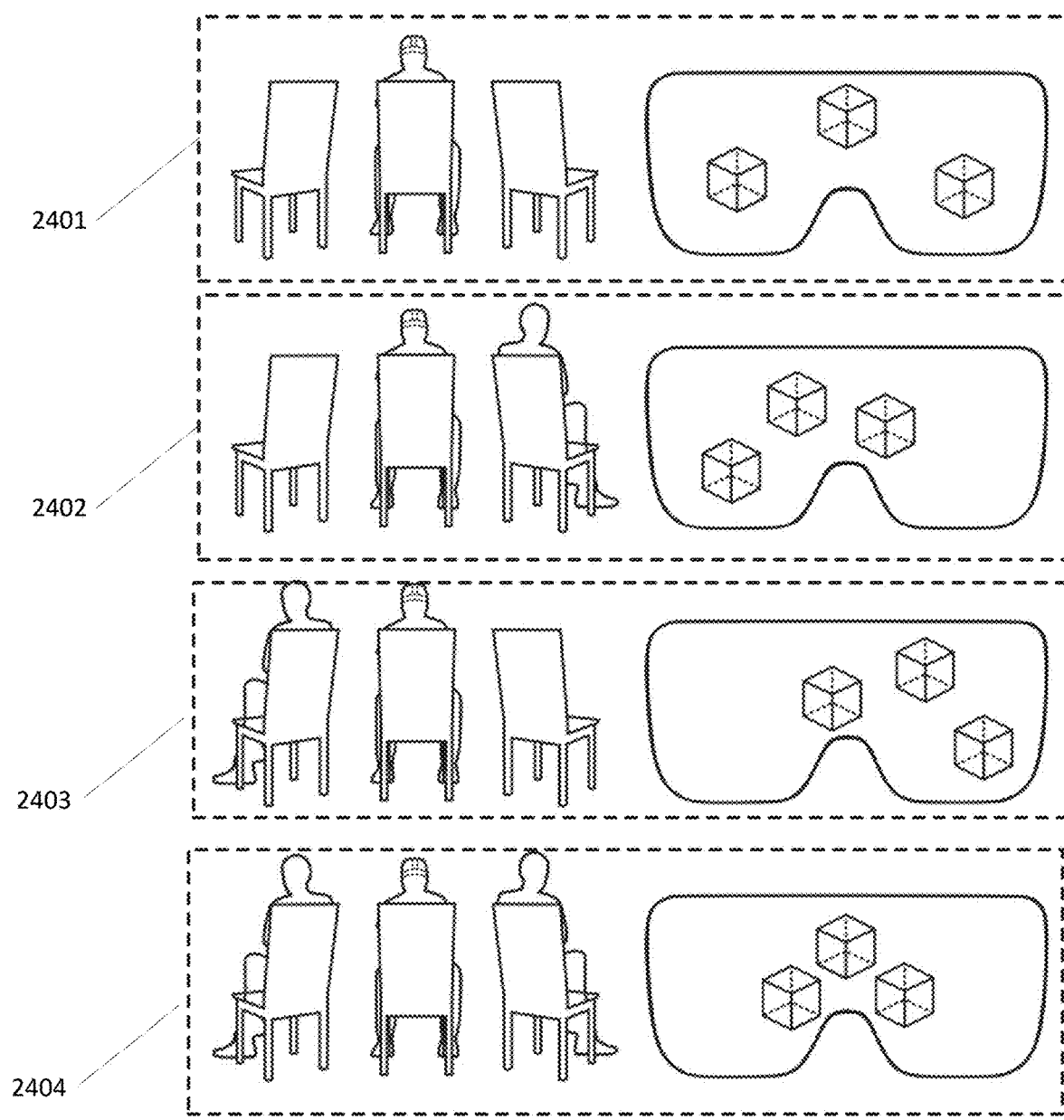
FIG. 24 illustrates examples of user interface layouts corresponding to different spatial information configurations/seating arrangements according to an exemplary embodiment.

FIG. 24 illustrates examples of user interface layouts corresponding to different spatial information configurations/seating arrangements according to an exemplary embodiment. Box 2401 is the scenario where a user is in the middle seat and there are no persons located on either side of the user. The distribution of the cubes shown in the VR display in boxes 2401-2404 represents available user interface portions. As shown in box 2401, when there are no persons to either side of the user, they have a wide user interface area available in which to render content.

Box 2402 is the scenario where a user is in the middle seat and there is one person to the right of the user. As shown in box 2402, when there is a person to the right side of the user, they have a wide user interface area available in which to render content to their left side and a smaller area to the right side.

Box 2403 is the scenario where a user is in the middle seat and there is one person to the left of the user. As shown in box 2403, when there is a person to the left side of the user, they have a wide user interface area available in which to render content to their right side and a smaller area to the left side.

Box 2304 is the scenario where a user is in the middle seat and there are persons to both sides of the user. As shown in box 2404, when there are persons to the left side and right side of the user, they have a relatively narrow area user interface area available in which to render content.

Returning to FIG. 1, at step 204 a notification of a situational risk event in a plurality of situational risk events is received by the VR device. Situational risk events are described in greater detail below, but generally are events that introduce a temporary risk to the VR user at certain times. The situational risk event can result in a change of the zone of safe movement, and consequently the spatial risk zones, for the duration of the situational risk event.

FIG. 25 illustrates how the space recommendation/optimal positioning system processes the space arrangement information input according to an exemplary embodiment. As shown in the figure, the system takes into account the position of the user and the volumetric risk zones defined in the server (e.g. obstacles—shown as grey boxes). The system subsequently creates cuboid approximations of the v-risk zones. Taking into account the volumetric space around the user, the system then subdivides the volumetric space in adjusted cuboids around the defined risk zones and searches for the biggest risk-free zone around the user to create the maximum convex shape as a recommended space for interactivity (as shown in the bottom right rendering). In addition to utilize volume information, the system can also utilize orientation information when determining optimal user interface positioning. For example, the optimal orientation and optimal volume can be used to determine appropriate optimal position of a user interface element. In this case, the optimal orientation can be determined based on orientation risk and used to adjust the positioning/orientation of the user interface element.

Returning to FIG. 22, at step 2202 the user interface element is transmitted at the determined location and/or orientation. As discussed above, the safety system provides the recommendations to the VR application and the actual transmission is performed by the VR application. The specific user interface element being transmitted and associated parameters are determined by the VR application.

As discussed above, a database or other memory structure can be used by the safety system to store the data required to implement the above-mentioned processes. This database/memory structure can be stored on a server (e.g., a flight server), remote database, a remote computing device (e.g., an administrator device) or on the VR device itself.

All the settings of various scenarios, including spatial information configurations and situational risk events, can be stored here, together with the users' and moderators' selections. Caching of calculations that can be applied in similar seat arrangements can also be stored in the database.

Additionally, the database can store one or more of the following parameters and/or values:

Spatial information corresponding to seats, such as identification of the seat, orientation risk zones assigned to the seat (min and max for yaw and/or pitch), volumetric risk zones assigned to the seat (position relative to the user and size), risk values per risk zone: severity and reaction time, space arrangement options (e.g., neighbors to the left or right), and/or affected risk zones with risk values' modifiers;

Situational risk event information (e.g. meal serving, cruising, landing), including affected seats and risk zones with risk values' modifiers, current status of risk events;

User information including user identifiers, device information, seats, and space arrangement options; and/or Warnings associated with risk severity values, including, optionally, smoothness parameters.

Figure 26:
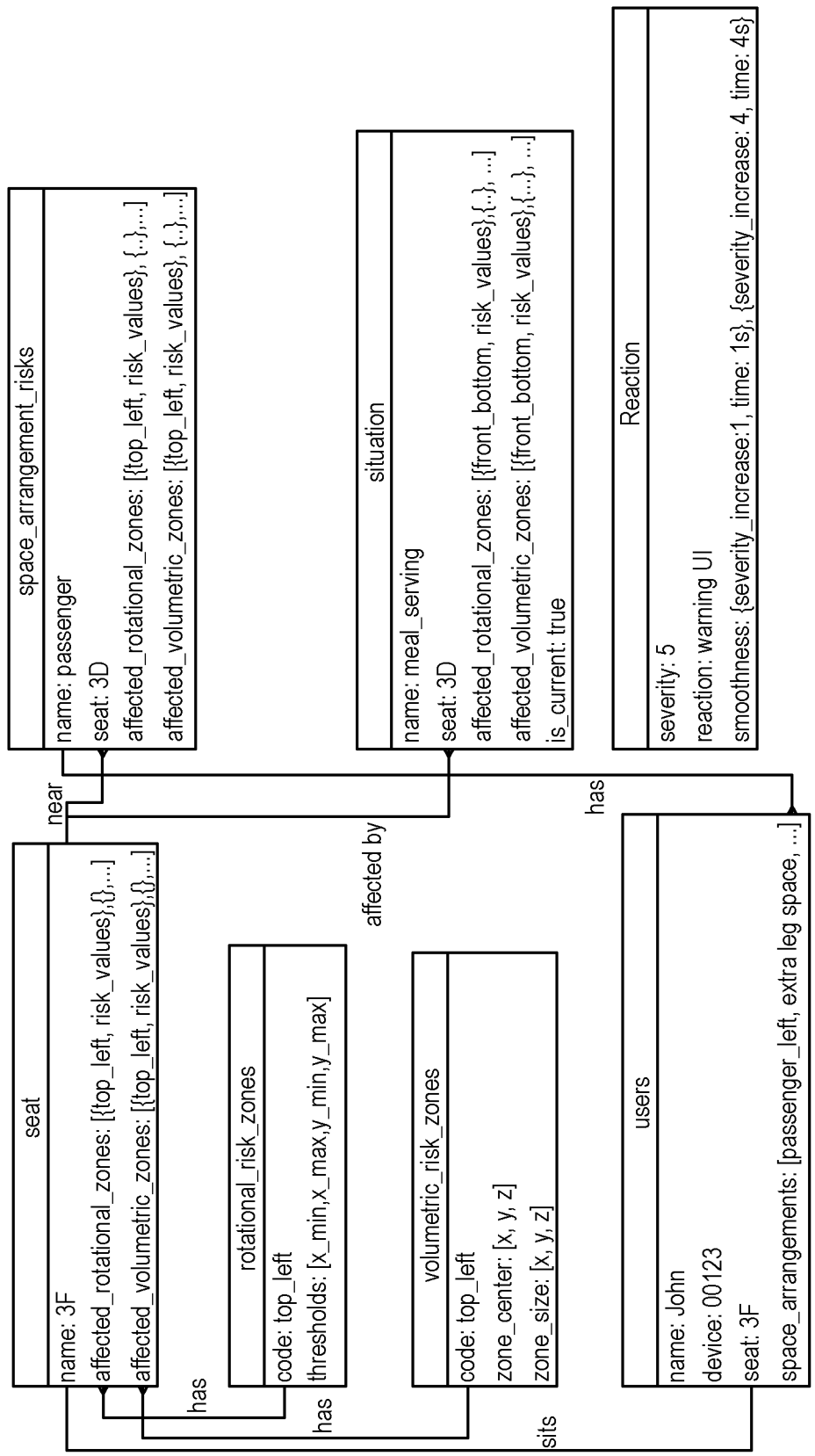
FIG. 26 illustrates an exemplary schema of a database of the VR safety system according to an exemplary embodiment.

FIG. 26 illustrates an exemplary schema of a database of the VR safety system according to an exemplary embodiment. As shown in FIG. 26, the schema includes data structures/objects corresponding to seat information, rotational risk zones, volumetric risk zones, users, space arrangement risks (i.e., obstructions, physical barriers), situational risk event information, and reactions (also referred to herein as warnings).

In a simple scenario, an administrator can introduce all the risk zones and risk values associated with different seats, space arrangements and situations to the database. However, depending on the number of different seats, space arrangements and situations, it can be complex to manually define all the affected risk zones and the risk values associated with those. To address this issue, the risk zones and risk values can be computed and stored in the database: the administrator of the system only needs input into the database all the possible space arrangements (fixtures, extra spaces, obstacles in the space) with a measured/estimated volume and distance from the user's head and risk values (it can be a negative if the arrangement includes extra space).

The user can also input their height or distance of their head and hands from the chair for better precision. An algorithm can then estimate the risk zones around the user given the volume and the distance of the arrangement from the user and can assign risk values to each risk zone and store the option to the server. The algorithm can also calculate in advance the affected risk zones for every possible space arrangement or can calculate those on the run-time if a user selects that specific arrangement.

Both the administrator and the automatic spatial risk zone calculator can account for a certain distance before an actual obstacle when defining the volume of a risk zone. This way the system can react in-time, before the user actually hits the obstacle.

Figure 27:
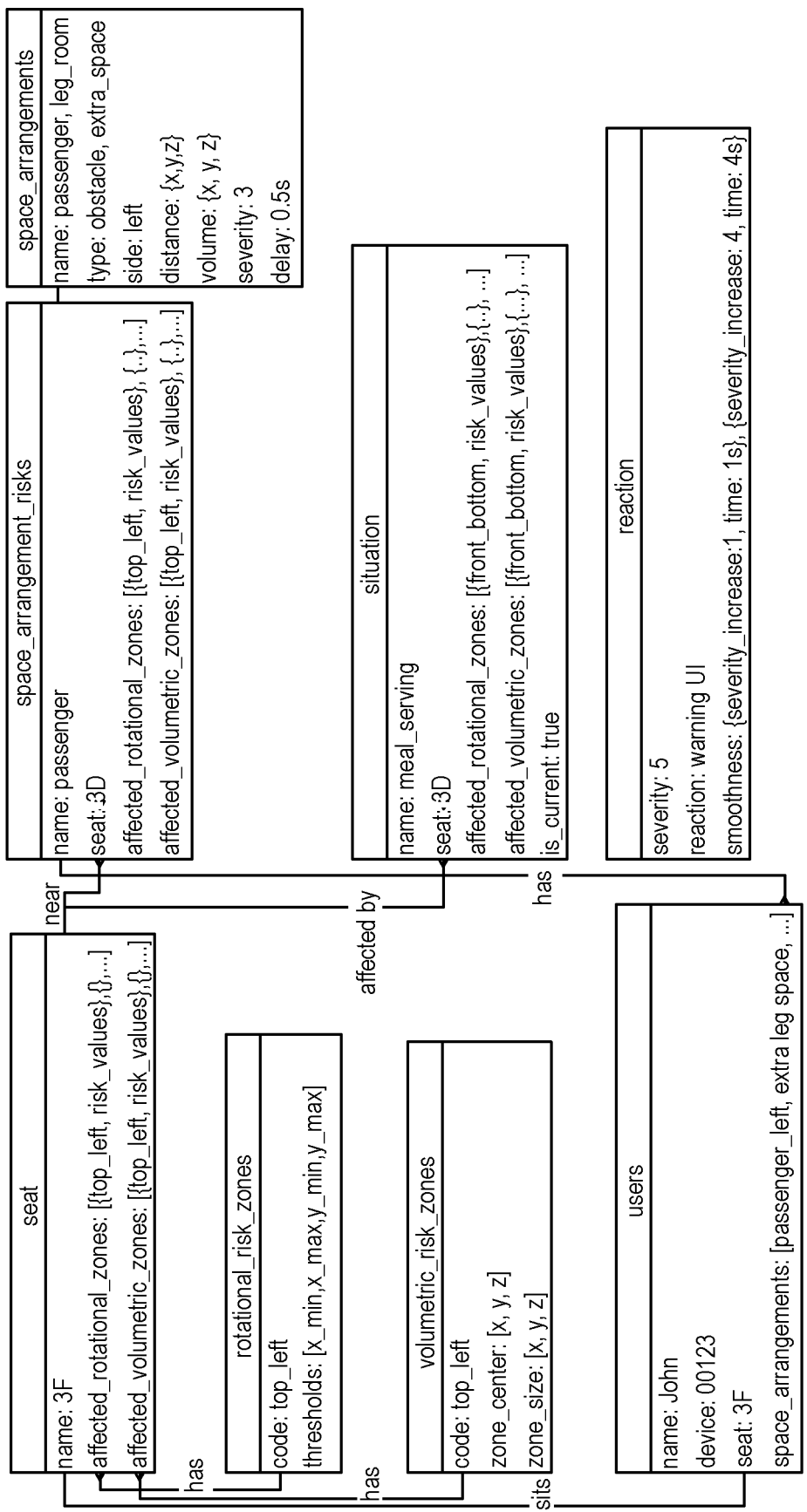
FIG. 27 illustrates an example database schema where risk zones are calculated procedurally according to an exemplary embodiment.

FIG. 27 illustrates an example database schema where risk zones are calculated procedurally according to an exemplary embodiment. In order to further minimize the manual work and potential human errors, two advanced implementations for determining risk zones can be utilized.

A 3D model of the physical space can also be utilized for spatial risk determination. For example, in the event that a real size 3D representation of the physical space is available, it can be used to define the positions and dimensions of v-risk zones. As shown in FIG. 26, the dimensions of space arrangements are provided to the system and used to determine risk zones. The available seat options can be defined in relation to a 3D model, i.e., each available seat can be accompanied by a 3D position inside the 3D model, that represents the user's head position (or VR camera position). Once the seat selection arrives to the server (by the user or the moderator), an algorithm can search for objects/obstacles around the users' point of view. A maximum distance from the user can be defined in order to limit the object detection search (e.g., given it's a seated experience, we could set a 1.5 or 2 meters distance around the user, as the distance a user could potentially reach when seated). A spatial subdivision algorithm (such as an octree)can be used to sequentially subdivide the space around the user, until smaller volumetric cubes that contain objects/obstacles are detected and defined as risk zones. Such a volume subdivision approach can translate complex volumetric/spatial data (e.g., polymorphic 3D objects) into simpler objects, such as cubes, which is computationally easier and cheaper to process for detecting collisions.

Before storing and sending the detected risk zones, the algorithm can make some corrections on the final size of the risk zones (e.g., a small increase in risk zone volume) so that the risk zone starts before the actual object to warn the user on time. The fixtures (3D objects) in the 3D model can be assigned with risk values in advance so that they can be associated with the detected risk zones. During this process, a recommended risk-free volume for the placement of the interactive elements can also be defined, as discussed above. Optionally, the system can allow for manual verification or adjustment of the determined spatial risk zones. For example, the proposed zones can be presented to a user on the VR interface and the user can use inputs (tactile, touchscreen, gaze etc.) to adjust/accept the proposed zones.

The depth camera of the VR headset can also be utilized. For example, if a depth camera is available on the VR headset, it could be used to detect the distance and volume of fixtures or extra spaces using image processing techniques on the run-time. Using machine learning techniques, weights (positive or negative can be determined/calculated). This solution can override the server calculations, or the solution can be used for a serverless implementation.

The server can be enhanced with a user interface that facilitates the administrator to introduce seat, space arrangements, situations, and risk zones to the database. In the case of a 3D model of the space, an interface can facilitate the assignment of risk values for each 3D object in the model.

The server is responsible for finding, combining and sending the information of the risk zones, relative to the selected seat, space arrangement and active situations to a given VR device. The server is also responsible for detecting and tagging overlapping risk zones relating to the same seat. Overlapping risk zones might occur from different space arrangements (e.g. two obstacles very close to each other), or from space arrangements and situation-related risk zones (e.g., a neighbor passenger on the left and a meal serving coming from the left). When overlapping risk zones are detected, the server will subdivide the space in more risk zones in order to reflect the overlapping and the non-overlapping areas as separate risk zones. The new risk zones that reflect the overlapping volumes will have a severity equal to the sum of the two overlapping risk zones' severity. If the same risk zone (i.e., same risk zone id) is used for different space arrangements and/or situations related to the same seat, no new risk zones will be created and only their severity will be updated.

Upon request of the VR device, the server can look for all the risk zones associated with the selected seat (for overlapping and non-overlapping areas), combining information from the space arrangements with enabled situations. Then, the risk zones will be combined in one set. Severities of common risk zones (having the same id) can be summed together or otherwise aggregated (Note: risk zones' severity values can be negative to represent less risk, e.g. when there is extra leg space). Finally, the server can send the result (risk zones and risk values) to the VR device, as explained above.

A server can communicate information to the VR devices. The server application and the VR devices (via the VR SDK or Middleware) can establish a two-way asynchronous communication, ensuring a continuous status update using Socket or Web Socket. The VR devices are also requesting information datasets through REST API calls. In general, throughout this architecture, the REST API can be used only for specifically defined queries, while Socket/Web Socket can being used for status updates. The server can wait for an acknowledgement of all the messages that are sent to connected devices. The server can repeat sending the same messages after certain intervals, until it receives an acknowledgement from the devices.

With respect to VR device-server communication, a first REST API request of the VR device can include the available seats and space arrangement options defined in the server's database. The VR device requests the relevant dataset upon starting the application. Next, the VR device can send a request for the risk zones and risk values. The request contains the seat arrangement selection, and the server looks in the database for the settings defined for this arrangement to create the appropriate response (earlier discussion of warnings). In an alternative implementation, the seat selection for a certain user can be done by the external device of a moderator. In that case, the server will directly send the risk zones settings to the VR device through a Socket.IO message.

If there is a situation change, the new risk zones settings can be communicated to all the connected VR devices through a Socket.IO message.

Finally, if the user changes the current seat arrangement through the VR application settings, a new REST API request for risk zones' settings can be created and sent to the server. Alternatively, if the change is established by a moderator, a Socket.IO message can be transmitted to the VR device.

Figure 28:
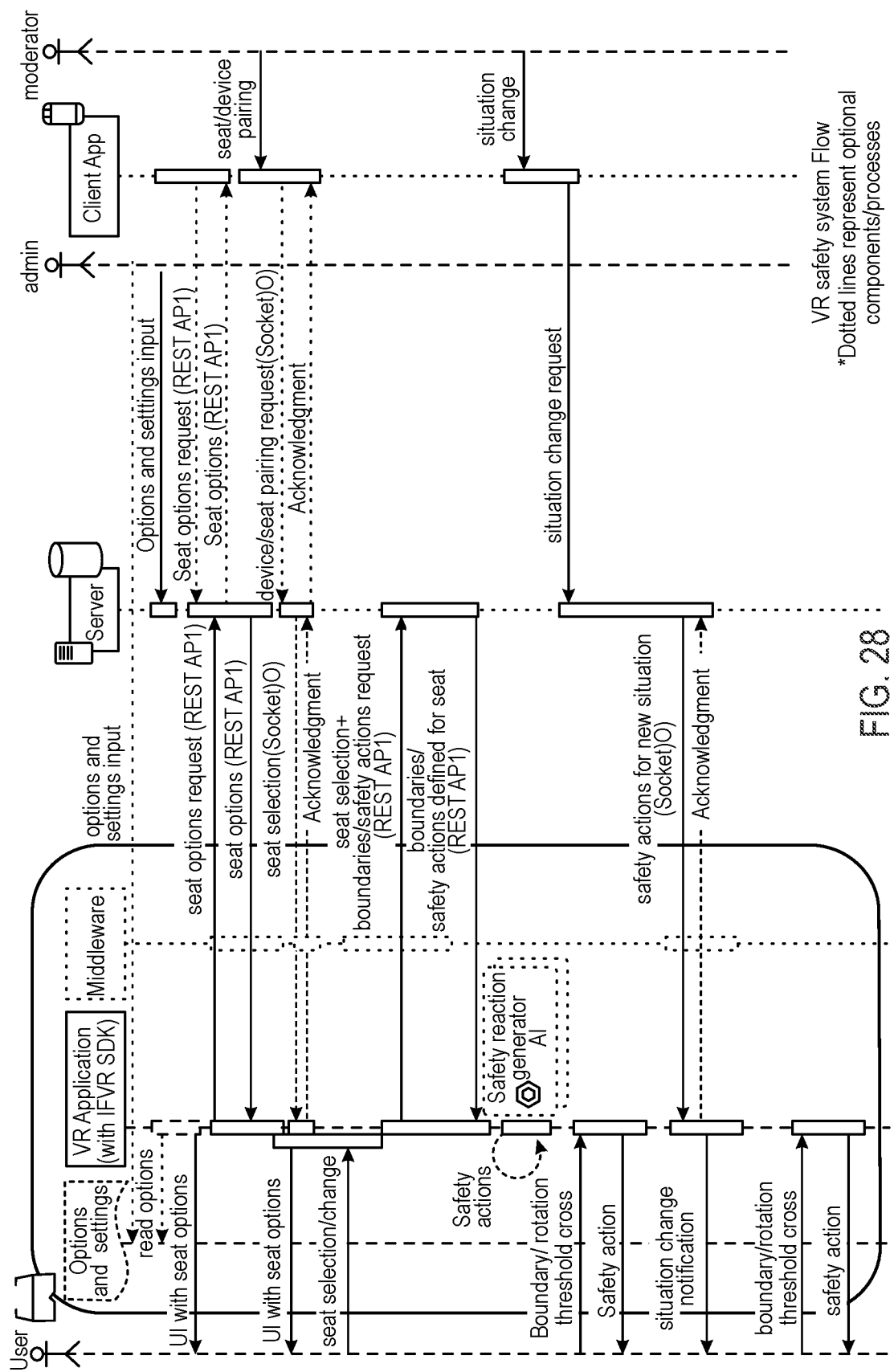
FIG. 28 illustrates a flow diagram showing the different components of the system and message passing between the components of the system.

With respect to moderator device and server communication, moderator's devices can communicate situation changes to the server through a REST API. If the moderator is responsible for assigning seats to the VR users (devices), the moderator device can first request the seat arrangement and options from the server through a REST API, and once the pairing is selected in the device, a Socket.IO message will be sent to the server to store the selection FIG. 28 illustrates a flow diagram showing the different components of the system and message passing between the components of the system. Each of these steps are descried in detail in this application.

An application for the moderator can be implemented as any type of client application (mobile, tablet, PC, web . . . ). In the present system, the application can be used to:

Change current situation;
Pair seats with VR devices; and
Assign space arrangements;

In addition to above, the application can be used to send push notifications to all connected VR users and to review device usage and seat arrangement status review.

The UI for the seats' availability, space arrangements and situation options can be generated procedurally after connecting and receiving the equivalent data from the server. The pairing can be done by introducing the code of the VR headset. The pairing process could be facilitated by NFC or QR code scanning.

When providing the suggested input for seat and space arrangements, the information, that the user chooses from predefined choices or fills out the parameters:

Airplane/Passenger vehicle: seat position and type, nearby passengers
Car: seat position;
Desk: desk height, nearby walls, other objects (laptops, screens etc.); and
Classroom: desk height, front-back-left-right student/desk, walls.

A moderator can also assign a seat to the user by filling out parameters through a device-seat pairing device. Example of this include:

Airplane: crew member assigns seats and other options and settings are sent to server and then to specific headset.
Office: office administrator sets options from a control panel implementation
Theater: theater crew sets option after pairing device.
Automated: seats are assigned to predefined settings. When pairing the device with a seat, the system can automatically sends the options to the headset.

A server can be used for database structure and management. Alternatively, the VR device can be utilized for this functionality. All the settings of the scenarios can stored here, together with the users' and moderators' selections. Caching of calculations (see Risk zones and risk values calculation section) that can be applied in similar seat arrangements are also stored here.

Figure 29:
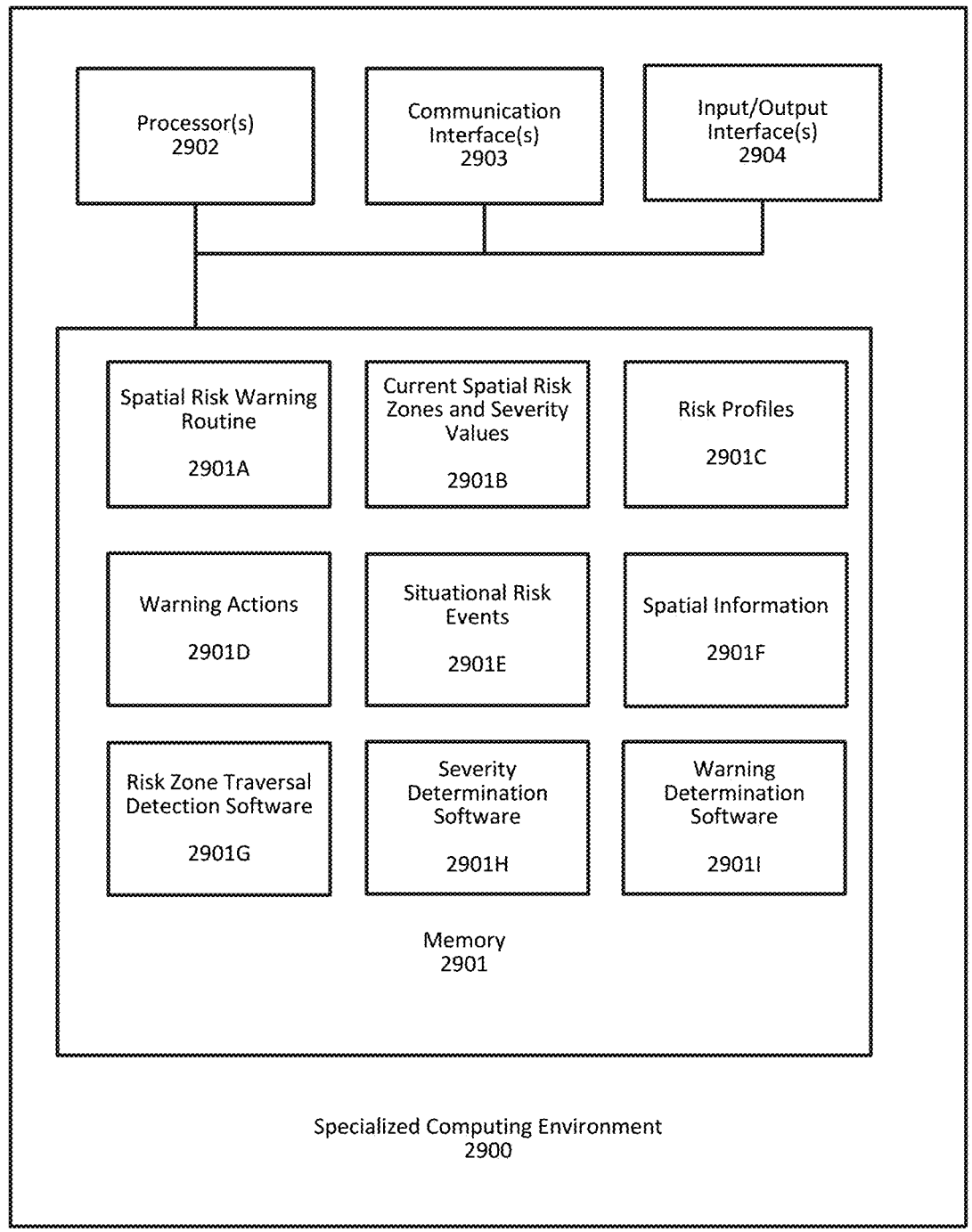
FIG. 29 illustrates an example of a specialized computing environment, such as the computing environment of VR device, cabin crew device, and/or VR server of the adaptive VR safety system according to an exemplary embodiment.

One or more of the above-described techniques can be implemented in or involve one or more special-purpose computer systems having computer-readable instructions loaded thereon that enable the computer system to implement the above-described techniques. FIG. 29 illustrates an example of a specialized computing environment 2900, such as the computing environment of a VR device, cabin crew device, and/or VR server used to perform the above-described methods and implement the above-described systems.

With reference to FIG. 29, the computing environment 2900 includes at least one processing unit/controller 2902 and memory 2901. The processing unit 2902 executes computer-executable instructions and can be a real or a virtual processor. In a multi-processing system, multiple processing units execute computer-executable instructions to increase processing power. The memory 2901 can be volatile memory (e.g., registers, cache, RAM), non-volatile memory (e.g., ROM, EEPROM, flash memory, etc.), or some combination of the two. The memory 2901 can store software implementing the above-described techniques, including spatial risk warning routine 2901A, current spatial risk zones and severity values 2901B, risk profiles 2901C, warning actions 2901D, situational risk events 2901E, spatial information 2901F, risk zone traversal detection software 2901G, severity determination software 2901H, and warning determination software 2901I.

All of the software stored within memory 2901 can be stored as a computer-readable instructions, that when executed by one or more processors 2902, cause the processors to perform the functionality described with respect to FIGS. 1-28.

Processor(s) 2902 execute computer-executable instructions and can be a real or virtual processors. In a multi-processing system, multiple processors or multicore processors can be used to execute computer-executable instructions to increase processing power and/or to execute certain software in parallel.

Specialized computing environment 2900 additionally includes a communication interface 2903, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 2900 further includes input and output interfaces 2904 that allow users (such as system administrators) to provide input to the system to set parameters, to edit data stored in memory 2901, or to perform other administrative functions.

An interconnection mechanism (shown as a solid line in FIG. 29), such as a bus, controller, or network interconnects the components of the specialized computing environment 2900.

Input and output interfaces 2904 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 2900.

Specialized computing environment 2900 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 2800.

The present system offers many advantages. The VR notification system disclosed herein ensures a user of a VR device maintains situational awareness, avoid collision and/or injury with nearby obstructions, and avoids causing discomfort to nearby persons during the VR session. Maintaining situational awareness, especially on emergency situations, is one of the most important requirements of the aviation safety norms when it come on the use of inflight entertainment.

Having described and illustrated the principles of our invention with reference to the described embodiment, it will be recognized that the described embodiment can be modified in arrangement and detail without departing from such principles. Elements of the described embodiment shown in software can be implemented in hardware and vice versa.

In view of the many possible embodiments to which the principles of our invention can be applied, we claim as our invention all such embodiments as can come within the scope and spirit of the following claims and equivalents thereto.

We claim:

1. A method executed by a Virtual Reality (VR) device for implementing an adaptive VR safety system, the method comprising:
    executing, by the VR device, a spatial risk warning routine, the spatial risk warning routine being configured to perform one or more warning actions based at least in part on a physical traversal by the VR device of one or more current spatial risk zones in a plurality of current spatial risk zones;
    identifying, by the VR device, spatial information corresponding to a user of the VR device, the spatial information comprising seat information corresponding to a seat of the user and occupancy information regarding one or more seats adjacent to the seat of the user;
    loading, by the VR device, a first risk profile corresponding to the spatial information, wherein the first risk profile defines a first plurality of spatial risk zones and wherein loading the first risk profile comprises setting the plurality of current spatial risk zones to the first plurality of spatial risk zones;
    receiving, by the VR device, a notification of a situational risk event in a plurality of situational risk events; and
    loading, by the VR device, a second risk profile corresponding to the spatial information and the situational risk event, wherein the second risk profile defines a second plurality of spatial risk zones different than the first plurality of spatial risk zones and wherein loading the second risk profile comprises setting the plurality of current spatial risk zones to the second plurality of spatial risk zones.

2. The method of claim 1, wherein the plurality of current spatial risk zones comprise a plurality of current risk severity values corresponding to the plurality of current spatial risk zones.

3. The method of claim 2, wherein performing one or more warning actions based at least in part on a physical traversal by the VR device of one or more current spatial risk zones in a plurality of current spatial risk zones comprises:
    detecting traversal of a current spatial risk zone in the plurality of current spatial risk zones;
    determining a risk severity value in the plurality of current risk severity values based at least in part on the traversed current spatial risk zone; and
    identifying a warning action based at least in part on the risk severity value.

4. The method claim 3, wherein determining a risk severity value in the plurality of current risk severity values based at least in part on the traversed current spatial risk zone further comprises:

determining a duration associated with the traversal of the current spatial risk zone; and
adjusting the risk severity value based at least in part on the duration.

5. The method of claim 1, wherein performing one or more warning actions based at least in part on a physical traversal by the VR device of one or more current spatial risk zones in a plurality of current spatial risk zones comprises:
detecting traversal of two or more current spatial risk zones in the plurality of current spatial risk zones;
determining a total risk severity value based at least in part on the traversed two or more current spatial risk zones; and
identifying a warning action based at least in part on the determined total risk severity value.

6. The method of claim 5, wherein determining a total risk severity value based at least in part on the traversed two or more current spatial risk zones further comprises:
determining two or more durations associated with the traversal of the two or more current spatial risk zones; and
adjusting the total risk severity value based at least in part on the two or more durations.

7. The method of claim 1, wherein the plurality of current spatial risk zones comprise a plurality of volumetric risk zones and wherein physical traversal by the VR device of one or more current spatial risk zones in a plurality of current spatial risk zones comprises:
displacement of the VR device into a spatial volume corresponding to a volumetric risk zone in the plurality of volumetric risk zones.

8. The method of claim 1, wherein the plurality of current spatial risk zones comprise a plurality of orientation risk zones and wherein physical traversal by the VR device of one or more current spatial risk zones in a plurality of current spatial risk zones comprises:
rotation of the VR device into an angular position corresponding to an orientation risk zone in the plurality of orientation risk zones.

9. The method of claim 1, wherein the one or more warning actions comprise one or more of:
a visual warning displayed on a display of the VR device;
a three-dimensional mesh of the one or more current spatial risk zones displayed on the display of the VR device;
an audio warning transmitted through an audio output of the VR device;
a haptic feedback warning transmitted through the VR device; or
switching the display of the VR device to a camera mode to display a pass-through image captured by a camera of the VR device.

10. The method of claim 1, wherein identifying spatial information corresponding to a user of the VR device comprises one or more:
receiving at least a portion of the spatial information from the user of the VR device via an input interface of the VR device;
receiving at least a portion of the spatial information from a server communicatively coupled to the VR device;
receiving at least a portion of the spatial information from a remote device communicatively coupled to the VR device;
determining at least a portion of the spatial information by querying a spatial information database; or
determining at least a portion of the spatial information based at least in part on an analysis of sensor data from one or more sensors of the VR device.

11. The method of claim 1, wherein the spatial information corresponding to the user of the VR device further comprises one or more of:
spatial positions and physical dimensions of one or more physical obstructions proximate to the user of the VR device;
spatial positions and physical dimensions of one or more fixtures proximate to the user of the VR device;
a spatial position and physical dimensions of the seat of the user;
a spatial position and physical dimensions of the one or more seats adjacent to the seat of the user;
physical dimensions of an area surrounding the user;
physical attributes of the user; or physical attributes of one or more persons adjacent to the user.

12. The method of claim 2, wherein the first plurality of spatial risk zones comprise a first plurality of risk severity values corresponding to the first plurality of spatial risk zones and wherein loading a first risk profile corresponding to the spatial information comprises:
setting the plurality of current risk severity values to the first plurality of risk severity values.

13. The method of claim 2, wherein the second plurality of spatial risk zones comprise a second plurality of risk severity values corresponding to the second plurality of spatial risk zones and wherein loading a second risk profile corresponding to the spatial information and the situational risk event comprises:
setting the plurality of current risk severity values to the second plurality of risk severity values.

14. The method of claim 1, wherein the situational risk event comprises one of:
a meal or drink service event;
a cruising event;
a landing event;
a takeoff event;
a turbulence event;
a disembarking event; or
a boarding event.

15. The method of claim 1, wherein receiving a notification of a situational risk event in a plurality of situational risk events comprises:
receiving the notification from a server communicatively coupled to the VR device; or
receiving the notification from a remote device communicatively coupled to the VR device.

16. The method of claim 1, further comprising:
receiving, by the VR device, a second notification indicating a termination of the situational risk event; and
loading, by the VR device, the first risk profile based at least in part on receiving the second notification, wherein loading the first risk profile comprises setting the plurality of current spatial risk zones to the first plurality of spatial risk zones.

17. The method of claim 1, wherein VR device is configured to communicate with a server via a middleware application executing on the VR device, the middleware application being disposed as an intermediary between the server and one or more VR applications executing on the VR device.

18. The method of claim 1, further comprising:
  determining, by the VR device, an optimal location for a user interface element on a user interface of the VR device based at least in part on the plurality of current spatial risk zones; and
  transmitting, by the VR device, the user interface element at the determined location.

19. A Virtual Reality (VR) device for implementing an adaptive VR safety system, the VR device comprising:
  one or more processors; and
  one or more memories operatively coupled to at least one of the one or more processors and having instructions stored thereon that, when executed by at least one of the one or more processors, cause the at least one of the one or more processors to:
    execute a spatial risk warning routine, the spatial risk warning routine being configured to perform one or more warning actions based at least in part on a physical traversal by the VR device of one or more current spatial risk zones in a plurality of current spatial risk zones;
    identify spatial information corresponding to a user of the VR device, the spatial information comprising seat information corresponding to a seat of the user and occupancy information regarding one or more seats adjacent to the seat of the user;
    load a first risk profile corresponding to the spatial information, wherein the first risk profile defines a first plurality of spatial risk zones and wherein loading the first risk profile comprises setting the plurality of current spatial risk zones to the first plurality of spatial risk zones;
    receive a notification of a situational risk event in a plurality of situational risk events; and
    load a second risk profile corresponding to the spatial information and the situational risk event, wherein the second risk profile defines a second plurality of spatial risk zones different than the first plurality of spatial risk zones and wherein loading the second risk profile comprises setting the plurality of current spatial risk zones to the second plurality of spatial risk zones.

20. The VR device of claim 19, wherein the plurality of current spatial risk zones comprise a plurality of current risk severity values corresponding to the plurality of current spatial risk zones.

21. The VR device of claim 20, wherein the instructions that, when executed by at least one of the one or more processors, cause at least one of the one or more processors to perform one or more warning actions based at least in part on a physical traversal by the VR device of one or more current spatial risk zones in a plurality of current spatial risk zones further cause the at least one of the one or more processors to:
  detect traversal of a current spatial risk zone in the plurality of current spatial risk zones;
  determine a risk severity value in the plurality of current risk severity values based at least in part on the traversed current spatial risk zone; and
  identify a warning action based at least in part on the risk severity value.

22. The VR device claim 21, wherein the instructions that, when executed by at least one of the one or more processors, cause at least one of the one or more processors to determine a risk severity value in the plurality of current spatial risk severity values based at least in part on the traversed current spatial risk zone further cause the at least one of the one or more processors to:
  determine a duration associated with the traversal of the current spatial risk zone; and
  adjust the risk severity value based at least in part on the duration.

23. The VR device of claim 19, wherein the instructions that, when executed by at least one of the one or more processors, cause at least one of the one or more processors to perform one or more warning actions based at least in part on a physical traversal by the VR device of one or more current spatial risk zones in a plurality of current spatial risk zones further cause the at least one of the one or more processors to:
  detect traversal of two or more current spatial risk zones in the plurality of current spatial risk zones;
  determine a total risk severity value based at least in part on the traversed two or more current spatial risk zones; and
  identify a warning action based at least in part on the determined total risk severity value.

24. The VR device of claim 23, wherein the instructions that, when executed by at least one of the one or more processors, cause at least one of the one or more processors to determine a total risk severity value based at least in part on the traversed two or more current spatial risk zones further cause the at least one of the one or more processors to:
  determine two or more durations associated with the traversal of the two or more current spatial risk zones; and
  adjust the total risk severity value based at least in part on the two or more durations.

25. The VR device of claim 19, wherein the plurality of current spatial risk zones comprise a plurality of volumetric risk zones and wherein physical traversal by the VR device of one or more current spatial risk zones in a plurality of current spatial risk zones comprises:
  displacement of the VR device into a spatial volume corresponding to a volumetric risk zone in the plurality of volumetric risk zones.

26. The VR device of claim 19, wherein the plurality of current spatial risk zones comprise a plurality of orientation risk zones and wherein physical traversal by the VR device of one or more current spatial risk zones in a plurality of current spatial risk zones comprises:
  rotation of the VR device into an angular position corresponding to an orientation risk zone in the plurality of orientation risk zones.

27. The VR device of claim 19, wherein the one or more warning actions comprise one or more of:
  a visual warning displayed on a display of the VR device;
  a three-dimensional mesh of the one or more current spatial risk zones displayed on the display of the VR device;
  an audio warning transmitted through an audio output of the VR device;
  a haptic feedback warning transmitted through the VR device; or
  switching the display of the VR device to a camera mode to display a pass-through image captured by a camera of the VR device.

28. The VR device of claim 19, wherein the instructions that, when executed by at least one of the one or more processors, cause at least one of the one or more processors to identify spatial information corresponding to a user of the VR device further cause the at least one of the one or more processors to perform one or more of:
- receiving at least a portion of the spatial information from the user of the VR device via an input interface of the VR device;
- receiving at least a portion of the spatial information from a server communicatively coupled to the VR device;
- receiving at least a portion of the spatial information from a remote device communicatively coupled to the VR device;
- determining at least a portion of the spatial information by querying a spatial information database; or
- determining at least a portion of the spatial information based at least in part on an analysis of sensor data from one or more sensors of the VR device.

29. The VR device of claim 19, wherein the spatial information corresponding to the user of the VR device further cause the at least one of the one or more processors to perform one or more of:
- spatial positions and physical dimensions of one or more physical obstructions proximate to the user of the VR device;
- spatial positions and physical dimensions of one or more fixtures proximate to the user of the VR device;
- a spatial position and physical dimensions of the seat of the user;
- a spatial position and physical dimensions of the one or more seats adjacent to the seat of the user;
- physical dimensions of an area surrounding the user;
- physical attributes of the user; or
- physical attributes of one or more persons adjacent to the user.

30. The VR device of claim 20, wherein the first plurality of spatial risk zones comprise a first plurality of risk severity values corresponding to the first plurality of spatial risk zones and wherein the instructions that, when executed by at least one of the one or more processors, cause at least one of the one or more processors to load a first risk profile corresponding to the spatial information further cause the at least one of the one or more processors to:
- set the plurality of current risk severity values to the first plurality of risk severity values.

31. The VR device of claim 20, wherein the second plurality of spatial risk zones comprise a second plurality of risk severity values corresponding to the second plurality of spatial risk zones and wherein the instructions that, when executed by at least one of the one or more processors, cause at least one of the one or more processors to load a second risk profile corresponding to the spatial information and the situational risk event further cause the at least one of the one or more processors to:
- set the plurality of current risk severity values to the second plurality of risk severity values.

32. The VR device of claim 19, wherein the situational risk event comprises one of:
- a meal or drink service event;
- a cruising event;
- a landing event;
- a takeoff event;
- a turbulence event;
- a disembarking event; or
- a boarding event.

33. The VR device of claim 19, wherein the instructions that, when executed by at least one of the one or more processors, cause at least one of the one or more processors to receive a notification of a situational risk event in a plurality of situational risk events further cause the at least one of the one or more processors to:
- receive the notification from a server communicatively coupled to the VR device; or
- receive the notification from a remote device communicatively coupled to the VR device.

34. The VR device of claim 19, wherein at least one of the one or more memories has further instructions stored thereon that, when executed by at least one of the one or more processors, cause the at least one of the one or more processors to:
- receive a second notification indicating a termination of the situational risk event; and
- load the first risk profile based at least in part on receiving the second notification, wherein loading the first risk profile comprises setting the plurality of current spatial risk zones to the first plurality of spatial risk zones.

35. The VR device of claim 19, wherein VR device is configured to communicate with a server via a middleware application executing on the VR device, the middleware application being disposed as an intermediary between the server and one or more VR applications executing on the VR device.

36. The VR device of claim 19, wherein at least one of the one or more memories has further instructions stored thereon that, when executed by at least one of the one or more processors, cause the at least one of the one or more processors to:
- determine an optimal location for a user interface element on a user interface of the VR device based at least in part on the plurality of current spatial risk zones; and
- transmit the user interface element at the determined location.

37. At least one non-transitory computer-readable medium storing computer-readable instructions that, when executed by one or more processors of a Virtual Reality (VR) device, cause the VR device to:
- execute a spatial risk warning routine, the spatial risk warning routine being configured to perform one or more warning actions based at least in part on a physical traversal by the VR device of one or more current spatial risk zones in a plurality of current spatial risk zones;
- identify spatial information corresponding to a user of the VR device, the spatial information comprising seat information corresponding to a seat of the user and occupancy information regarding one or more seats adjacent to the seat of the user;
- load a first risk profile corresponding to the spatial information, wherein the first risk profile defines a first plurality of spatial risk zones and wherein loading the first risk profile comprises setting the plurality of current spatial risk zones to the first plurality of spatial risk zones;
- receive a notification of a situational risk event in a plurality of situational risk events; and
- load a second risk profile corresponding to the spatial information and the situational risk event, wherein the second risk profile defines a second plurality of spatial risk zones different than the first plurality of spatial risk zones and wherein loading the second risk profile comprises setting the plurality of current spatial risk zones to the second plurality of spatial risk zones.

38. The at least one non-transitory computer-readable medium of claim 37, wherein the plurality of current spatial risk zones comprise a plurality of current risk severity values corresponding to the plurality of current spatial risk zones.

39. The at least one non-transitory computer-readable medium of claim 38, wherein the instructions that, when executed by the VR device, cause the VR device to perform one or more warning actions based at least in part on a physical traversal by the VR device of one or more current spatial risk zones in a plurality of current spatial risk zones further cause the VR device to:
- detect traversal of a current spatial risk zone in the plurality of current spatial risk zones;
- determine a risk severity value in the plurality of current risk severity values based at least in part on the traversed current spatial risk zone; and
- identify a warning action based at least in part on the risk severity value.

40. The at least one non-transitory computer-readable medium of claim 39, wherein the instructions that, when executed by the VR device, cause the VR device to determine a risk severity value in the plurality of current risk severity values based at least in part on the traversed current spatial risk zone further cause the VR device to:
- determine a duration associated with the traversal of the current spatial risk zone; and
- adjust the risk severity value based at least in part on the duration.

41. The at least one non-transitory computer-readable medium of claim 37, wherein the instructions that, when executed by the VR device, cause the VR device to perform one or more warning actions based at least in part on a physical traversal by the VR device of one or more current spatial risk zones in a plurality of current spatial risk zones further cause the VR device to:
- detect traversal of two or more current spatial risk zones in the plurality of current spatial risk zones;
- determine a total risk severity value based at least in part on the traversed two or more current spatial risk zones; and
- identify a warning action based at least in part on the determined total risk severity value.

42. The at least one non-transitory computer-readable medium of claim 41, wherein the instructions that, when executed by the VR device, cause the VR device to determine a total risk severity value based at least in part on the traversed two or more current spatial risk zones further cause the VR device to:
- determine two or more durations associated with the traversal of the two or more current spatial risk zones; and
- adjust the total risk severity value based at least in part on the two or more durations.

43. The at least one non-transitory computer-readable medium of claim 37, wherein the plurality of current spatial risk zones comprise a plurality of volumetric risk zones and wherein physical traversal by the VR device of one or more current spatial risk zones in a plurality of current spatial risk zones comprises:
- displacement of the VR device into a spatial volume corresponding to a volumetric risk zone in the plurality of volumetric risk zones.

44. The at least one non-transitory computer-readable medium of claim 37, wherein the plurality of current spatial risk zones comprise a plurality of orientation risk zones and wherein physical traversal by the VR device of one or more current spatial risk zones in a plurality of current spatial risk zones comprises:
- rotation of the VR device into an angular position corresponding to an orientation risk zone in the plurality of orientation risk zones.

45. The at least one non-transitory computer-readable medium of claim 37, wherein the one or more warning actions comprise one or more of:
- a visual warning displayed on a display of the VR device;
- a three-dimensional mesh of the one or more current spatial risk zones displayed on the display of the VR device;
- an audio warning transmitted through an audio output of the VR device;
- a haptic feedback warning transmitted through the VR device; or
- switching the display of the VR device to a camera mode to display a pass-through image captured by a camera of the VR device.

46. The at least one non-transitory computer-readable medium of claim 37, wherein the instructions that, when executed by the VR device, cause the VR device to identify spatial information corresponding to a user of the VR device further cause the VR device to perform one or more of:
- receiving at least a portion of the spatial information from the user of the VR device via an input interface of the VR device;
- receiving at least a portion of the spatial information from a server communicatively coupled to the VR device;
- receiving at least a portion of the spatial information from a remote device communicatively coupled to the VR device;
- determining at least a portion of the spatial information by querying a spatial information database; or
- determining at least a portion of the spatial information based at least in part on an analysis of sensor data from one or more sensors of the VR device.

47. The at least one non-transitory computer-readable medium of claim 37, wherein the spatial information corresponding to the user of the VR device further cause the VR device to perform one or more of:
- spatial positions and physical dimensions of one or more physical obstructions proximate to the user of the VR device;
- spatial positions and physical dimensions of one or more fixtures proximate to the user of the VR device;
- a spatial position and physical dimensions of the seat of the user;
- a spatial position and physical dimensions of the one or more seats adjacent to the seat of the user;
- physical dimensions of an area surrounding the user;
- physical attributes of the user; or
- physical attributes of one or more persons adjacent to the user.

48. The at least one non-transitory computer-readable medium of claim 38, wherein the first plurality of spatial risk zones comprise a first plurality of risk severity values corresponding to the first plurality of spatial risk zones and wherein the instructions that, when executed by the VR device, cause the VR device to load a first risk profile corresponding to the spatial information further cause the VR device to:
- set the plurality of current risk severity values to the first plurality of risk severity values.

49. The at least one non-transitory computer-readable medium of claim 38, wherein the second plurality of spatial risk zones comprise a second plurality of risk severity values corresponding to the second plurality of spatial risk zones and wherein the instructions that, when executed by the VR device, cause the VR device to load a second risk profile corresponding to the spatial information and the situational risk event further cause the VR device to:

set the plurality of current risk severity values to the second plurality of risk severity values.

50. The at least one non-transitory computer-readable medium of claim 37, wherein the situational risk event comprises one of:
  a meal or drink service event;
  a cruising event;
  a landing event;
  a takeoff event;
  a turbulence event;
  a disembarking event; or
  a boarding event.

51. The at least one non-transitory computer-readable medium of claim 37, wherein the instructions that, when executed by the VR device, cause the VR device to receive a notification of a situational risk event in a plurality of situational risk events further cause the VR device to:
  receive the notification from a server communicatively coupled to the VR device; or
  receive the notification from a remote device communicatively coupled to the VR device.

52. The at least one non-transitory computer-readable medium of claim 37, further storing computer-readable instructions that, when executed by the VR device, cause the VR device to:
  receive a second notification indicating a termination of the situational risk event; and
  load the first risk profile based at least in part on receiving the second notification, wherein loading the first risk profile comprises setting the plurality of current spatial risk zones to the first plurality of spatial risk zones.

53. The at least one non-transitory computer-readable medium of claim 37, wherein VR device is configured to communicate with a server via a middleware application executing on the VR device, the middleware application being disposed as an intermediary between the server and one or more VR applications executing on the VR device.

54. The at least one non-transitory computer-readable medium of claim 37, further storing computer-readable instructions that, when executed by the VR device, cause the VR device to:
  determine an optimal location for a user interface element on a user interface of the VR device based at least in part on the plurality of current spatial risk zones; and
  transmit the user interface element at the determined location.

\* \* \* \* \*